US012415716B2

(12) United States Patent
Thomas et al.

(10) Patent No.: US 12,415,716 B2
(45) Date of Patent: Sep. 16, 2025

(54) AUTOMATED BEVERAGE DISPENSER SYSTEM AND METHOD

(71) Applicant: YUM CONNECT, LLC, Louisville, KY (US)

(72) Inventors: Aaron Thomas, Louisville, KY (US); Karl Thomas Szatrowski, Louisville, KY (US); Hunter Patrick Wyer, Lexington, SC (US); Zachary Logan Dulcie, Columbia, SC (US); James Timothy Hance, Jr., Columbia, SC (US); Grant Rorie Phillips, Columbia, SC (US); Paul Christopher Brown, Elgin, SC (US); Mark William Ahring, Columbia, SC (US); Sarah Kathrine Gilliam, Charleston, SC (US)

(73) Assignee: YUM CONNECT, LLC, Louisville, KY (US)

( * ) Notice: Subject to any disclaimer, the term of this patent is extended or adjusted under 35 U.S.C. 154(b) by 202 days.

(21) Appl. No.: 18/306,848

(22) Filed: Apr. 25, 2023

(65) Prior Publication Data

US 2024/0359964 A1 Oct. 31, 2024

(51) Int. Cl.
*B67D 3/00* (2006.01)

(52) U.S. Cl.
CPC ......... *B67D 3/0016* (2013.01); *B67D 3/0003* (2013.01); *B67D 3/0074* (2013.01); *B67D 3/0077* (2013.01); *B67D 3/0083* (2013.01); *B67D 3/009* (2013.01); *B67D 3/0096* (2013.01); *B67D 2210/00041* (2013.01);
(Continued)

(58) Field of Classification Search
CPC .................. B67D 3/009; B67D 3/0083; B67D 2210/00078; B67D 2210/00041
See application file for complete search history.

(56) References Cited

U.S. PATENT DOCUMENTS

| | | | |
|---|---|---|---|
| 1,442,983 | A | 1/1923 | Smith |
| 2,497,748 | A | 2/1950 | Von Stoeser |
| 2,699,281 | A | 1/1955 | Duke |

(Continued)

FOREIGN PATENT DOCUMENTS

| | | | |
|---|---|---|---|
| CN | 115005675 | A | 9/2022 |
| DE | 19627360 | A1 | 1/1998 |
| GB | 2546818 | B | 7/2018 |
| JP | S57-066171 | A | 4/1982 |
| JP | 2003237721 | A | 8/2003 |
| JP | 2004240654 | A | 8/2004 |
| JP | 2004272331 | A | 9/2004 |

(Continued)

OTHER PUBLICATIONS

Degnan, Nicholas Michael; U.S. Appl. No. 18/507,960, filed Nov. 13, 2023; Title: Automated Beverage Dispensing System and Method; 100 pages.

(Continued)

*Primary Examiner* — Timothy L Maust
(74) *Attorney, Agent, or Firm* — Foley & Lardner LLP

(57) ABSTRACT

A beverage production system is provided that includes a turntable assembly comprising a central axis. The turntable assembly further includes an inner turntable and an outer turntable disposed circumferentially about the inner turntable. The beverage production system also includes a cup dispensing station configured to dispense cups onto one of the inner or outer turntables. The beverage production system also includes a beverage dispensing station configured to dispense a beverage into the cups.

14 Claims, 68 Drawing Sheets

(52) U.S. Cl.
CPC .............. *B67D 2210/00076* (2013.01); *B67D 2210/00078* (2013.01); *B67D 2210/00144* (2013.01)

(56) References Cited

U.S. PATENT DOCUMENTS

| | | | |
|---|---|---|---|
| 2,814,317 | A | 11/1957 | Gale |
| 2,953,171 | A | 9/1960 | Arnett et al. |
| 2,969,632 | A | 1/1961 | Carew et al. |
| 3,308,602 | A | 3/1967 | Dubie et al. |
| 3,364,959 | A | 1/1968 | Herman et al. |
| 3,367,959 | A | 2/1968 | Fetscher et al. |
| 3,545,173 | A | 12/1970 | Christine et al. |
| 3,838,805 | A | 10/1974 | Amberg |
| 4,098,058 | A | 7/1978 | Carrigan et al. |
| 4,282,698 | A | 8/1981 | Zimmermann |
| 4,319,441 | A | 3/1982 | Credle |
| 4,345,412 | A | 8/1982 | Balzer et al. |
| 4,590,975 | A | 5/1986 | Credle, Jr. |
| 4,738,290 | A | 4/1988 | Ciekanski |
| 4,944,337 | A | 7/1990 | Credle, Jr. et al. |
| 4,949,526 | A | 8/1990 | Brogna et al. |
| 4,951,719 | A | 8/1990 | Wiley et al. |
| 4,961,447 | A | 10/1990 | Credle, Jr. et al. |
| 4,989,753 | A | 2/1991 | Brogna et al. |
| 5,000,345 | A | 3/1991 | Brogna et al. |
| 5,058,630 | A | 10/1991 | Wiley et al. |
| 5,249,410 | A | 10/1993 | Bakker et al. |
| 5,350,082 | A | 9/1994 | Kiriakides, Jr. et al. |
| 5,996,316 | A | 12/1999 | Kirschner |
| 6,045,007 | A | 4/2000 | Simmons |
| 6,053,359 | A | 4/2000 | Goulet et al. |
| 6,102,246 | A | 8/2000 | Goulet et al. |
| 6,152,325 | A | 11/2000 | Edwards |
| 6,286,720 | B1 | 9/2001 | Simmons et al. |
| 6,345,729 | B1 | 2/2002 | Santy, Jr. |
| 6,418,701 | B1 | 7/2002 | Navarro |
| 6,442,954 | B1 | 9/2002 | Shapiro et al. |
| 6,490,845 | B1 | 12/2002 | Tyreman |
| 6,607,096 | B2 | 8/2003 | Glass et al. |
| 6,940,845 | B2 | 9/2005 | Benveniste |
| 6,983,863 | B2 | 1/2006 | Santy, Jr. |
| 7,089,718 | B2 | 8/2006 | Biba et al. |
| 7,168,593 | B2 | 1/2007 | Schroeder et al. |
| 7,334,706 | B2 | 2/2008 | Schroeder et al. |
| 7,373,784 | B2 | 5/2008 | Haskayne |
| 7,600,360 | B2 | 10/2009 | Schroeder et al. |
| 7,624,895 | B2 | 12/2009 | Haskayne |
| 7,669,732 | B2 | 3/2010 | Njaastad |
| 7,810,676 | B2 | 10/2010 | Romanyszyn et al. |
| 7,813,834 | B2 | 10/2010 | Sudolcan et al. |
| 7,997,048 | B2 | 8/2011 | Bernhard |
| 8,006,464 | B2 | 8/2011 | Krulitsch |
| 8,025,184 | B2 | 9/2011 | Minard et al. |
| 8,091,737 | B2 | 1/2012 | Smeller et al. |
| D657,369 | S | 4/2012 | Hecht et al. |
| D657,370 | S | 4/2012 | Hecht et al. |
| D657,371 | S | 4/2012 | Hecht et al. |
| 8,225,960 | B2 | 7/2012 | Njaastad et al. |
| 8,245,488 | B2 | 8/2012 | Dunn |
| 8,448,823 | B2 | 5/2013 | Engels et al. |
| 8,490,834 | B2 | 7/2013 | Edwards et al. |
| 8,511,478 | B2 | 8/2013 | Terzini |
| 8,606,396 | B2 | 12/2013 | Claesson et al. |
| 8,607,831 | B2 | 12/2013 | Doglioni Majer |
| 8,756,950 | B2 | 6/2014 | Brunner et al. |
| 8,807,392 | B2 | 8/2014 | Smeller et al. |
| 9,010,579 | B2 | 4/2015 | Baker et al. |
| 9,045,323 | B2 | 6/2015 | Crane et al. |
| 9,132,929 | B2 | 9/2015 | Nash |
| 9,141,562 | B2 | 9/2015 | Pickett et al. |
| 9,204,734 | B2 | 12/2015 | Jablonski et al. |
| 9,227,830 | B2 | 1/2016 | Angus et al. |
| 9,242,776 | B2 | 1/2016 | Mikula |
| 9,285,149 | B2 | 3/2016 | Bamberger et al. |
| 9,290,371 | B2 | 3/2016 | Crane et al. |
| 9,327,958 | B2 | 5/2016 | Angus et al. |
| 9,346,659 | B2 | 5/2016 | Brown |
| 9,364,114 | B2 | 6/2016 | Claesson et al. |
| 9,511,988 | B2 | 12/2016 | Hernandez et al. |
| 9,566,776 | B2 | 2/2017 | Mikula |
| 9,588,608 | B2 | 3/2017 | Hecht et al. |
| 9,622,615 | B2 | 4/2017 | Hecht et al. |
| 9,624,460 | B2 | 4/2017 | Wunder |
| 9,643,828 | B2 | 5/2017 | Brown et al. |
| 9,656,226 | B2 | 5/2017 | Solera et al. |
| 9,656,849 | B2 | 5/2017 | Hawken |
| 9,675,206 | B2 | 6/2017 | Minard |
| 9,878,891 | B2 | 1/2018 | Balzarin et al. |
| 9,932,216 | B2 | 4/2018 | Hernandez et al. |
| 9,944,472 | B2 | 4/2018 | Crane et al. |
| 9,994,340 | B2 | 6/2018 | Angus et al. |
| 10,005,655 | B2 | 6/2018 | Broen et al. |
| 10,012,345 | B2 | 7/2018 | Derby et al. |
| 10,031,505 | B2 | 7/2018 | Martindale et al. |
| 10,182,587 | B2 | 1/2019 | Lundberg et al. |
| 10,183,854 | B2 | 1/2019 | Tuyls et al. |
| 10,239,742 | B2 | 3/2019 | Dresser et al. |
| 10,351,409 | B2 | 7/2019 | Smeller et al. |
| 10,407,292 | B2 | 9/2019 | Hecht et al. |
| 10,442,671 | B2 | 10/2019 | Hecht et al. |
| 10,489,868 | B2 | 11/2019 | Long, II |
| 10,494,246 | B2 | 12/2019 | Hecht et al. |
| 10,507,941 | B2 | 12/2019 | Seversky et al. |
| 10,577,235 | B2 | 3/2020 | Hecht et al. |
| 10,626,003 | B2 | 4/2020 | Wyatt et al. |
| 10,654,700 | B2 | 5/2020 | Hecht |
| 10,654,703 | B2 | 5/2020 | Hecht et al. |
| 10,676,337 | B2 | 6/2020 | Hecht |
| 10,689,240 | B1 | 6/2020 | Schultz et al. |
| 10,689,241 | B2 | 6/2020 | Dresser et al. |
| 10,752,448 | B2 | 8/2020 | Yoder et al. |
| 10,865,093 | B2 | 12/2020 | Yang |
| 10,988,270 | B2 | 4/2021 | Gorbatenko et al. |
| 11,053,109 | B2 | 7/2021 | Knight et al. |
| 11,116,352 | B2 | 9/2021 | Herbert et al. |
| 11,208,313 | B2 | 12/2021 | Conover et al. |
| 11,208,316 | B2 | 12/2021 | Dresser et al. |
| 11,305,977 | B2 | 4/2022 | O'Nan et al. |
| 11,311,138 | B2 | 4/2022 | Huang et al. |
| 11,338,444 | B2 | 5/2022 | Ostrow et al. |
| 11,358,742 | B2 | 6/2022 | Vari |
| 11,440,785 | B2 | 9/2022 | Schultz et al. |
| 11,472,579 | B2 | 10/2022 | Cittadino et al. |
| 11,548,667 | B2 | 1/2023 | Cittadino et al. |
| 11,629,042 | B2 | 4/2023 | Robinson et al. |
| 11,738,987 | B2 | 8/2023 | Degnan et al. |
| 11,794,998 | B2 | 10/2023 | Sirbu Villa |
| 11,802,038 | B2 | 10/2023 | Cole |
| 11,814,278 | B2 | 11/2023 | Conover et al. |
| 11,897,748 | B2 | 2/2024 | Kleinrichert |
| 11,897,751 | B2 | 2/2024 | Robinson et al. |
| 2003/0192912 | A1 | 10/2003 | Chadwell et al. |
| 2004/0168465 | A1 | 9/2004 | Renken et al. |
| 2008/0164274 | A1 | 7/2008 | Stettes |
| 2010/0223888 | A1 | 9/2010 | Aarts |
| 2011/0153066 | A1 | 6/2011 | Terzini |
| 2011/0260828 | A1 | 10/2011 | Zhang et al. |
| 2013/0282164 | A1 | 10/2013 | Veloo |
| 2017/0293983 | A1 | 10/2017 | Long |
| 2018/0273369 | A1 | 9/2018 | Joseph |
| 2019/0352161 | A1 | 11/2019 | Knight et al. |
| 2020/0255278 | A1 | 8/2020 | O'nan et al. |
| 2020/0270115 | A1 | 8/2020 | Schultz et al. |
| 2020/0316785 | A1 | 10/2020 | Ostrow et al. |
| 2020/0317498 | A1 | 10/2020 | Dresser et al. |
| 2021/0087045 | A1 | 3/2021 | Carignan et al. |
| 2021/0206617 | A1 | 7/2021 | Maharaj et al. |
| 2021/0292016 | A1 | 9/2021 | Peters et al. |
| 2022/0089424 | A1 | 3/2022 | Dirik et al. |
| 2022/0106181 | A1 | 4/2022 | Miller et al. |
| 2022/0267135 | A1 | 8/2022 | Degnan et al. |
| 2022/0274726 | A1 | 9/2022 | Vari |
| 2022/0289547 | A1 | 9/2022 | Richardson |

(56) References Cited

U.S. PATENT DOCUMENTS

| | | | | |
|---|---|---|---|---|
| 2023/0045788 | A1 | 2/2023 | Cittadino et al. | |
| 2023/0096441 | A1 | 3/2023 | Wach et al. | |
| 2023/0141811 | A1* | 5/2023 | Dresser ................ | B67D 1/0892 141/174 |
| 2023/0348256 | A1 | 11/2023 | Degnan et al. | |
| 2023/0377406 | A1 | 11/2023 | Edwards | |
| 2024/0034609 | A1 | 2/2024 | Lange et al. | |
| 2024/0034611 | A1 | 2/2024 | Cavazos et al. | |
| 2024/0076180 | A1 | 3/2024 | Degnan et al. | |
| 2024/0270427 | A1 | 8/2024 | Thomas et al. | |
| 2024/0359964 | A1 | 10/2024 | Thomas et al. | |

FOREIGN PATENT DOCUMENTS

| | | | |
|---|---|---|---|
| JP | 2010-163211 | A | 7/2010 |
| JP | 2018176294 | A | 11/2018 |
| KR | 200285575 | Y | 8/2002 |
| WO | 2010022336 | A2 | 2/2010 |
| WO | 2014115073 | A1 | 7/2014 |
| WO | 2017134431 | A1 | 8/2017 |
| WO | 2019177476 | A1 | 9/2019 |
| WO | 2019222144 | A1 | 11/2019 |
| WO | WO-2023/049795 | A1 | 3/2023 |
| WO | WO-2023/158764 | A1 | 8/2023 |
| WO | WO-2024/032682 | A1 | 2/2024 |

OTHER PUBLICATIONS

PCT International Search Report & Written Opinion of the International Searching Authority; PCT/US2023/062412; Nov. 3, 2023; 12 pages.

PCT International Search Report & Written Opinion of the International Searching Authority; PCT/US2023/022550; Jan. 24, 2024; 10 pages.

Office Action dated Jan. 23, 2024; U.S. Appl. No. 18/345,810, filed Jun. 30, 2023; 26 pages.

Degnan, Nicholas Michael; U.S. Appl. No. 18/345,810, filed Jun. 30, 2023; Title: Automated Beverage Dispensing System and Method; 100 pages.

Thomas, Aaron; U.S. Appl. No. 18/167,630, filed Feb. 10, 2023; Title: Automated Beverage Dispenser System and Method; 119 pages.

Miso Robotics; "SIPPY—The World's First POS-Integrated Automatic Beverage Dispenser and Sealer"; Retrieved from: https://misorobotics.com/sippy/; Jun. 22, 2021; 5 pages.

Notice of Allowance dated Dec. 14, 2022; U.S. Appl. No. 17/680,120, filed Feb. 24, 2022; 23 pages.

Notice of Allowance dated Apr. 5, 2023; U.S. Appl. No. 17/680,120, filed Feb. 24, 2022; 14 pages.

PCT International Search Report & Written Opinion of the International Searching Authority; PCT/US2022/017768; Jun. 17, 2022; 7 pages.

Cornelius Inc. "ABS 2.0 Illustrated Parts List", Cornelius ABS 2.0 Product Manual, Jul. 24, 2019.

Foreign Action other than Search Report on JP Dtd Jun. 28, 2024.

Foreign Search Report on EP Dtd Jan. 16, 2025.

Japan Office Action (Notice of Reasons for Rejection Dtd Jun. 26, 24) re Japan Appl No. 2023-551197.

Non-Final Office Action on U.S. Appl. No. 18/167,630 Dtd Jun. 10, 2024.

Notice of Allowance on U.S. Appl. No. 18/167,630 Dtd Nov. 12, 2024.

US Notice of Allowance on US Dtd Feb. 21, 2024.

* cited by examiner

AUTOMATED BEVERAGE DISPENSER SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Restaurants and other dining facilities may distribute large numbers of beverages to patrons during periods of operation. As a result, dining facilities may have a beverage fountain or other similar system that may be used by patrons and/or employees to efficiently produce beverages.

BRIEF DESCRIPTION OF THE DRAWINGS

For a detailed description of various exemplary embodiments, reference will now be made to the accompanying drawings in which.

DETAILED DESCRIPTION

Figure 1:
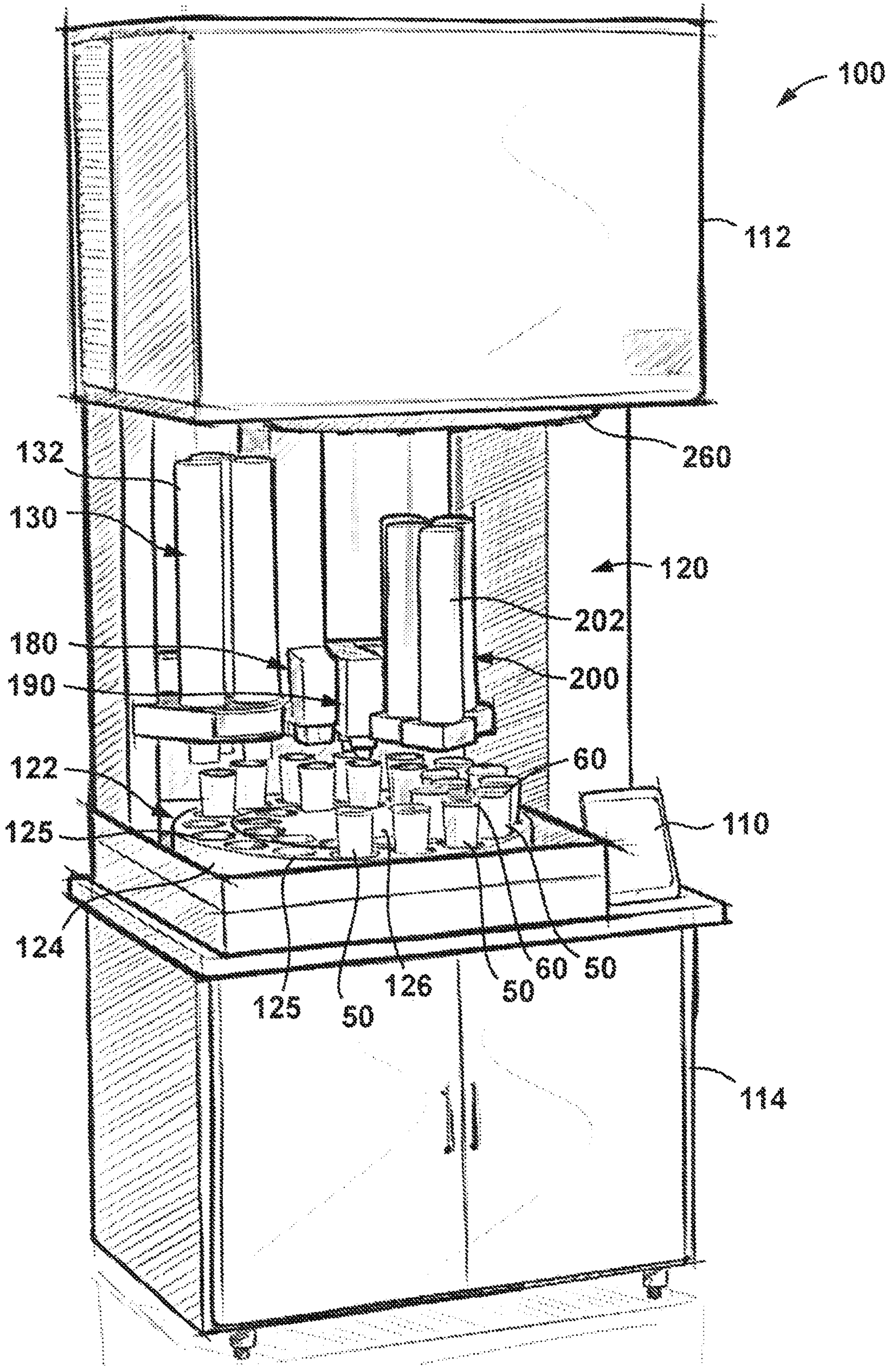
FIG. 1 is a perspective view of a beverage production system according to some embodiments.

The following discussion is directed to various embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, beverages may be produced at a restaurant or dining facility with a beverage fountain or other similar system. However, many such devices require physical human interaction for many (or all) of the steps of the beverage production process. For instance, when producing beverages at a beverage fountain, a server, customer, etc. may still be required to fetch a cup, align and hold the cup under the nozzle of the selected beverage type, and engage or otherwise interact with the device to cause the desired beverage to be dispensed. Each of these additional, manual interactions may add time and complexity to the beverage production process and may therefore reduce the efficiency of food service operations overall.

Accordingly, embodiments disclosed herein include beverage production systems and related methods that may further enhance the efficiency of the beverage production and distribution process by automating many, most, or substantially all of the steps for producing a beverage. Thus, through use of the embodiments disclosed herein, the number of manual steps that may be necessary for fulfilling beverage orders may be reduced, thereby increasing the efficiency of the beverage production process and improving food service operations overall.

Referring now to FIG. 1, a beverage production system 100 according to some embodiments is shown. As will be described in more detail below, beverage production system 100 may be used to automatically prepare and dispense complete or substantially complete beverages during operations thereby reducing the number of manual actions performed by servers, customers, etc. In general, beverage production system 100 includes an ice chamber 112, a cabinet 114, and a beverage handling assembly 120 positioned between the ice chamber 112 and cabinet 114.

Figure 2:
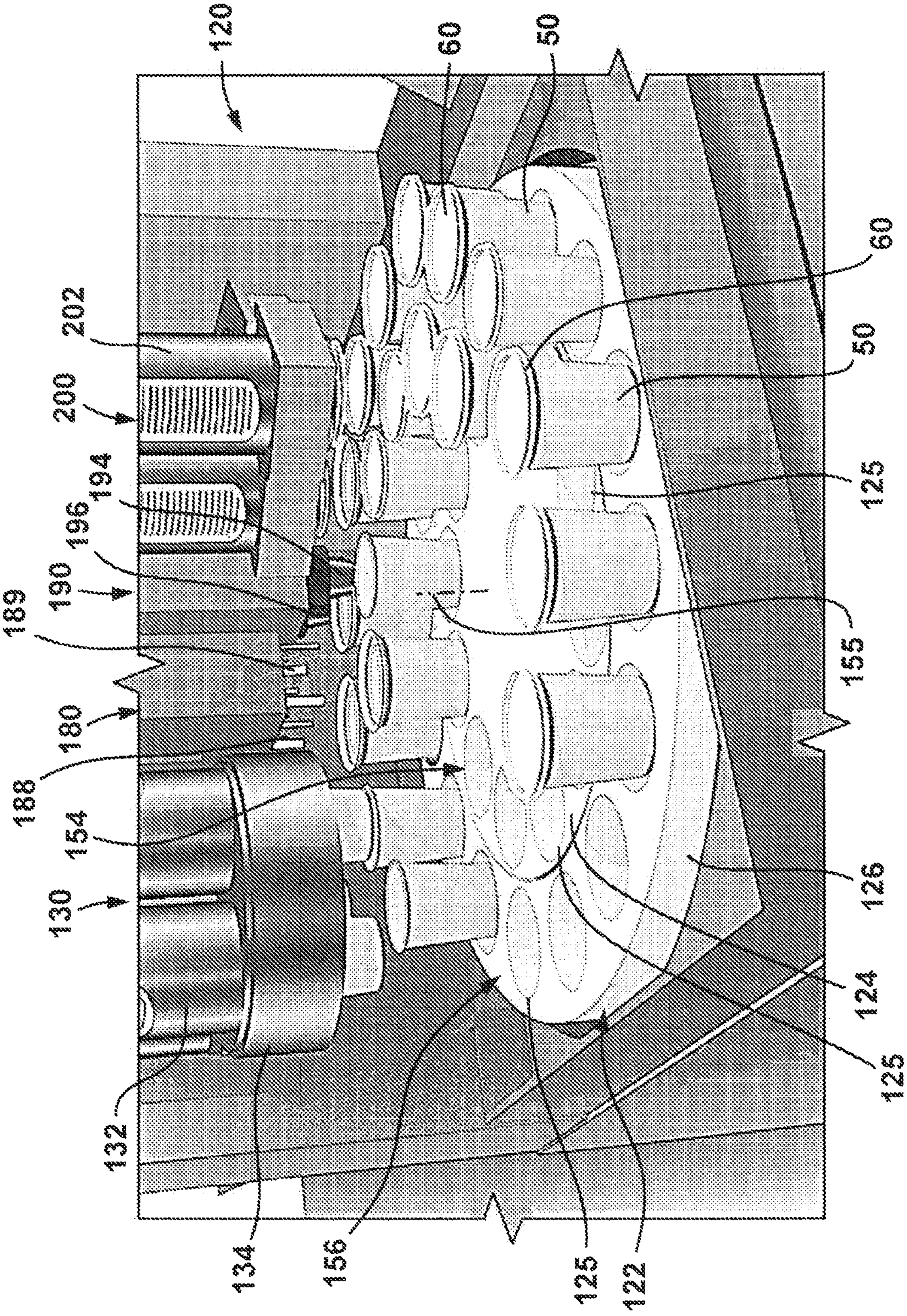
FIG. 2 is a perspective view of the beverage handling assembly of the beverage production system of FIG. 1 according to some embodiments.

Referring now to FIGS. 1 and 2, beverage handling assembly 120 includes a plurality of stations for performing various stages or steps of the beverage production process. In particular, beverage handling assembly 120 includes a cup dispensing station 130, an ice dispensing station 180, a beverage dispensing station 190, and a lidding station 200. Beverages may be produced by progressing through the stations 130, 180, 190, 200 with a turntable assembly 122.

Figure 3:
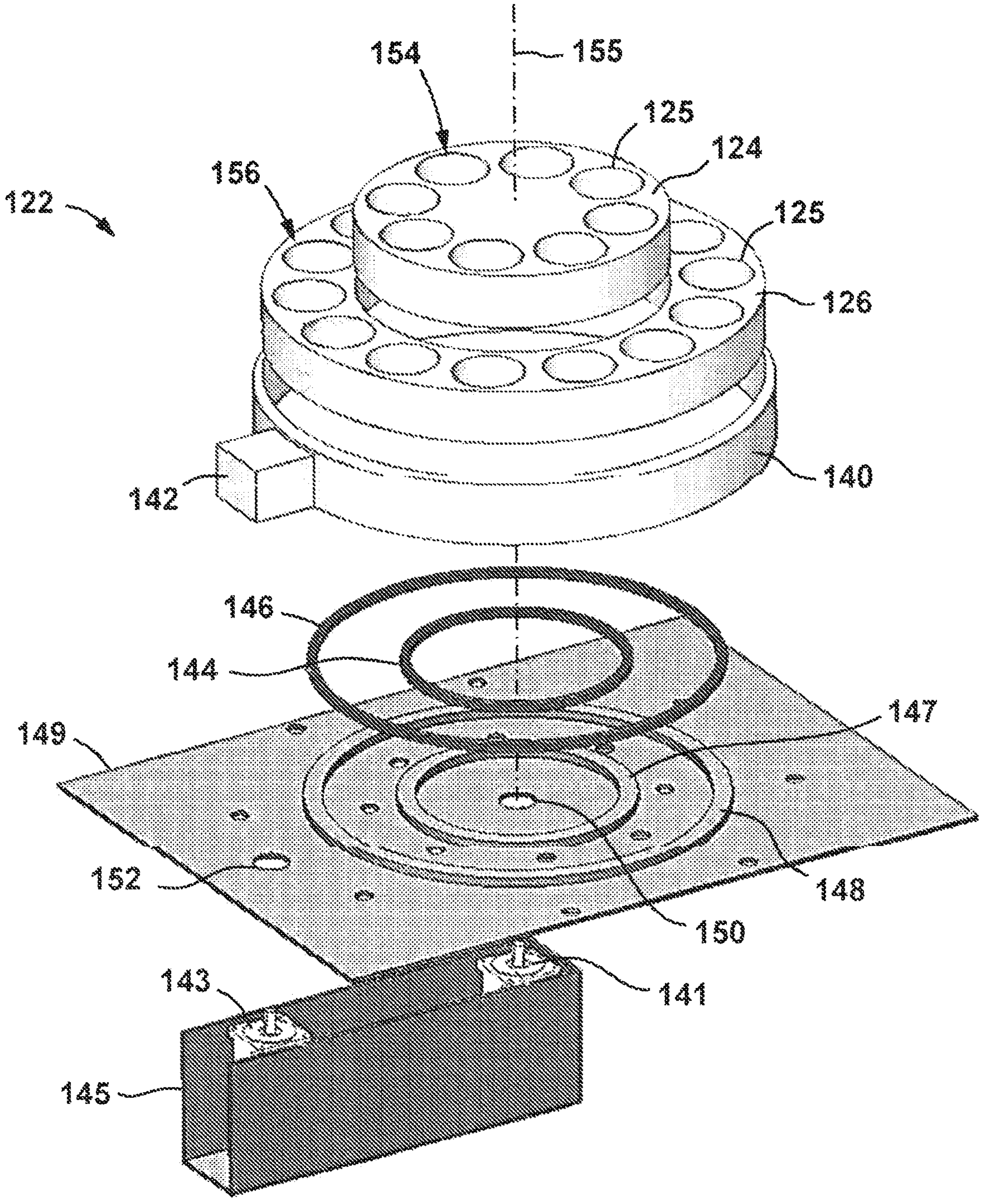
FIG. 3 is an exploded view of the turntable assembly of the beverage production system of FIG. 1 according to some embodiments.

Referring now to FIGS. 2 and 3, turntable assembly 122 includes a central axis 155 and a pair of concentric turntables 124, 126. Specifically, turntable assembly 122 includes an inner turntable 124 and an outer turntable 126 disposed circumferentially about the inner turntable 124. The inner turntable 124 includes and defines a first or inner row 154 of cup receptacles 125, and the outer turntable 126 includes and defines a second or outer row 156 of cup receptacles 125. Both the inner row 154 and the outer row 156 extend annularly about a central axis 155, with the inner row 154 being disposed radially inward of the outer row 156. In particular, in some embodiments, the first row 154 and the second row 156 extends circumferentially about the central axis 155 such that the cup receptacles 125 of rows 154, 156 are arranged in concentric circles about axis 155.

Referring specifically to FIG. 3, the inner turntable 126 and outer turntable 124 are supported by a base plate 149. More particular, the base plate 149 includes a pair of circumferential rails 148, 147 that support the turntables 124, 126, respectively, via a pair of bearings 144, 146, respectively. The bearings 144, 146 may facilitate rotation of the turntables 124, 126, respectively, about central axis 155 relative to base plate 149 during operation. In some embodiments, bearings 144, 146 may comprise wheels, sliding surfaces, and/or other suitable components or features to facilitate movement (e.g., rotation) of the turntables 124, 126 relative to base plate 149. In other embodiments, the inner turntable 126 may be supported by a shaft (not shown) and the outer turntable 124 is supported along an outer diameter of the outer turntable 124 by a support structure (not shown) of the beverage production system 100.

Inner turntable 124 and outer turntable 126 are received within an outer housing 140 that is in turn mounted on base plate 149 to conceal rails 147, 148, and bearings 144, 146. A gearbox 142 is mounted to outer housing 140 that includes one or more gears (not shown) that mesh with gear teeth or other suitable structures formed on outer turntable 126. In other embodiments, either or both the outer turntable 126 and inner turntables 124 may be driven by a rubber wheel (not shown) frictionally engaged on an outside or with other portions of the turntables 124 and/or 126.

A first driver 141 and a second driver 143 are supported in a housing 145 that is coupled to base plate 149 on a side that is opposite from the turntables 124, 126 and outer housing 140. However, in other embodiments (not shown), the second driver 143 may be mounted on the same side as the as the turntables 124, 126. In the present embodiment, an output shaft of the first driver 141 extends through a first aperture 150 in the base plate 149 to couple with the inner turntable 124, and an output shaft of the second driver 143 extends through a second aperture 152 in base plate 149 to engage with the gears within the gearbox 142. In some embodiments, the drivers 141, 143 may comprise electric motors; however, in other embodiments, the drivers 141, 143 may comprise pneumatic motors, hydraulic motors, etc.

During operations, the drivers 141, 143 may be energized to rotate the turntables 124, 126, respectively, about the central axis 155. In particular, the first driver 141 may be energized to rotate the inner turntable 124 about axis 155; and the second driver 143 may be energized to rotate the outer turntable 126 about axis 155 via the gears (not shown) within gearbox 142. Referring back to FIGS. 1 and 2, the rotation of turntables 124, 126 about axis 155 may selectively progress beverages through the stations 130, 180, 190, 200 within beverage handling assembly 120. Because the turntables 124, 126 are rotated about axis 155 via separate drivers (e.g., drivers 141, 143 shown in FIG. 3), the turntables 124, 126 may be rotated about axis 155 independently from one another about axis 155 during operations. Without being limited to this or any other theory, independent rotation of turntables 124, 126 may provide redundancy to beverage production system 100 in case of failure of one or more components thereof. In addition, independent rotation of turntables 124, 126 may allow beverage production to be subdivided and organized via rows 154, 156. For instance, the rows 154, 156 may be arranged to produce beverages for different sources (e.g., drive through orders vs. dine-in orders), and/or may be used to produce different beverage types (e.g., carbonated vs. non-carbonated, hot vs. cold). Further details of embodiments of the stations 130, 180, 190, 200 are now described below.

Figure 4:
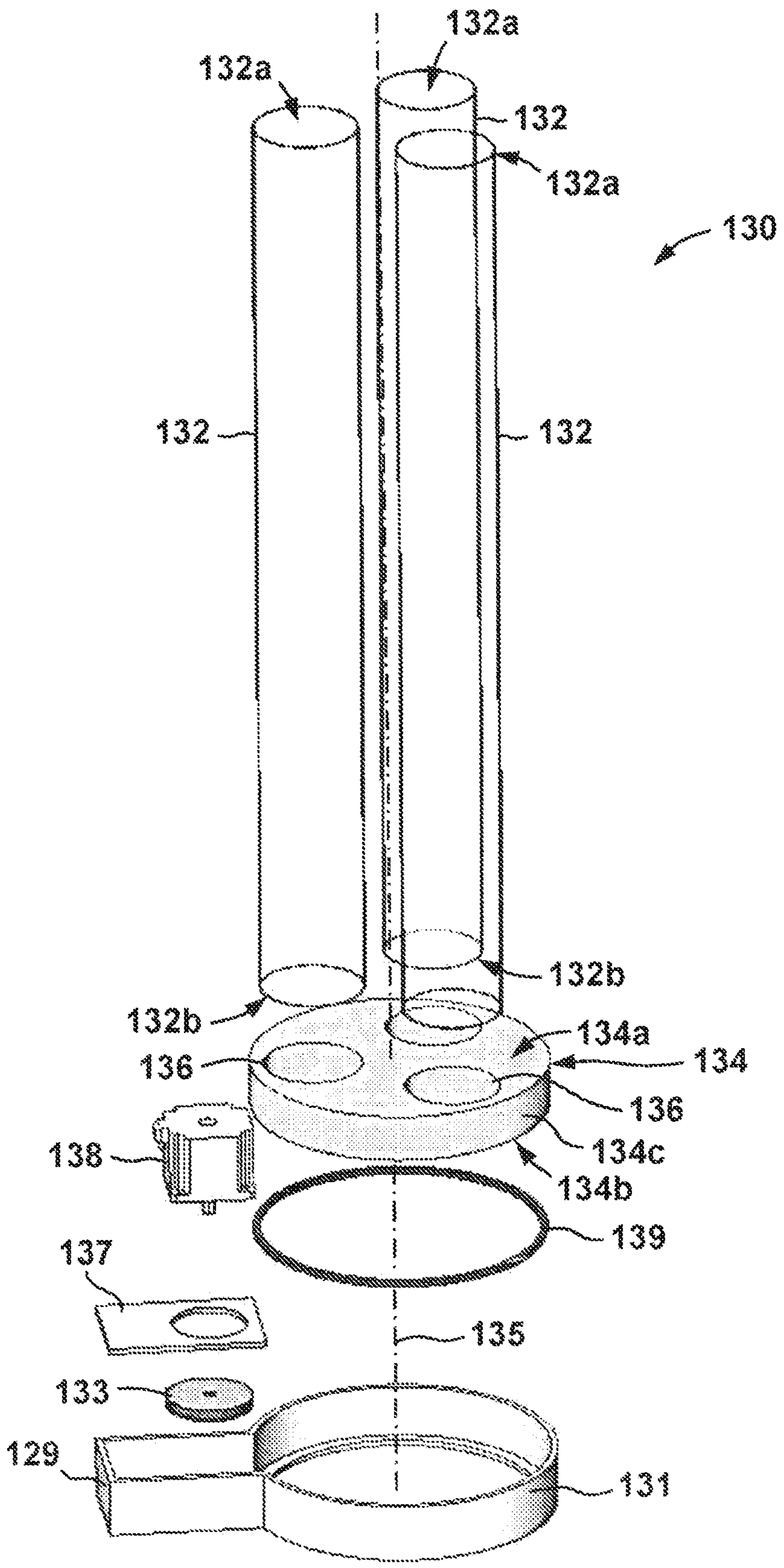
FIG. 4 is an exploded view of a cup dispensing station of the beverage production system of FIG. 1 according to some embodiments.

Referring now to FIGS. 1 and 4, in some embodiments cup dispensing station 130 includes a central axis 135, a dispenser 134, and a plurality of tubular magazines 132 coupled to and extending axially from dispenser 134 with respect to axis 135. Each magazine 132 includes a first or upper end **132*a* and a second or lower end 132*b* opposite upper end 132*a*. The lower end 132*b* is coupled to a corresponding receptacle 136 in dispenser 134, and upper end 132*a* is axially projected away from dispenser 134. Each magazine 132 may receive and store a plurality of stacked cups 50. In some embodiments, cups 50 may be loaded into magazines 132 from upper end 132*a*. In some embodiments, magazines 132 may be de-coupled from dispenser 134 to facilitate loading of cups 50 therein. In other embodiments (not shown), the outer configuration of the plurality of tubular magazines 132 may not be round but instead be hexagonal or other shapes and may include an opening on the side of the tubular magazine 132 to receive cups such that the cups may be loaded from the side instead of the top or bottom. In such embodiment, the hexagonal or other shape may retain the cups based on the geometry of the open-faced tubular magazines 132**.

Dispenser 134 is a generally cylindrical member that includes a first or upper side **134*a*, a second or lower side 134*b* opposite upper side 134*a*, and a cylindrical outer surface 134*c* extending axially between sides 134*a*, 134*b*. The receptacles 136 extend axially through dispenser 134 between sides 134*a*, 134*b* with respect to axis 135. Magazines 132 are engaged within receptacles 136 on upper side 134*a*, such that during operations, cups 50 that are dispensed from magazines 132 move through receptacle 136 and are ejected from lower side 134***b*.

Dispenser 134 is positioned within a housing 131. During operations, dispenser 134 may rotate within housing 131 about axis 135. A bearing 139 may be inserted within housing 131 to engage with lower side 134*b* of dispenser 134 and therefore facilitate the rotation of dispenser 134 about axis 135 during operations. A driver 138 may be coupled to one or more gears 133 positioned within a gearbox 129 of housing 131. In some embodiments, driver 138 comprises an electric motor; however, in other embodiments, the driver 138 may comprise a pneumatic motor, a hydraulic motor, etc. The one or more gears 133 may be coupled (e.g., meshed) with gear teeth or other suitable structures on the cylindrical outer surface 134*c* of dispenser 134. A top plate 137 may cover gearbox 129 and driver 138 may be supported on top plate 137. In other embodiments, the dispenser 134 may be driven by a timing belt pulley (not shown) engaged with a top portion of the dispenser 134.

Referring still to FIGS. 1 and 4, during operations, driver 138 may rotate dispenser 134 about axis 135 via the one or more gears 133. Specifically, driver 138 may rotate dispenser 134 to align selected ones of the magazines 132 and receptacles 136 in dispenser 134 with the rows 154, 156 of cup receptacles 125 on turntable assembly 122. In some embodiments, the magazines 132 may hold different sizes and/or types of cups that may be selectively aligned with the rows 154, 156 to produce the desired beverages during operations.

Figure 5:
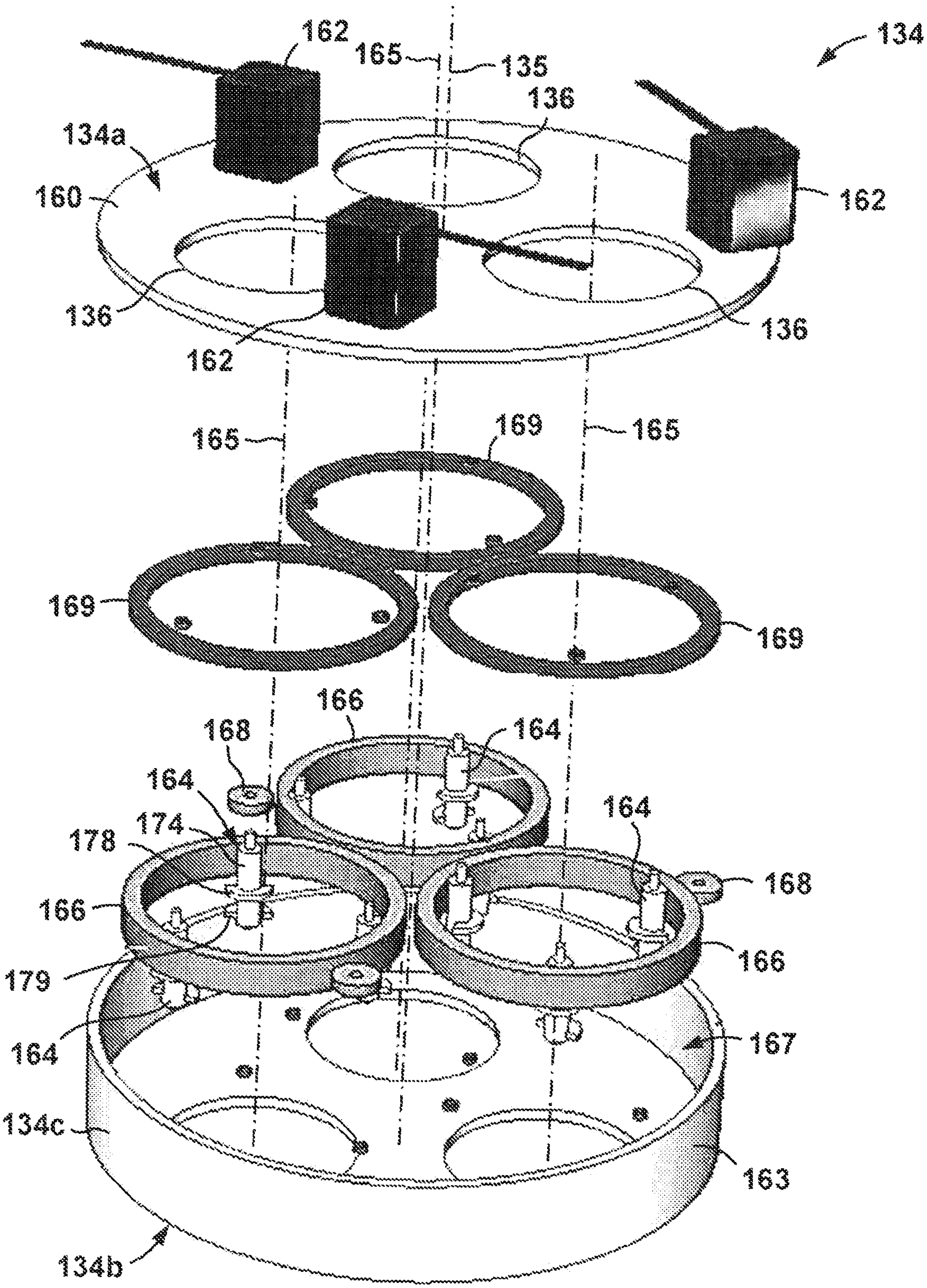
FIG. 5 is an exploded view of the dispenser of the cup dispensing station of FIG. 4 according to some embodiments.

Referring now to FIG. 5, in some embodiments dispenser 134 includes an outer housing 163 that defines an internal chamber 167. A cap 160 may be fitted to the housing 163 to close off the chamber 167 and to conceal the components disposed therein (described in more detail below). The cap 160 may define upper side 134*a*, and housing 163 may define lower side 134*b* and cylindrical outer surface 134*c* of dispenser 134.

A plurality of ring gears 166 are disposed within chamber 167 and aligned with each of the receptacles 136 along a corresponding axis 165. A driving gear 168 is engaged (e.g., meshed) with gear teeth or other suitable structures on a radially outer surface of each of the ring gears 166. Driving gears 168 are coupled to drivers 162 that may be mounted to cap 160. For instance, driving gears 168 may be engaged with output shafts (not shown) of drivers 162 that extend through suitable apertures (not shown) in cap 160. During operations, drivers 162 may rotate driving gears 168 to thereby drive rotation of the ring gears 166 about the corresponding axes 165. Bearings 169 may be installed within chamber 167 to facilitate and support the rotation of ring gears 166 about axs 165. In some embodiments, drivers 162 comprise electric motors; however, in other embodiments, the drivers 162 may comprise pneumatic motors, hydraulic motors, etc.

Each axis 165 is parallel to and radially offset from central axis 135. In some embodiments, axes 165 are evenly-circumferentially spaced about axis 135. In the embodiment of cup dispensing station 130 shown in FIGS. 4 and 5, there are a total of three magazines 132 and therefore three receptacles 136. As a result, the axes 165 are circumferentially spaced approximately 120° from one another about axis 135. In other embodiments, more or fewer than three magazines 132 may be included to accommodate a desired number of cup sizes or types.

Figure 7:
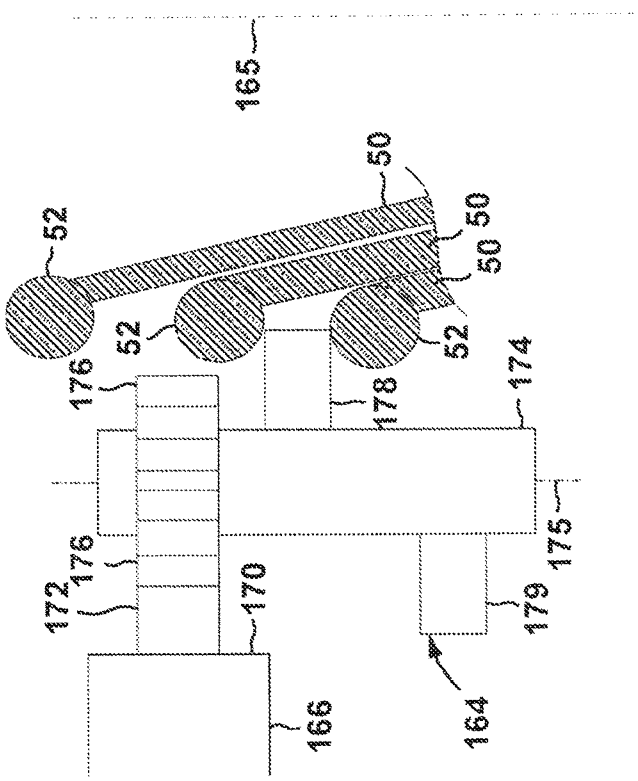
FIG. 7 is an enlarged side view of the ring gear and wedge assembly of FIG. 6 in a second position according to some embodiments.
Figure 6:
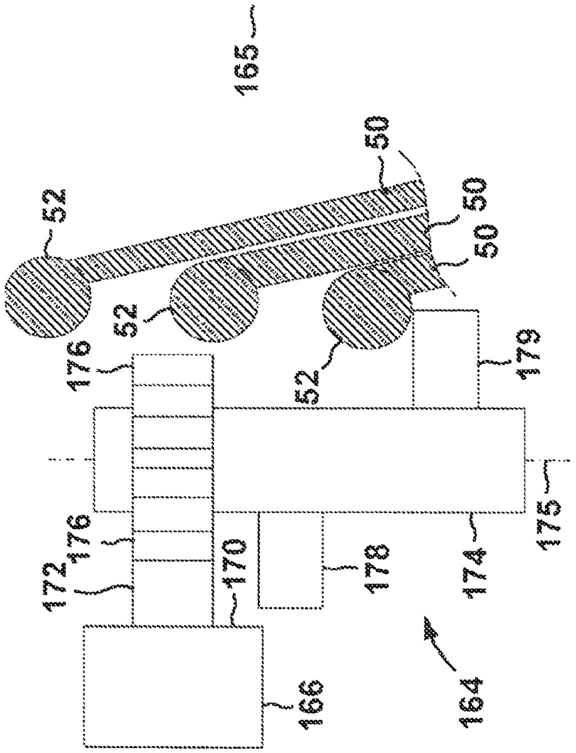
FIG. 6 is an enlarged side view of a ring gear and wedge assembly of the dispenser of FIG. 5 in a first position according to some embodiments.

A plurality of wedge members 164 are positioned within each ring gear 166. Referring now to FIGS. 6 and 7, each wedge member 164 includes a cylindrical body 174 including a central or longitudinal axis 175. Within each ring gear 166, the axes 175 of wedge members 164 may be parallel to and radially offset from axis 165. Body 174 includes a plurality of gear teeth 176 that extend circumferentially about axis 175. Teeth 176 may engage (e.g., mesh) with corresponding teeth 172 on the radially inner surface 170 of ring gears 166. Accordingly, the rotation of ring gears 166 about axes 165 results in rotation of wedge members 164 about axes 175 via engagement of teeth 172, 176.

A pair of wedges 178, 179 extend radially outward from body 174. Wedges 178, 179 may extend radially outward from radially opposite sides of body 174 with respect to axis 175. In some embodiments, wedges 178, 179 may extend circumferentially approximately 180° about body 174; however, wedges 178, 179 may extend circumferentially more or less than 180° about body 174 in some embodiments. In addition, the wedges 178, 179 are axially spaced from one another such that wedge 178 may be positioned axially above wedge 179 along axis 175. Accordingly, the wedge 178 may be referred to herein as a first or upper wedge 178 and the wedge 179 may be referred to herein as a second or lower wedge 179.

During operations, the wedge members 164 may rotate about axes 175 so as to engage wedges 178, 179 with cups 50 extending into receptacles 136 of dispenser 134. Generally speaking, the upper wedge 178 may engage between axially adjacent cups 50 to dislodge cups 50 from dispenser 134 when desired, and the lower wedges 179 may support the cups 50 within dispenser 134 when a cup 50 is not to be dispensed therefrom. In particular, during operations, each wedge member 164 may be transitioned between a first position shown in FIG. 6, and a second position shown in FIG. 7 in order to selectively dislodge and dispense cups 50 from dispenser 134. In the first position (FIG. 6), the lower wedge 179 may be circumferentially rotated about axis 175 so as to extend radially inward toward axis 165 and therefore cups 50. As a result, the lower wedge 179 of each wedge member 164 may engage with the lip 52 of the lowest cup 50 within dispenser 134 to prevent cups 50 from falling through dispenser 134 when wedge assemblies 164 are in the first position (FIG. 6).

When it is desired to dispense a cup 50 from dispenser 134, the wedge members 164 may be transitioned from the first position (FIG. 6) to the second position (FIG. 7) by rotating bodies 174 about axes 175 to thereby engage upper wedges 178 between the lips 52 of the two lowest cups 50 within dispenser 134. The upper wedges 178 may comprise axial widths (e.g., with respect to axes 175) that axially taper when moving circumferentially about body 174 so that as body 174 rotates about axis 175 from the first position (FIG. 6) to the second position (FIG. 7), the lips 52 of the adjacent cups 50 are gradually forced apart along axis 165, until the contact between the adjacent cups 50 is reduced to a point that the axially lowermost cup 50 may fall through receptacle 136 and into a cup receptacle 125 in one of the rows 154, 156 on turntable assembly 122 shown in FIGS. 1 and 2. When in the second position (FIG. 7), the un-dispensed cups 50 within dispenser 134 may be supported by the upper wedges 178.

Once the lowermost cup 50 has been dispensed from dispenser 134, the wedge assemblies 164 may then be again transitioned from the second position (FIG. 7) back to the first position (FIG. 6) by rotating bodies 174 about axes 175 to thereby re-align the lower wedges 179 within the cups 50. As the bodies 174 are rotated about axes 175 from the second position (FIG. 7) to the first position (FIG. 6), the cups 50 may fall downward along axis 165 so that the lip 52 of the lowest cup 50 within dispenser 134 engages with the lower wedges 179 as before. Accordingly, once the wedge assemblies 164 return to the first position (FIG. 6) the dispenser 134 is once again ready to dispense another cup 50 in the manner described above. In some embodiments, the wedge assemblies 164 may be transitioned from the first position (FIG. 6) to the second position (FIG. 7) and back to the first position (FIG. 6) via a continuous rotation of the bodies 174 about axes 175 (e.g., a full 360° about axes 175).

Figure 8:
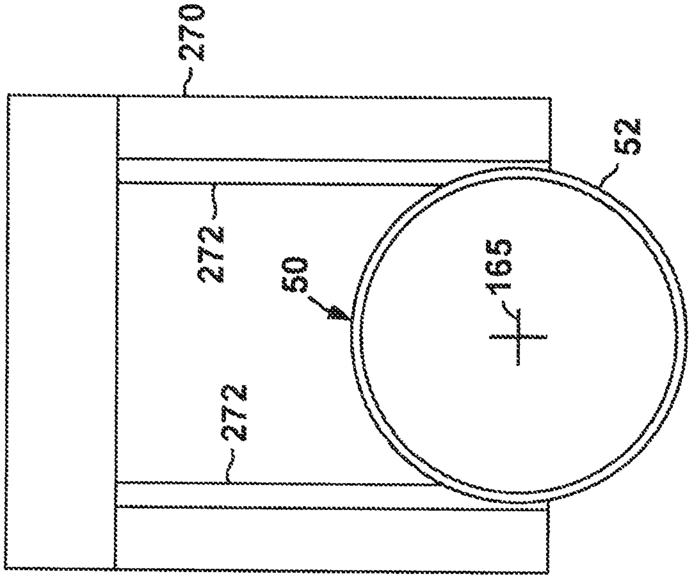
FIG. 8 is a top view of a wedge assembly that may be used within the cup dispensing station of the beverage production and dispensing system of FIG. 1 according to some embodiments.

While some particular examples of cup dispensing station 130 have been described above, it should be appreciated that various features of cup dispensing station 130 may be altered, replaced, or removed in various embodiments, and that some embodiments of cup dispensing station 130 may include additional features. For instance, referring to FIG. 8, in some embodiments, dispenser 134 may include one or more reciprocating wedge members 270 within and about the receptacles 136 in lieu of or in addition to the wedge members 164. Wedge member 270 includes one or more wedges 272 that may slidingly engage between axially adjacent cups 50 along lips 52 as wedge 270 is translated radially inward toward axis 165. The wedges 272 may include ramped or angled surfaces so that as wedge 270 translates radially inward toward axis 165, adjacent cups 50 are moved axially away from one another along axis 165 so that a lowermost cup 50 may be dislodged to fall through receptacle 136 as generally described above.

Figure 9:
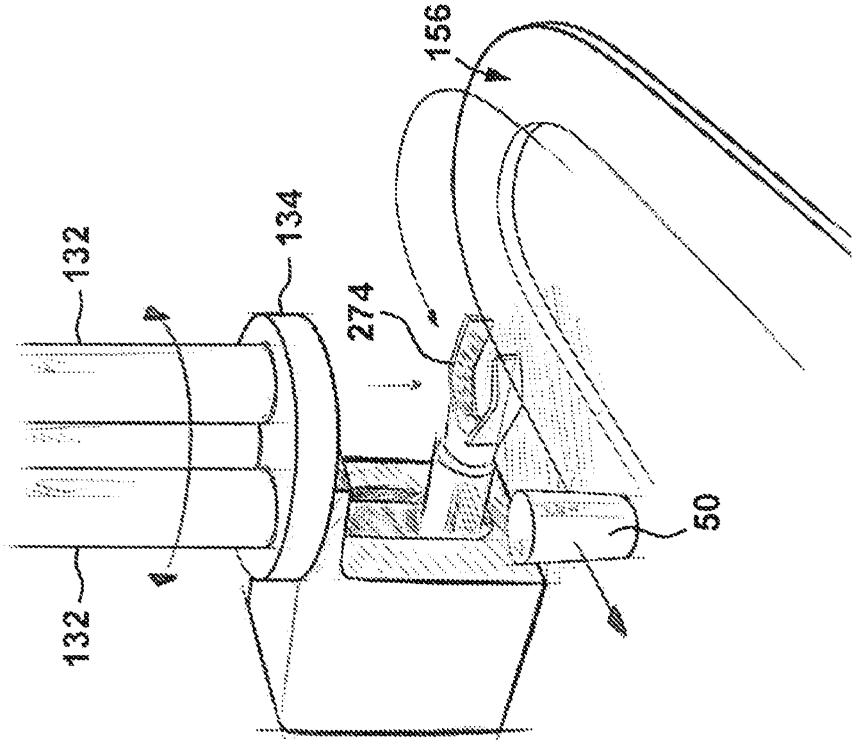
FIGS. 9-11 are perspective views of cup dispensing stations of the beverage production system of FIG. 1 according to some embodiments.

Referring now to FIG. 9, in some embodiments, cup dispensing station 130 may include a gripper arm 274 that may grasp cups 50 that extend through the dispenser 134 and pull them downward toward the turntable assembly 122 (note: only a schematic depiction of outer row 156 is provided in FIG. 9 to simplify the drawing).

Figure 10:
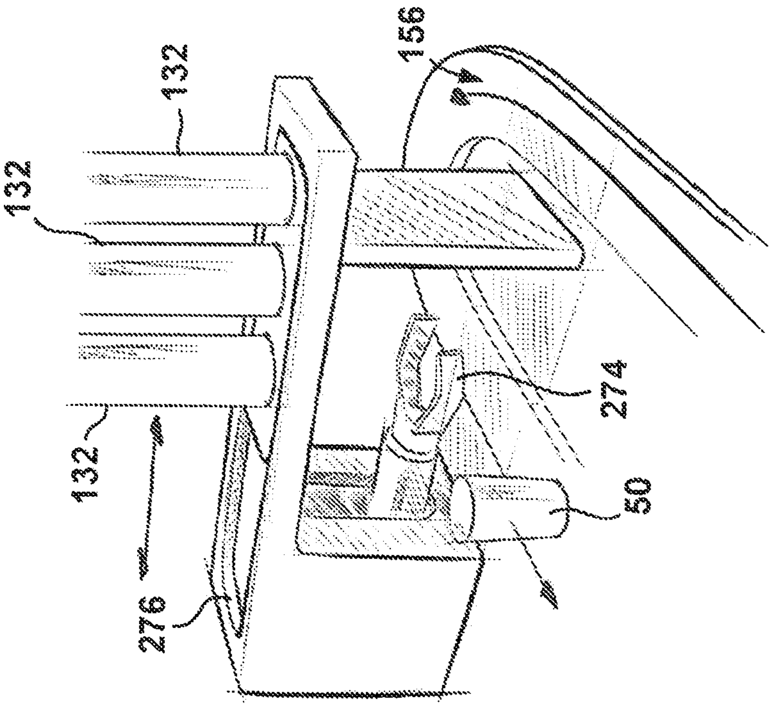

Referring now to FIG. 10, in some embodiments, magazines 132 may reciprocate linearly along a track 276 or other structure to selectively align magazines 132 with the rows 154, 156 of turntable assembly 122 (FIG. 2) (note: FIG. 10 again only includes a schematic representation of one of the rows 156 to simplify the drawings). In some of these embodiments, cups 50 may be dispensed from magazines 132 via any of the methods and systems described herein and/or other known methods and systems. FIG. 10 depicts the gripper arm 274 of FIG. 9 to illustrate some examples.

Figure 11:
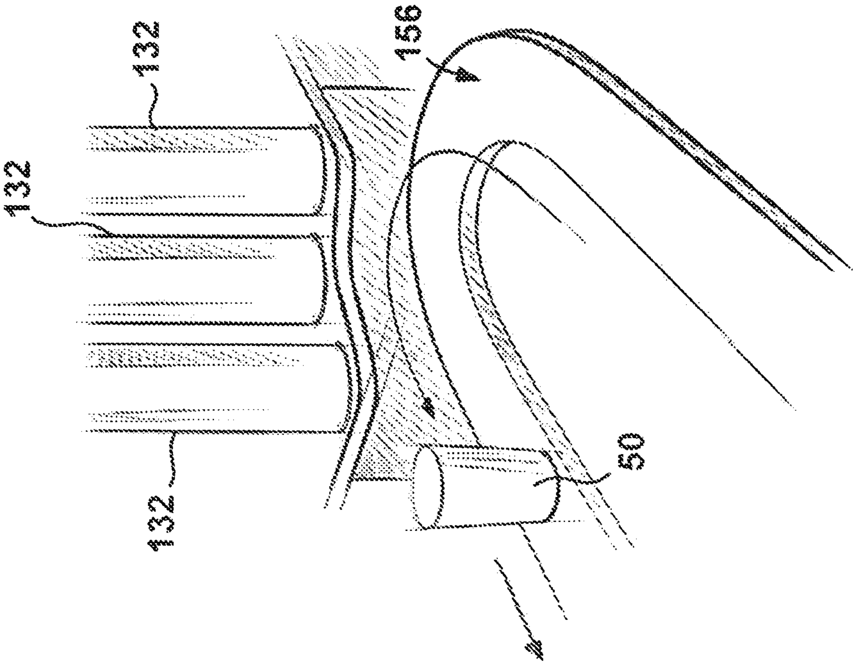

Referring now to FIG. 11, in some embodiments, magazines 132 may be fixed and aligned with the rows 154, 156 of turntable assembly 122 (FIG. 2). In some of these embodiments, additional magazines 132 may be included so as to allow different cup sizes and types to be dispensed onto each of the rows 154, 156 (note: FIG. 11 again only includes a schematic representation of one of the rows 156 to simplify the drawings). In some of these embodiments, cups 50 may be dispensed from magazines 132 via any of the methods and systems described herein.

Figure 12:
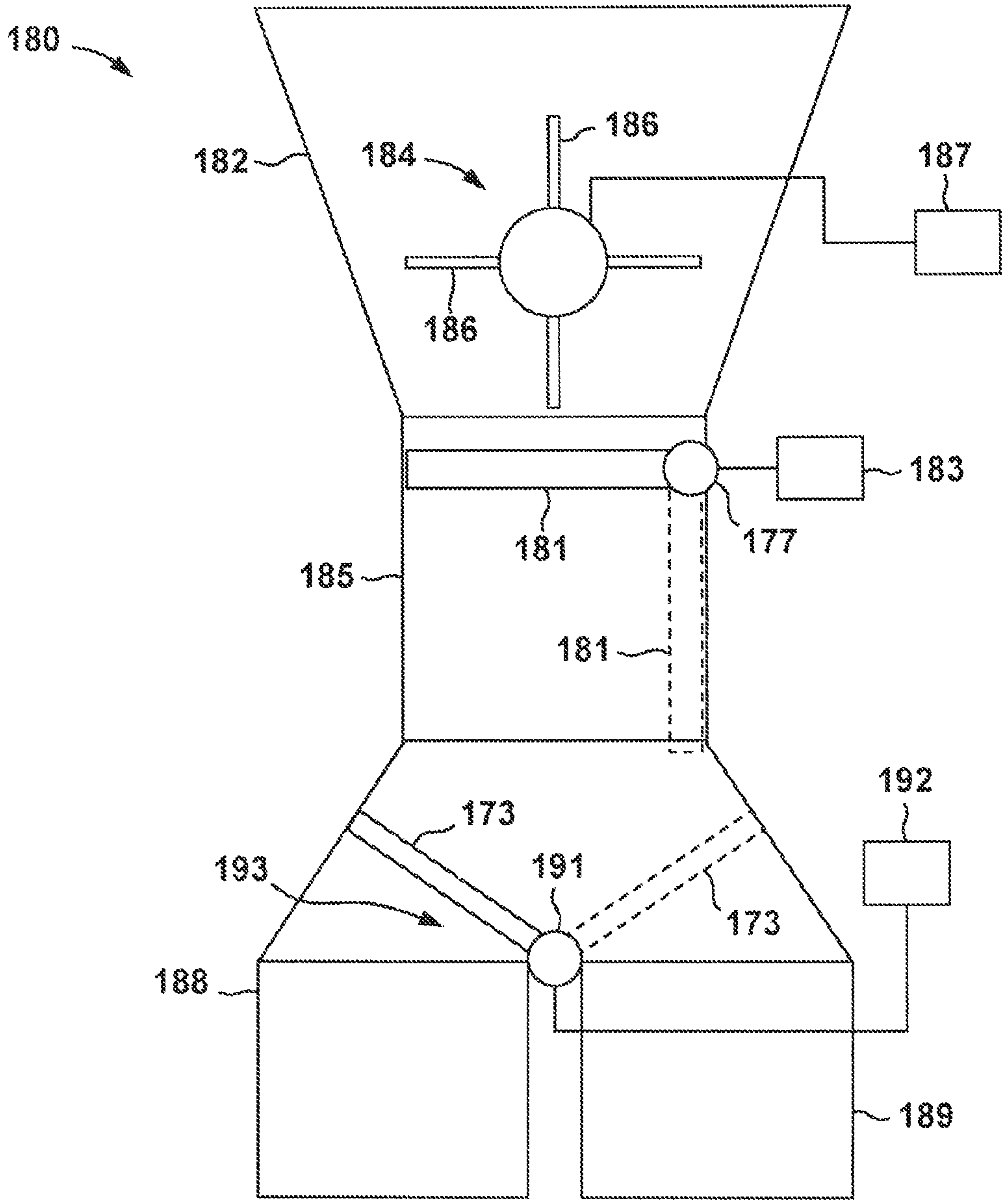
FIG. 12 is a schematic view of an ice dispensing station of the beverage production system of FIG. 1 according to some embodiments.

Referring again to FIG. 2, after a cup 50 is dispensed into the cup receptacles 125 of one or both of the rows 154, 156 of turntable assembly 122, the turntables 124, 126 are rotated about axis 155 to advance the empty cups 50 to the ice dispensing station 180. Referring now to FIG. 12, in some embodiments ice dispensing station 180 includes an inlet 182, a pair of outlets 188, 189, and a chute 185 positioned between the inlet 182 and the outlets 188, 189. The outlet 188 may be aligned with the inner row 154 of cup receptacles 125 (FIG. 2), and the outlet 189 may be aligned with the outer row 156 of cup receptacles 125 (FIG. 2).

Inlet 182 may be coupled to or may comprise part or all of the ice chamber 112 shown in FIG. 1. An agitator 184 is disposed within inlet 182. Agitator 184 includes a plurality of paddles 186 that are driven to rotate within inlet 182 by a driver 187. The engagement between the paddles 186 and ice within the inlet 182 breaks up ice blockages therein and helps to ensure the continued progression of ice through the inlet 182 and into the chute 185.

A dispensing valve 181 is positioned within chute 185. Dispensing valve 181 may generally comprise a gate valve that is transitionable between a first or closed position (shown in solid line in FIG. 12) to block progression of ice through the chute 185 toward outlets 188, 189 and a second or open position (shown in dotted line in FIG. 12) to allow ice to progress through chute 185 toward outlets 188, 189. In some embodiments, a driver 183 may actuate the dispensing valve 181 between the closed position and the open position by pivoting the valve 181 about a hinge 177. In some embodiments, dispensing valve 181 may translate into and out of chute 185 in a direction that is generally perpendicular to the flow or movement of ice within chute 185 during operations.

In some embodiments, an outlet selection valve 193 is coupled to the outlets 188, 189. The outlet selection valve 193 may comprise a gate 173 that is pivotable about a hinge 191 to selectively block one of the outlets 188, 189. In particular, a driver 192 may pivot gate 173 about hinge 191 to a first position (shown in solid line in FIG. 12) to block the outlet 188 so that ice progressing out of the chute 185 is directed into the outlet 189. In addition, the driver 192 may pivot gate 173 about hinge 191 to a second position (shown in dotted line in FIG. 12) to block outlet 189 so that ice progressing out of the chute 185 is directed into the outlet 188.

Referring briefly now to FIGS. 2 and 12, the outlets 188, 189 may be aligned with the rows 154, 156. Thus, during operations, when ice is to be dispensed into a cup 50 received within a cup receptacle 125 of one of the rows 154, 156, the driver 183 may transition dispensing valve 181 to the open position so that ice may progress through chute 185 under the force of gravity. Depending on whether the cup to receive the ice is positioned in a cup receptacle 125 of the inner row 154 or the outer row 156, the driver 192 may pivot the gate 173 of outlet selection valve 193 to the first or second position to direct ice out of the desired, corresponding outlet 188, 189. During these operations, the driver 187 may rotate paddles 186 of agitator 184 within inlet 182 to ensure the continued progression of ice toward chute 185.

In some embodiments, outlet selection valve 193 may be replaced with a pair of valve or gate assemblies that are coupled to the outlets 188, 189. Accordingly, in these embodiments, ice may be dispensed out of one or both of the outlets 188, 189 by actuating the gate assemblies (not shown) for the selected outlet(s) 188, 189 during operations.

The valves (e.g., valves 181, 193, etc.) may be actuated to dispense ice out of an outlet 188, 189 for a specified period of time to prevent overfilling. In some embodiments, suitable sensors or other measurement devices may be included within ice dispensing station 180 to monitor the volume of ice that is dispensed from outlets 188, 189 to prevent overfilling. In some embodiments, a weight or force sensor may be employed (e.g., within the cup receptacles 125 in FIGS. 1 and 2) to monitor the combined weight of the cup and dispensed ice to prevent overfilling. In these various embodiments, the amount of ice to be dispensed (and therefore the various parameters for monitoring the amount of dispensed ice) may depend upon the size of cup 50 aligned with the ice dispensing station 180.

In some embodiments, drivers 187, 183, 192 may comprise electric motors. However, drivers 187, 183, 192 may comprise any suitable driving device such as, for instance, pneumatic motors, hydraulic motors, etc.

In other embodiments, instead of a pair of outlets 188, 189, ice dispensing station 180 may include only one outlet, such as either outlet 188 or 189, and dispense ice into cups 50 only one of the rows, such as either outer or inner row 154 or 156. For example, in this embodiment (not shown), outlet 189 may be omitted as would driver 192 and pivot gate 173. Also in this embodiment, the agitator 184 and paddle 186 may be replaced with an auger or other element in communication with timing circuitry to operate for a specified duration to dispense the appropriate amount of ice into the cups. This embodiment is intended for variations of the beverage dispensing system 100 that provide for beverage fulfillment on only one of the inner row 154 or the outer row 156, instead of beverage fulfillment on both rows 154 and 156.

Referring again to FIG. 2, after ice is dispensed into the cups 50 at the ice dispensing station 180, the turntables 124, 126 may rotate about axis 155 to align the cups 50 with the beverage dispensing station 190. Beverage dispensing station 190 includes a pair of nozzles 194, 196—with a first nozzle 194 being aligned with the inner row 154 of cup receptacles 125, and a second nozzle 196 being aligned with the outer row 156 of cup receptacles 125. During operations, the nozzles 194, 196 may dispense a selected beverage into cups 50 disposed in rows 154, 156, respectively.

Figure 13:
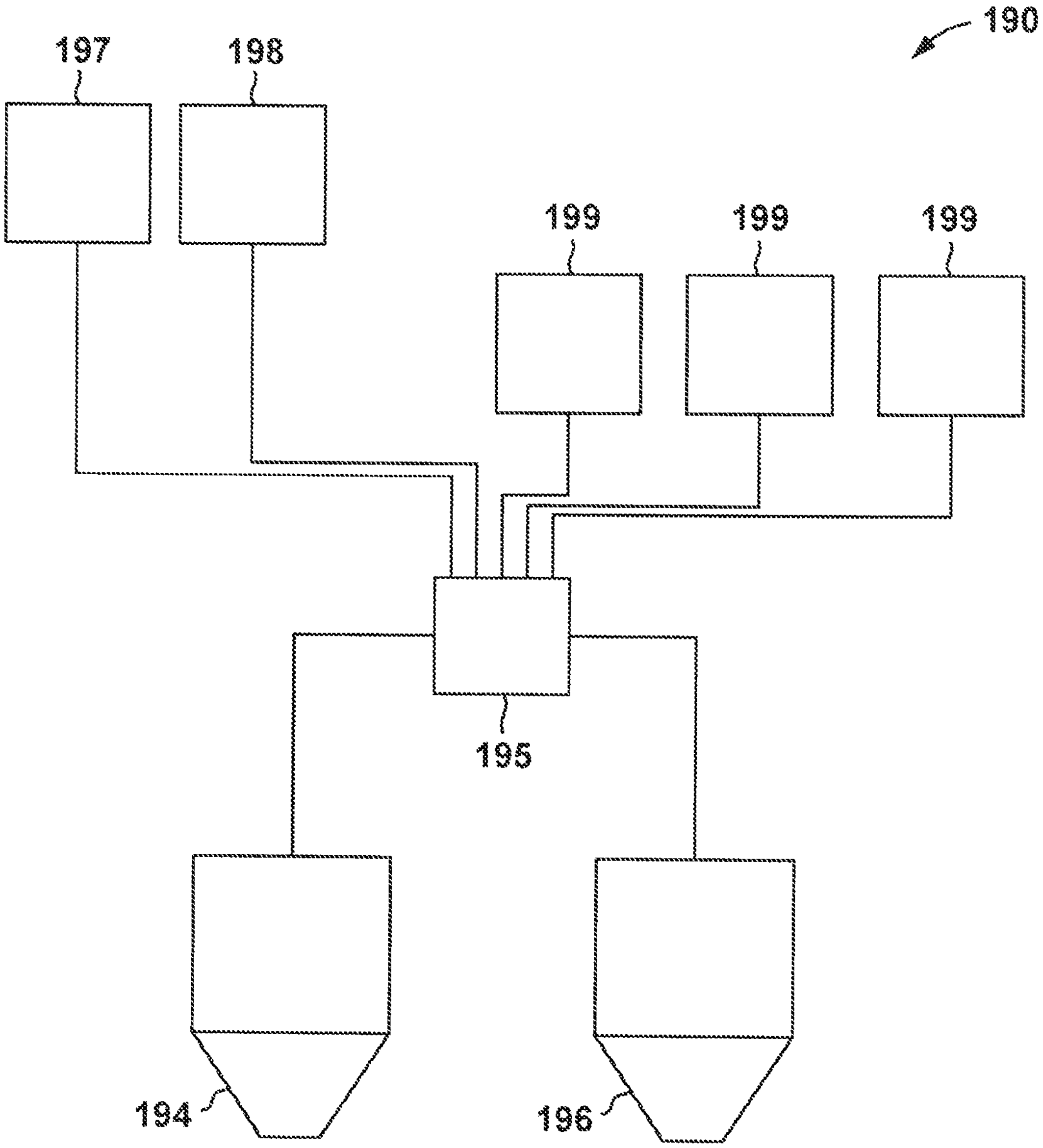
FIG. 13 is a schematic view of a beverage dispensing station of the beverage production system of FIG. 1 according to some embodiments.

Referring now to FIG. 13, in some embodiments each of the nozzles 194, 196 may be coupled to a distribution valve assembly 195. In turn, the distribution valve assembly 195 may be coupled to a carbonated water source 197, a non-carbonated water source 198, and a plurality of flavoring sources 199. Additional valving, pumps, and other components may be included to facilitate and control the flow of fluid from sources 197, 198, 199; however, these additional components are not shown so as to simplify the drawing. During operations, when a cup (e.g., cup 50 in FIGS. 1 and 2) is aligned with one of the nozzles 194, 196, a selected beverage is dispensed by flowing water from one (or both) of the sources 197, 198, and flowing flavoring from one or more of the sources 199 to the distribution valve assembly 195. Thereafter, the distribution valve assembly 195 may actuate to route the fluids to the selected nozzle 194, 196. The fluids may mix within the distribution valve assembly 195, the nozzle(s) 194, 196, and/or therebetween to form the selected beverage. In other embodiments, additional fluid sources may be connected to distribution valve assembly 195 for dispensing beverages that do not require mixing, such as, but not limited to, juice, coffee, and milk.

The distribution valve assembly 195 may include or be coupled to a timer to ensure that the correct amounts of fluids are dispensed from the selected nozzle 194, 196 while preventing overfilling. In some embodiments, distribution valve assembly 195 may additionally or alternatively monitor a volume of dispensed fluids to and from the nozzles 194, 196 (e.g., via flow rate sensors, pressure sensors, etc.) to prevent overfilling. In some embodiments, a weight or force sensor may be employed (e.g., within the cup receptacles 125 in FIGS. 1 and 2) to monitor the combined weight of the cup, ice (if any), and dispensed beverage to prevent overfilling. In these various embodiments, the amount of fluids to be dispensed (and therefore the various parameters for monitoring the amount of dispensed fluids) may depend upon the size of cup 50 aligned with the beverage dispensing station 190.

While the embodiment of beverage dispensing station 190 shown in FIG. 13 includes two nozzles 194, 196, it should be appreciated that different numbers and arrangements of nozzles may be utilized in other embodiments. For instance, referring again to FIGS. 1 and 2, in some embodiments, beverage dispensing station 190 may include a plurality of nozzles for dispensing beverages into cups 50 disposed in the inner row 154 and/or a plurality of nozzles for dispensing beverages into cups 50 disposed in the outer row 156. Without being limited to this or any other theory, the number and arrangement of the nozzles (e.g., nozzles 194, 196) of beverage dispensing station 190 may allow specific beverages or groups of beverages to be dispensed from selected nozzles and may increase the number of beverages that may be dispensed into cups 50 over a period of time. In addition, the nozzles of the beverage dispensing station 190 (e.g., nozzles 194, 196) may be separately coupled to the sources 197, 198, 199 so that beverages may be dispensed simultaneously from the various nozzles during operations. In embodiments where beverages are filled only on one of the inner or outers rows 154, 156 of cup receptacles, only one of the nozzles 194, 196 may be present.

Referring again to FIG. 2, after a beverage is dispensed into the cups 50 via the beverage dispensing station 190, the turntables 124, 126 rotate about axis 155 to align the cups 50 with the lidding station 200. Generally speaking, lidding station 200 may comprise a plurality of tubular magazines 202 that may receive and hold a plurality of lids 60 to be dispensed and deposited on cups 50 during operations.

Figure 15:
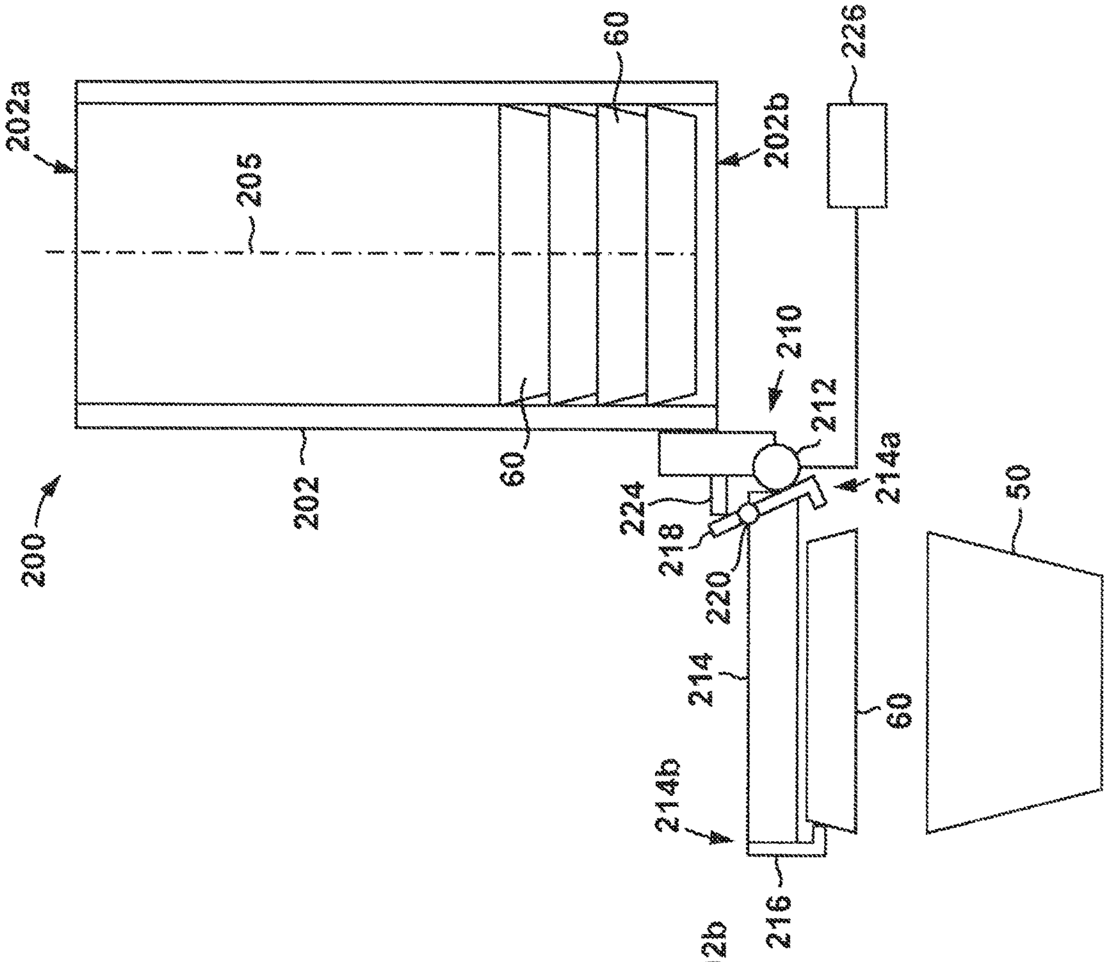
FIGS. 14 and 15 are schematic side views of a lidding station of the beverage production system of FIG. 1 according to some embodiments.
Figure 14:
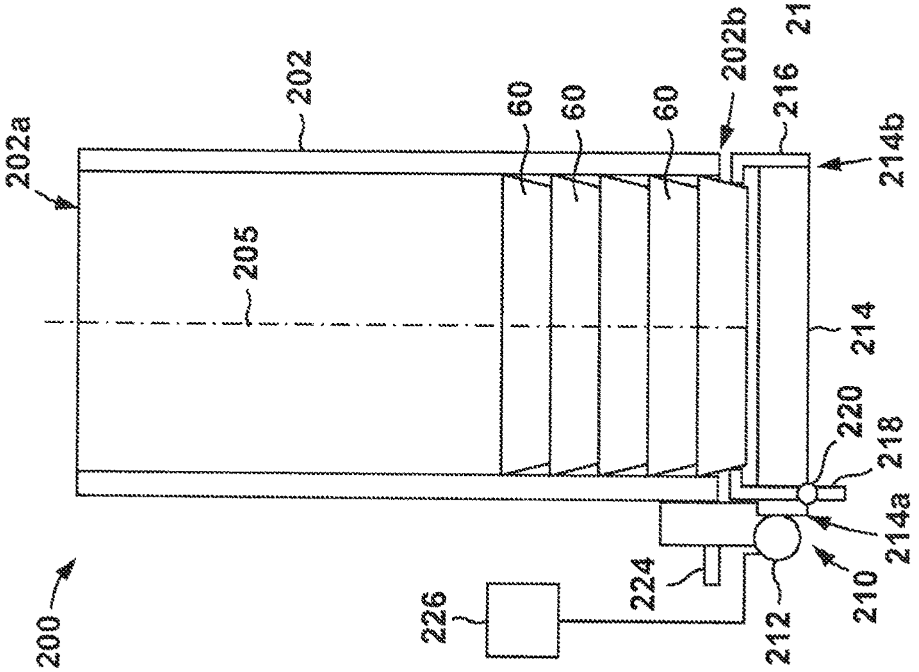

Reference is now made to FIGS. 14 and 15, in which an embodiment of lidding station 200 is shown. As shown in FIGS. 14 and 15, magazine 202 includes a central or longitudinal axis 205, a first or upper end **202*a*, and a second or lower end 202*b* opposite upper end 202*a*. Lids 60 may be stacked into magazine 202 from the upper end 202*a* and may be dispensed from magazine 202 at lower end 202*b* via a lid dispensing assembly 210**.

In some embodiments, lid dispensing assembly 210 may comprise a grapple 214 pivotably coupled to magazine 202 via a hinge 212, proximate lower end **202*b*. A driver 226 is coupled to grapple 214 and/or hinge 212 that may selectively rotate grapple 214 about hinge 212 between a first position shown in FIG. 14 and a second position shown in FIG. 15. In some embodiments, driver 226 may comprise an electric motor; however, in other embodiments, driver 226** may comprise a pneumatic motor, a hydraulic motor, etc.

Grapple 214 includes a first or inner end **214*a* proximate hinge 212 and a second or outer end 214*b* projecting away from hinge 212. In addition, grapple 214 includes a first lid grip 216 at (or proximate to) outer end 214*b*, and a second lid grip 218 at (or proximate to) inner end 214*a*. First lid grip 216 and second lid grip 218 may comprise teeth or other suitable structures that may engage with and hold a lid 60 during dispensing operations. First lid grip 216 may be fixed in position at (or proximate to) outer end 214*b* of grapple 214, while second lid grip 218 may be pivotably coupled to grapple 214 at (or proximate to) inner end 214*a* via a hinge 220. Moreover, second lid grip 218 may be rotationally biased (e.g., via a torsion spring or other suitable device) about hinge 220 so that second lid grip 218 is biased into engagement with a lid 60 that is being held by grapple 214 (FIG. 14**).

Lids 60 may be dispensed from magazine 202 by rotating grapple 214 to the first position of FIG. 14, to engage with the lowermost lid 60 within magazine 202. More particularly, in the position of FIG. 14, the lid 60 is gripped or engaged between the first lid grip 216 and the second lid grip 218. As previously described, the second lid grip 218 may be biased about hinge 220 to engage with lid 60. Next, when it is desired to dispense the lid 60 onto the top of a cup (e.g., cup 50 in FIGS. 1 and 2) that is aligned with the lidding station 200, driver 226 may rotate grapple 214 about hinge 212 from the first position of FIG. 14 to the second position of FIG. 15. As grapple 214 rotates about hinge 212 to the second position of FIG. 15, the second lid grip 218 may engage with a camming surface 224 coupled to (or mounted proximate to) hinge 212. As a result, the continued rotation of grapple 214 about hinge 212 toward the second position following engagement of the second lid grip 218 with camming surface 224 may force second lid grip 218 to rotate about hinge 220 and thereby disengage from lid 60 so that lid 60 may fall, under the force of gravity, toward a cup 50 aligned therewith. Afterward, driver 226 may rotate grapple 214 about hinge 212 back toward the first position of FIG. 14 so as to engage with another lid 60. Because the grapple 214 pivots about hinge 212 between the first position (FIG. 14) and second position (FIG. 15) during lid dispensing operations as described above, the lids 60 may be inserted within magazine "upside-down," so that when they are rotated with grapple 214 to the second position of FIG. 15, the bottom side of the lid 60 is facing the cup 50 (not shown).

Figure 16:
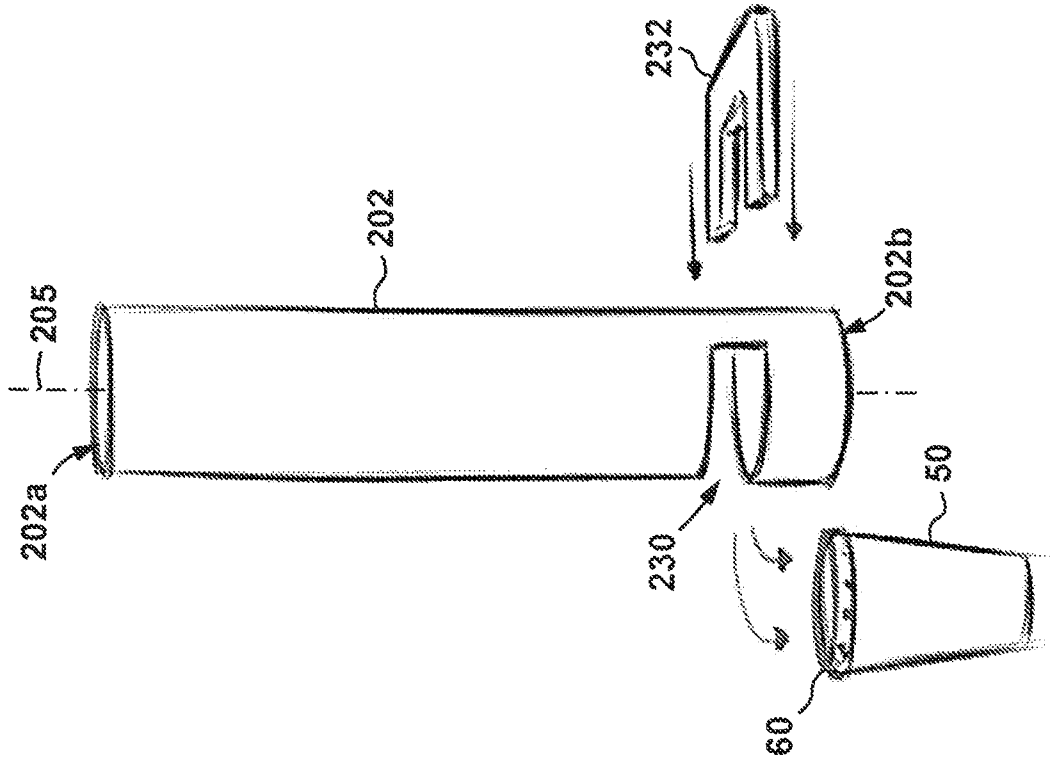
FIG. 16 is a perspective view of a lidding station of the beverage production and dispensing system of FIG. 1 according to some embodiments.

In some embodiments, grapple 214 may be omitted and lids 60 may be dispensed from magazine(s) 202 via other systems and methods. Referring now to FIG. 16, in some embodiments, magazine 202 may include a slot 230 extending radially through the wall of magazine 202 at a point that is more proximate the lower end 202*b* than the upper end 202*a*. Lids 60 that are inserted into upper end 202*a* of magazine 202 may fall or otherwise progress axially downward through magazine 202 along axis 205 to eventually align with the slot 230. A ram 232 may be coupled to magazine 202 and aligned with slot 230. Ram 232 may be selectively translated (e.g., via a suitable driver or actuator) in a radial direction with respect to axis 205, through the slot 230 during operations. Each time ram 232 translates radially through slot 230, a lid 60 may be pushed radially out of slot 230 and magazine 202 whereby it may fall downward toward a cup 50 (which may be positioned within a receptacle 125).

Figure 17:
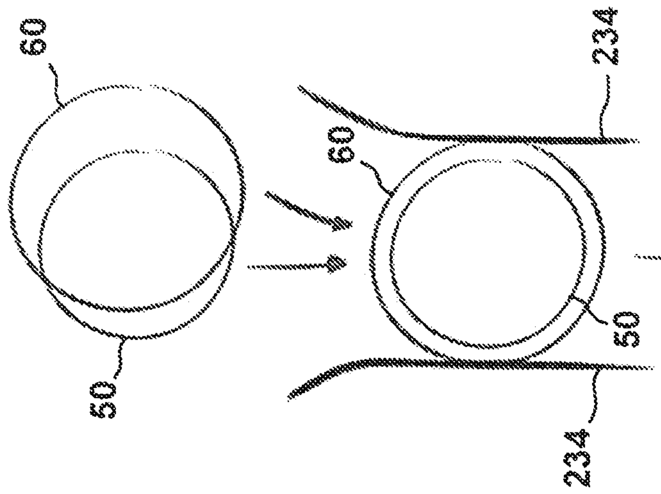
FIG. 17 is a top view of a pair of converging rails of a lidding station of the beverage production system of FIG. 1 according to some embodiments.

In some embodiments, a lid 60 dispensed from lidding station 200 may be misaligned with the cup 50. Thus, in some embodiments, the dispensing mechanism of the lidding station 200 (e.g., grapple 214) may align the lid 60 with the cup 50 (e.g., such that the lid 60 is substantially centered on the top of the cup 50). In some embodiments, a lidding station 200 may include a separate device or assembly for aligning the lid 60 with the cup 50 following dispensing of the lid 60 (e.g., from magazine 202). For instance, reference is now made to FIG. 17, a cup 50 and dispensed lid 60 may be routed (e.g., via turntables 124, 126) between a pair of converging rails 234. The shape and position of the rails 234 may be selected so that as the cup 50 and lid 60 are moved therebetween, the lid 60 may be aligned with the underlying cup 50.

Once a lid 60 is dispensed onto a cup 50 and aligned therewith, the lid 60 may then be secured or pressed onto the cup 50. In some embodiments, grapple 214 of FIGS. 14 and 15 may be translated axially (e.g., independently or together with magazine 202) with respect to axis 205 to press the dispensed lid 60 onto the cup 50.

Figure 18:
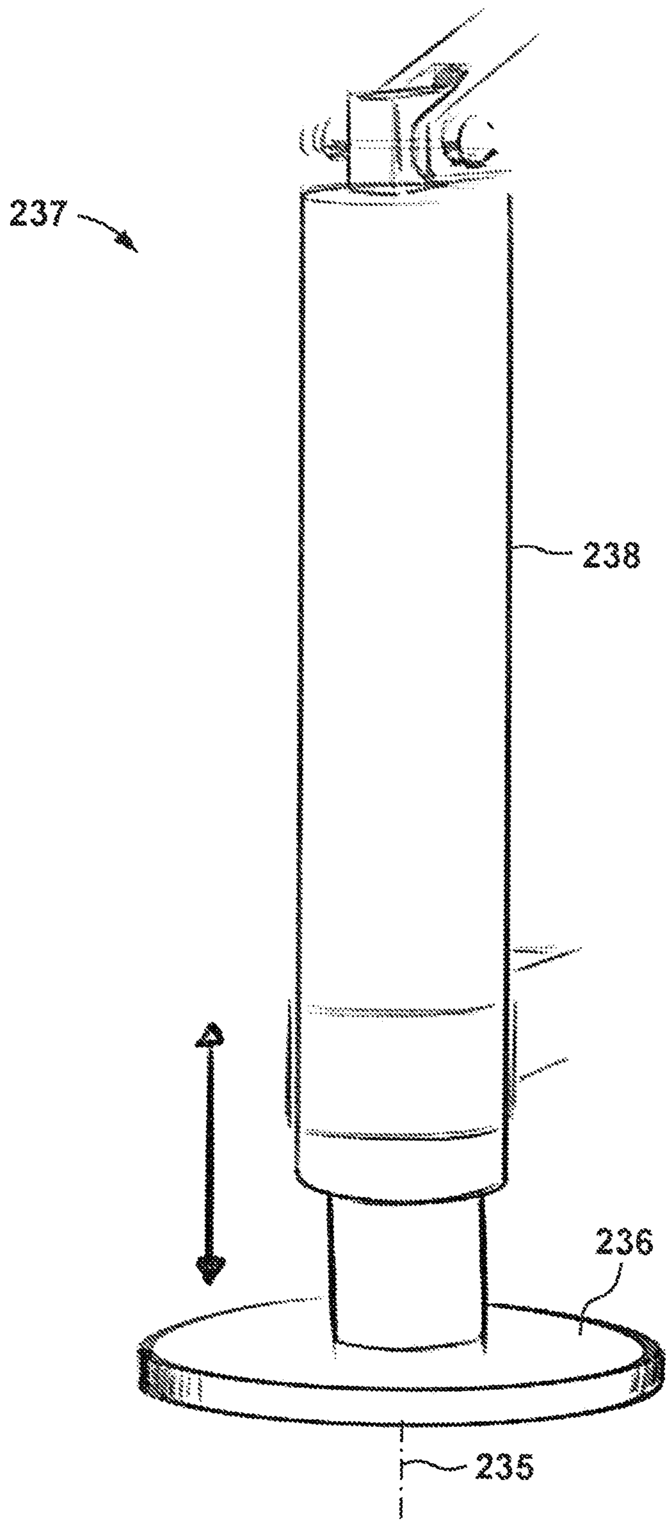
FIG. 18 is a perspective view of a lid press of the lidding station of the beverage production system of FIG. 1 according to some embodiments.

In some embodiments, a dispensed lid 60 may be compressed onto the cup 50 via a separate press or other suitable device. For instance, referring now to FIG. 18, in some embodiments a press 237 may engage with lid 60 after it is loosely fitted (e.g., dropped) onto a cup 50. Press 237 includes a plunger 236 that is coupled to a linear actuator 238. Plunger 236 may comprise any suitable shape that may correspond with the shape of the lid (e.g., lid 60 in FIGS. 14 and 15). Plunger 236 may be selectively extended and retracted along a central axis 235 via linear actuator 238. In some embodiments, linear actuator 238 may comprise a hydraulic or pneumatic cylinder. In some embodiments linear actuator 238 may comprise an electric linear actuator.

Figure 19:
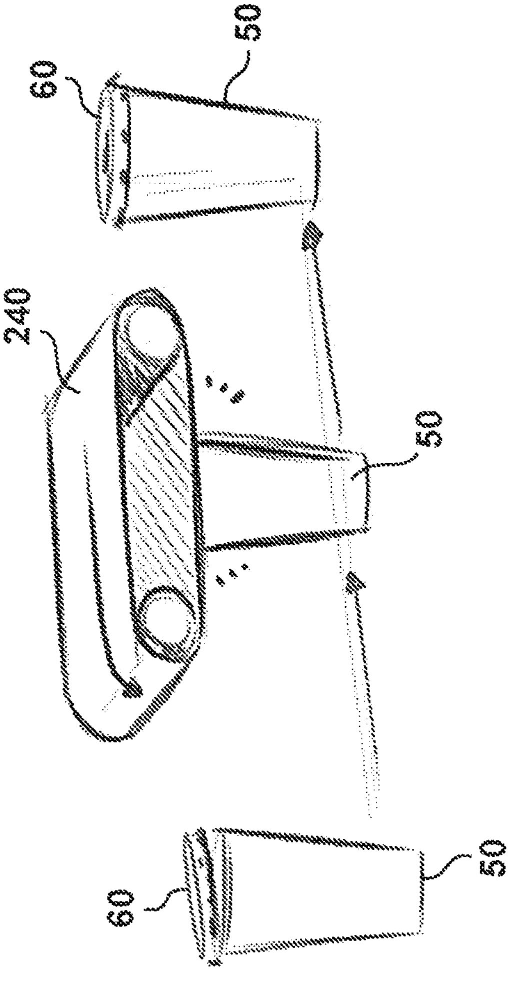
FIG. 19 is a perspective view of a compressive belt for securing lids to cups within a lidding station of the beverage production system of FIG. 1 according to some embodiments.

Referring now to FIG. 19, in some embodiments, a dispensed lid 60 may be compressed onto cup 50 via a belt 240 that is spaced from the rows 154, 156 (FIG. 2). In particular, during operations the lid 60 and cup 50 are compressed between the corresponding cup receptacle 125 (not shown in FIG. 19) of the rows 154, 156 and the belt 240 to thereby secure lid 60 to the cup 50.

Figure 20:
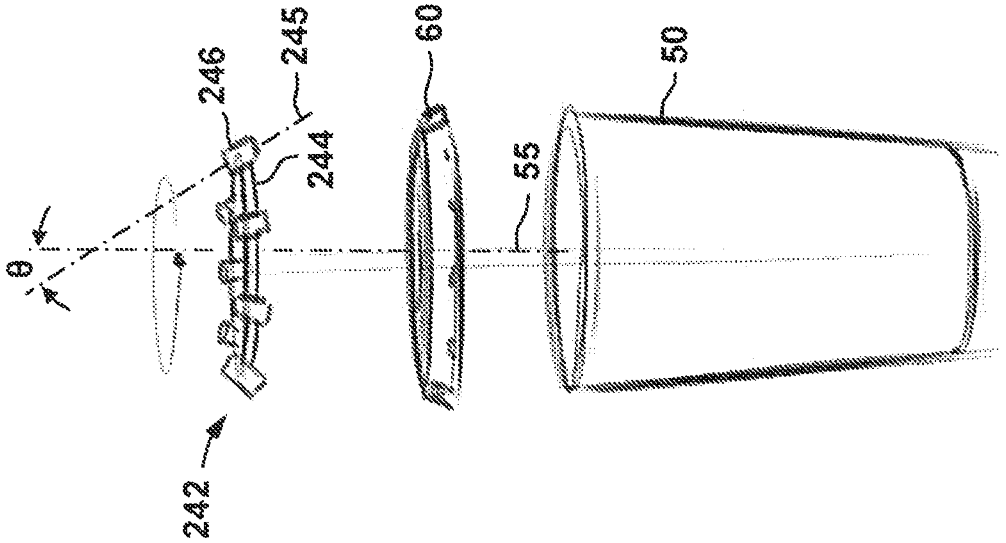
FIG. 20 is a perspective view of a roller assembly for securing lids to cups within a lidding station of the beverage production and dispensing system of FIG. 1 according to some embodiments.

Referring now to FIG. 20, in some embodiments, lidding station 200 may comprise a roller assembly 242 to compress and secure dispensed lids 60 onto cups 50. The roller assembly 242 may comprise a ring 244 and a plurality of rollers 246 rotatably mounted to ring 244. The rollers 246 may be generally cylindrical in shape and include central axes 245. The rollers 246 may be mounted to ring 244 such that axes 245 are angled relative to central axis 55 of cup 50. In some embodiments, the axes 245 are disposed at an angle θ that is greater than 0° and less than 90° relative to central axis 55. During operations, a cup 50 and dispensed lid 60 is aligned with the roller assembly 242, and the roller assembly 242 is lowered into engagement with lid 60 along axis 55 and simultaneously rotated about axis 55 such that rollers 246 compress lid 60 onto cup 50.

Figure 21:
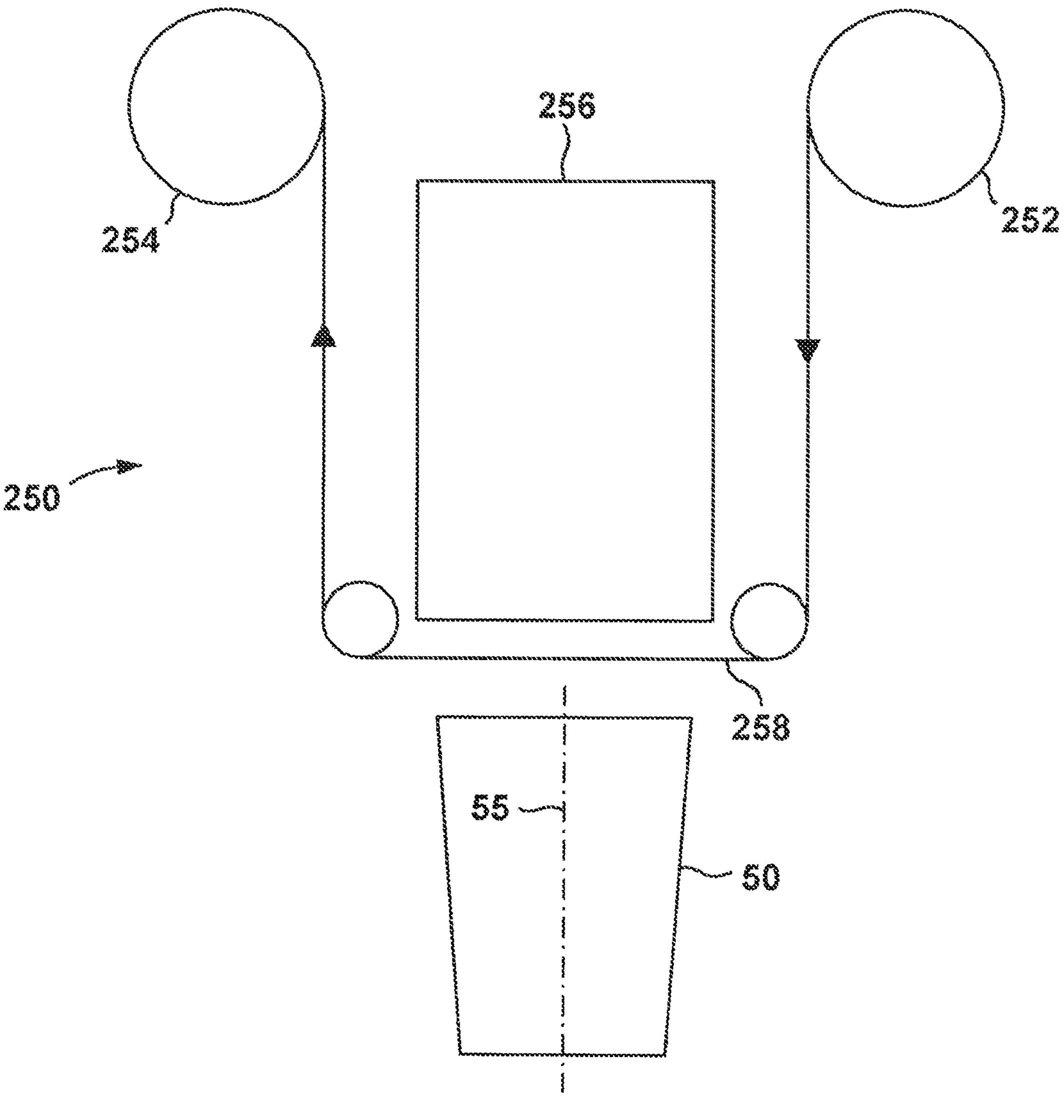
FIG. 21 is a schematic view of a heat seal lidding assembly of the lidding station of the beverage production system of FIG. 1 according to some embodiments.

Referring now to FIG. 21, in some embodiments, lidding station 200 (FIGS. 1 and 2) may comprise a heat seal lidding assembly 250. Heat seal lidding assembly 250 includes a heat sealer 256 that may cut and heat seal a lid onto a cup 50 from a continuous belt of lidding material 258 (e.g., a polymer membrane) that is unrolled from a start roller 252 and taken up by a finish roller 254. In particular, heat sealer 256 may include a heating element (not shown) and may be translated toward cup 50 along an axis 55 to cut out a portion of the lidding material 258 and fuse the lidding material 258 to the rim of cup 50. In some embodiments, a pair of heat sealers 256 may be included within heat seal lidding assembly 250, with each heat sealer 256 being aligned with a corresponding one of the rows 154, 156 of turntable assembly 122. In some embodiments, each row 154, 156 may be aligned with a separate, independent heat seal lidding assembly 250.

In some embodiments, some or all of the lidding process may be carried out manually (e.g., by an employee or customer). For instance, in some embodiments, lids 60 may be retrieved and secured to cups 50 manually. In some embodiments, lidding station 200 may dispense (and possibly align) lids 60 onto cups 50, but an employee/customer may manually compress the lids 60 onto the cups 50 thereafter. Thus, in some embodiments, some or all of the lidding station 200 may be omitted from beverage handling assembly 120 (FIGS. 1 and 2).

Figure 22:
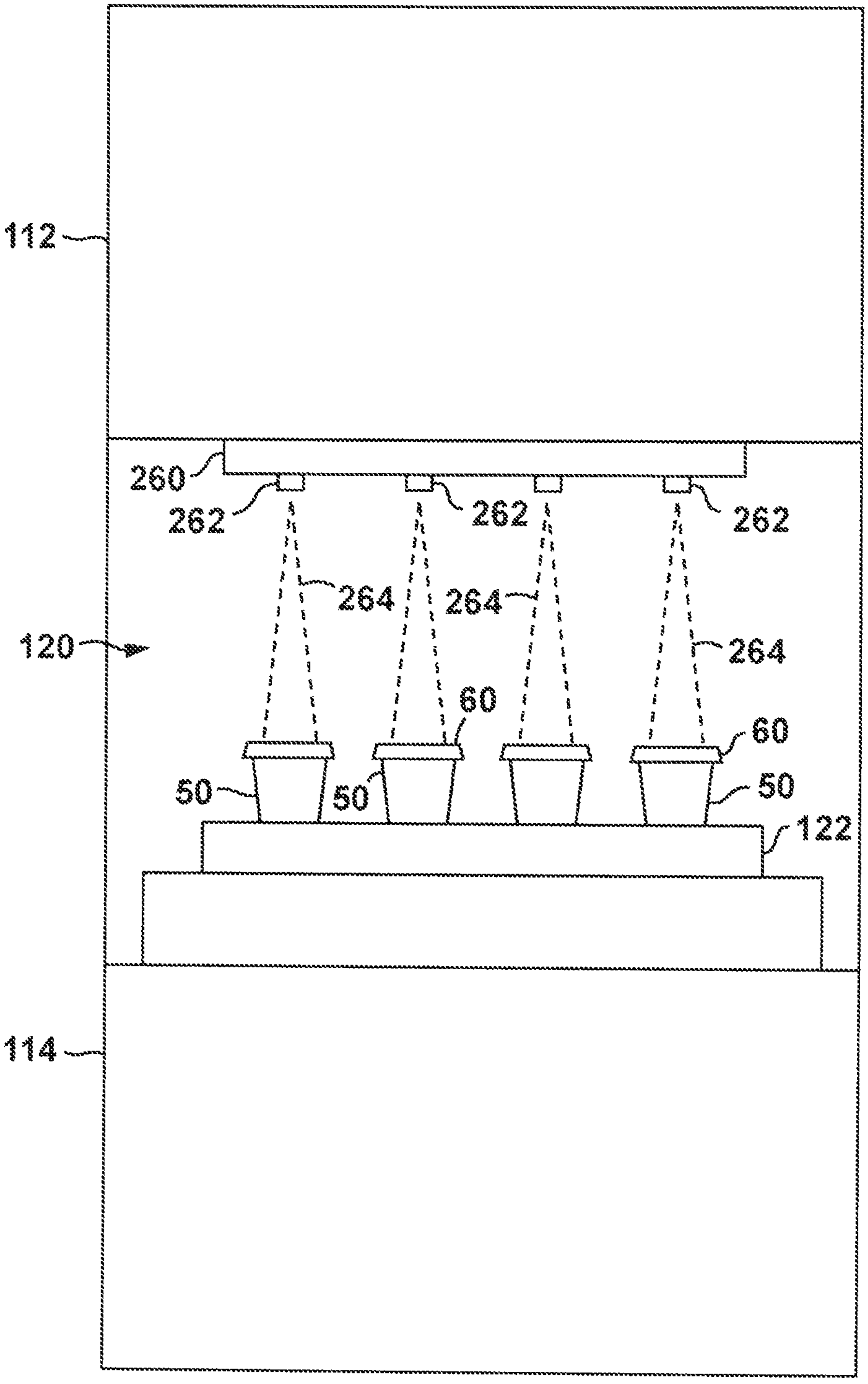
FIG. 22 is a side view of a beverage identification assembly of the beverage production system of FIG. 1 according to some embodiments.

Referring now to FIGS. 1 and 22, in some embodiments, beverage production system 100 may include a beverage identification assembly 260 to identify beverages that have advanced through the stations 130, 180, 190, 200 and are ready for retrieval by an employee or customer. In particular, as best shown in FIG. 22, beverage identification assembly 260 may comprise a plurality of emitters 262 coupled to beverage handling assembly 120 that are configured to emit light 264 onto cups 50 and (if present) lids 60 that may be used to identify a particular beverage or beverage order. In some embodiments, the light 264 may be color-coded so as to identify a particular beverage (or order) with a different color. In some embodiments, the light 264 may form images (e.g., text and/or symbols) on the beverages that may provide sufficient information (e.g., names, order number, table number, vehicle identification). In some embodiments, emitters 262 may comprise light emitting diodes (LEDs) and/or other suitable light emitting devices.

Referring again to FIGS. 1 and 2, during operations, commands to produce selected beverages may be received by suitable electronics (not shown) of beverage production system 100. For instance, an employee or customer may select the desired beverage(s) on a user interface 110 which then initiates the beverage production process generally described above. In some embodiments, the user interface 110 may comprise a touch-sensitive electronic display. In some embodiments, the beverage production system 100 may receive commands to produce beverages via other electronic devices that are communicatively coupled to beverage production and dispensing system 100 via a suitable network or connection. For instance in some embodiments, beverage production system 100 may receive commands to produced beverages from a point of sale system of the restaurant or dining facility that may receive orders via customer or employee. In some embodiments, the point-of-sale system may comprise part of a computer system that also includes the beverage production system 100 (e.g., computer system 400 described below).

Once commands to produce beverage(s) are received by beverage production system 100, turntables 124, 126 may be rotated about axis 155 to progress the cup receptacles 125 through the stations 130, 180, 190, 200. Simultaneously, the assemblies and mechanisms within each of the stations 130, 180, 190, 200 may actuate in the manner described above to produce beverages. Specifically, as described above, cup dispensing assembly 130 may dispense cups 50 from magazines 132 into cup receptacles 125 in one or both of the rows 154, 156, thereafter the cups 50 are aligned with the ice dispensing station 180 whereby ice is dispensed into the cups 50. In some instances, depending on the selected preferences for each requested beverage, ice may not be dispensed into a cup or cups when aligned with the ice dispensing station 180. Next, the cups 50 and ice (if dispensed) are aligned with the beverage dispensing station 190, whereby the selected beverage is dispensed into the cups 50 (e.g., via nozzles 194, 196). Next, depending on the lidding system that is employed, cups 50 may be progressed to the lidding station 200 whereby a lid 60 may be dispensed from magazines 202 and secured onto the cups 50 or a film lid is placed and secured on the cup, such as by heat sealing. Finally, referring briefly to FIGS. 1 and 22 after the cups 50 are progressed past the lidding station 200, the cups are generally moved to align with the beverage identification assembly 260, which may then identify the particular, completed beverages via the projected light 264 as generally describe above. As previously described, in some embodiments, some or all of the lidding process may be performed manually, such that lidding station 200 may be simplified or omitted entirely from beverage handling assembly 120.

Figure 23:
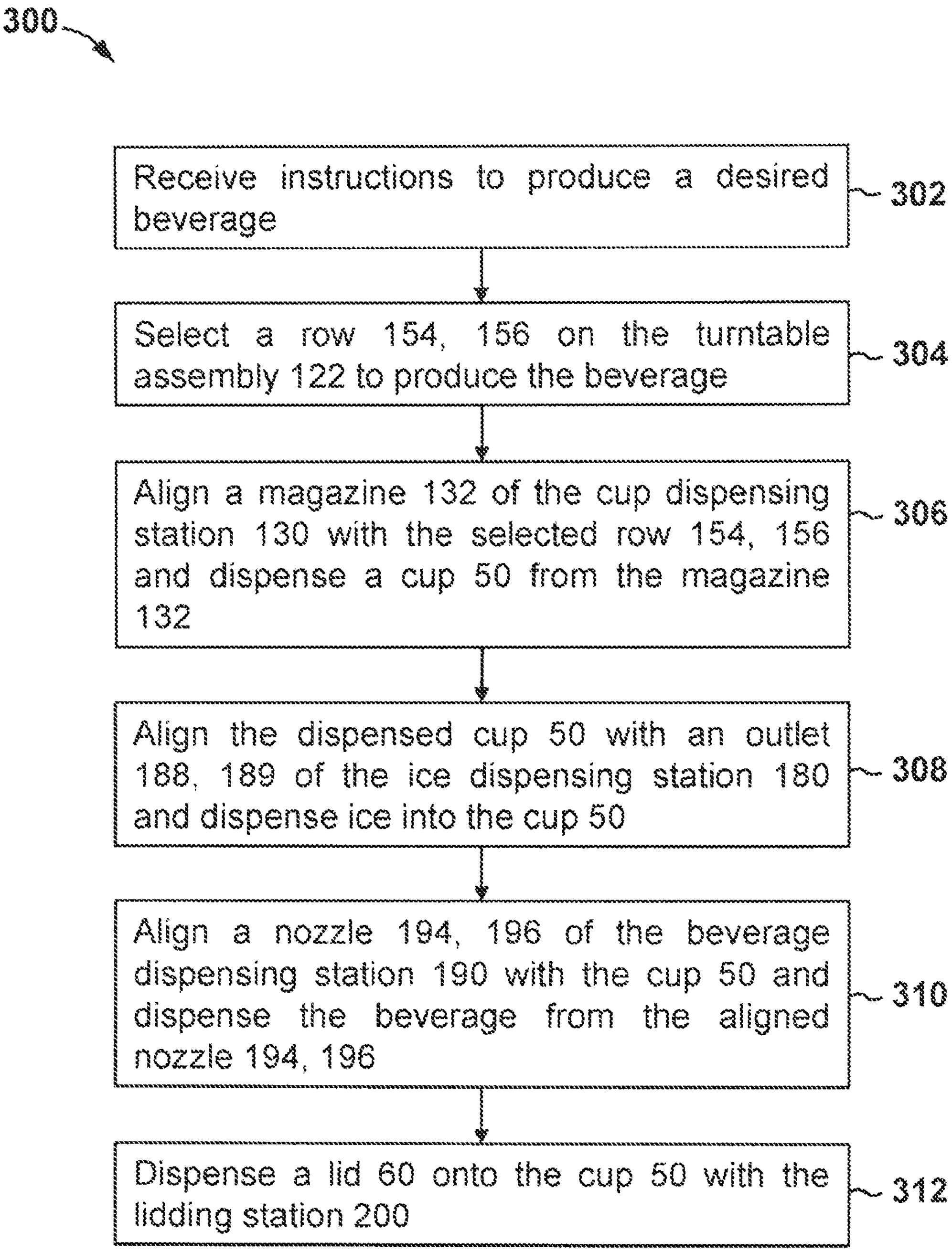
FIG. 23 is a flow diagram of a method for producing a beverage according to some embodiments.

Referring now to FIG. 23, a method 300 of producing beverages with embodiments of the beverage dispensing system 100 according to some embodiments is shown. In some embodiments, one or more elements of method 300 may be carried out by components of the beverage handling assembly 120 as described herein and/or by a computer system (e.g., such as computer system 400 described in more detail below). Thus, in describing the features of method 300, continuing reference is made to the beverage production system 100 shown in FIG. 1 and the beverage handling assembly 120 depicted in FIG. 2.

Initially, method 300 includes receiving instructions (or commands) for producing a desired beverage (or beverages) at block 302. The instructions may be generated or received via interaction of an employee or customer with a user interface device, such as the user interface 110 shown in FIG. 1. In some embodiments, the instructions may be generated or received by a point-of-sale system utilized by the restaurant or dining facility as described above.

Method 300 also includes selecting a row 154, 156 on the turntable assembly 122 to produce the beverage at block 304. In particular, in some embodiments, the row selection at block 304 may be determined based on a previously defined rule for producing beverages with the beverage production system 100. For instance, as noted above, in some embodiments, the source of the beverage order (e.g., drive through, dine-in) may dictate which row 154, 156 is selected at block 304. In addition, in some embodiments, the type and/or size of the desired beverage may also dictate which row 154, 156 is selected at block 304.

Method 300 also includes aligning a magazine 132 of the cup dispensing station 130 with the selected row 154, 156, and dispensing a cup 50 from the magazine 132 at block 306. As previously described, the magazines 132 may hold different sizes and/or types of cups 50 therein. Thus, during operations, a magazine 132 holding the cup size and type that is desired, based on the instructions received at block 302, may dictate which magazine 132 is to be utilized to dispense a cup 50 for beverage production operations. In some embodiments, as previously described, the dispenser 134 of cup dispensing station 130 may be rotated (e.g., via driver 138 shown in FIG. 4) to align the selected magazine 132 with the selected row 154, 156 on turntable assembly 122.

Method 300 also includes aligning the dispensed cup 50 with an outlet 188, 189 of the ice dispensing station 180 and dispensing ice into the cup 50 from the aligned outlet 188, 189 at block 308. The outlet 188, 189 utilized for dispensing the ice at block 308 may be dictated by the row 154, 156 selected at block 304. As described above, in some embodiments, an outlet selection valve 193 (FIG. 12) may be actuated to direct dispensed ice out of the selected outlet 188, 189.

Method 300 also includes aligning a nozzle 194, 196 of the beverage dispensing station 190 with the cup 50, and dispensing the beverage from the aligned nozzle 194, 196 at block 310. As with the ice dispensing station 180, the nozzle 194, 196 utilized to dispense the beverage at block 310 may be dictated by the row 154, 156 selection at block 304. In some embodiments, the nozzle aligned at block 310 may be selected based on the type of beverage being produced based on the instructions received at block 302.

Method 300 also includes dispensing a lid 60 onto the cup 50 with the lidding station 200 at block 312. In some embodiments, the lidding station 200 may be actuated to dispense a lid 60 onto the cup 50, which may then be manually secured by an employee or customer. In some embodiments, the lidding station 200 may be actuated to both dispense the lid 60 and secure the lid 60 to the cup 50.

In each of the blocks 306, 308, 310, 312 of method 300, the turntables 124, 126 of the turntable assembly 122 may be rotated (e.g., via drivers 141, 143) to align a cup receptacle 125 (and/or a cup 50 positioned therein) with each of the cup dispensing station 130, ice dispensing station 180, beverage dispensing station 190, and lidding station 200.

Figure 24:
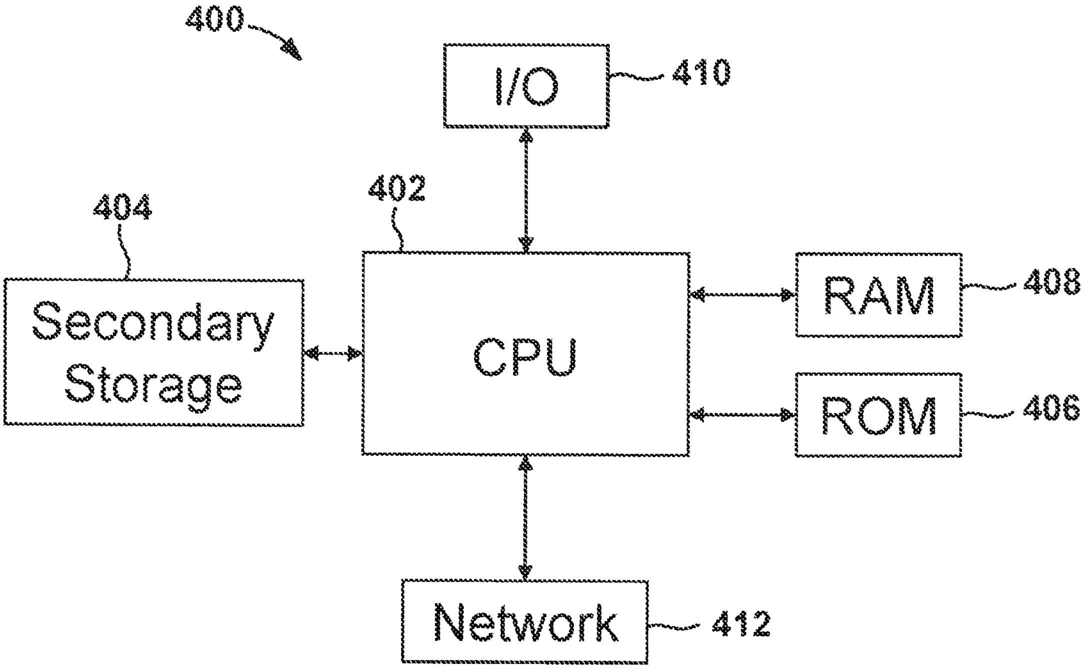
FIG. 24 is a schematic diagram of a computer system suitable for implementing one or more embodiments disclosed herein.

FIG. 24 illustrates a computer system 400 suitable for implementing one or more embodiments disclosed herein. For instance, beverage production system 100 (FIG. 1) may include or be coupled to computer system 400. During operations beverage production system 100 may utilize computer system 400 to receive and process beverage orders (or commands associated therewith), and to actuate the various components of beverage handling assembly 120 as described above. In some embodiments, one or more components of computer system 400 may be positioned within the cabinet 114 shown in FIG. 1. In other embodiments, the beverage production system 100 may include all or some aspects of the computer system 400 which is connected to a point-of-sale or other systems, which also contains all or some aspects of the computer system 400 or combinations thereof. Such configurations allow the selection of beverages to be made at either the beverage dispensing production system 100, at the point-of-sale system, or both.

The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays (e.g., user interface 110 shown in FIG. 1), keyboards, keypads, switches, dials, mice, track balls, voice recognizers, card readers, paper tape readers, or other well-known input and output devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave. Thus, the present disclosure contemplates receiving instructions, such as customer orders received via online or so called internet applications or otherwise, via network connectivity devices 412, including orders for beverages, that are then produced automatically by the beverage production system 100 without input from employees or personnel located at or operating the beverage production system 100.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk-based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality described herein may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

Figure 25:
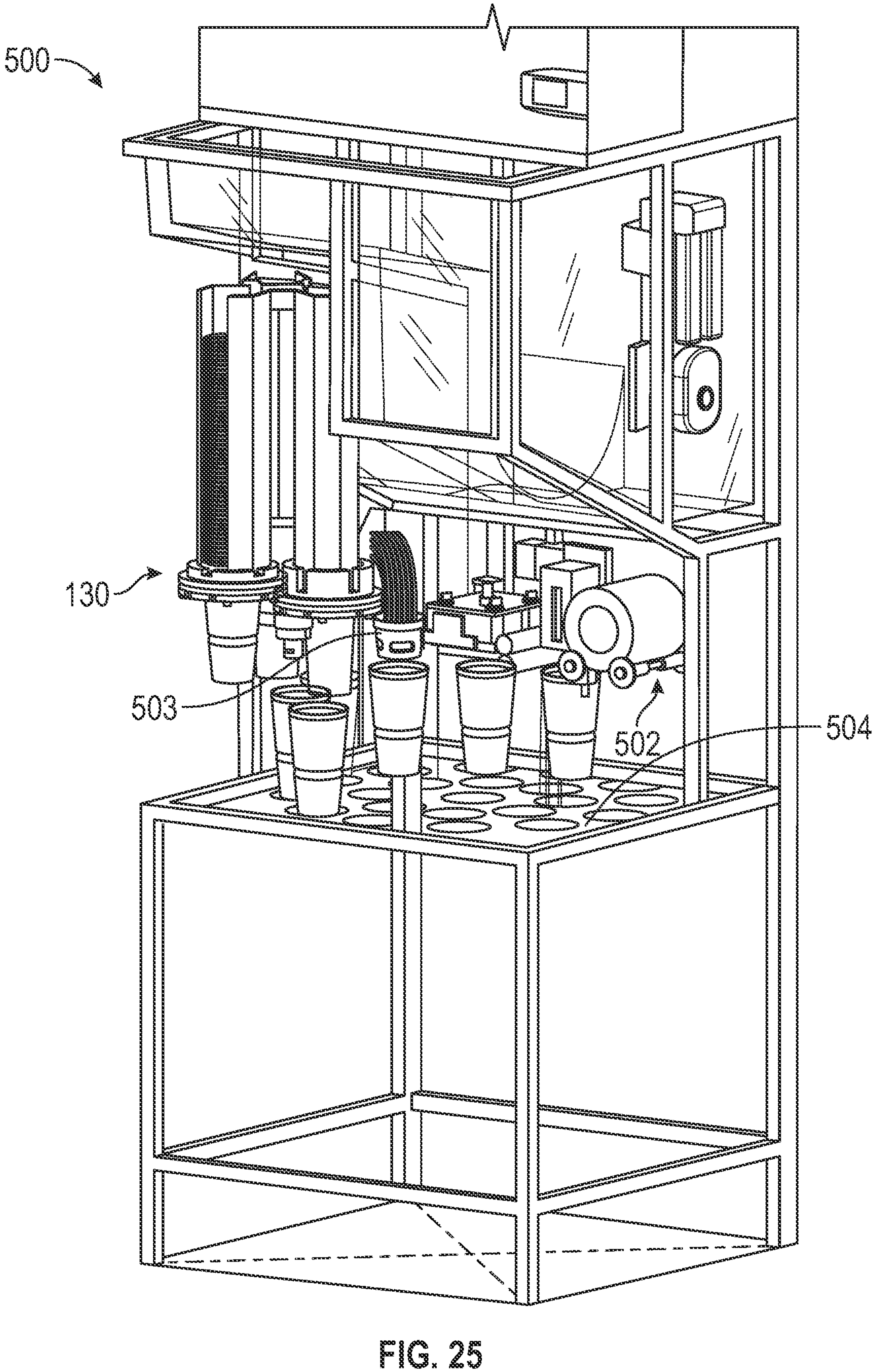
FIG. 25 is a perspective view of the beverage production system according to yet another embodiment.

FIG. 25 illustrates another embodiment of a beverage production system 500. The beverage production system 500 may be similar to the beverage production system 100 in some respects. For example, the beverage production system 500 may employ the cup dispensing station 130 described above. However, the beverage production system 500 includes some notable differences, such as a lidding and printing assembly 502 for sealing and identifying filled beverages, discussed further below. While it is anticipated that beverages may be dispensed in both rows, in this embodiment, the beverage production system 500 may be configured such that cups, ice, and beverages are dispensed on only one row, such as on either the inner or outer row, but not in both rows of the turntable. This embodiment illustrates beverages fulfillment in cup holders in the outer row.

Figure 26:
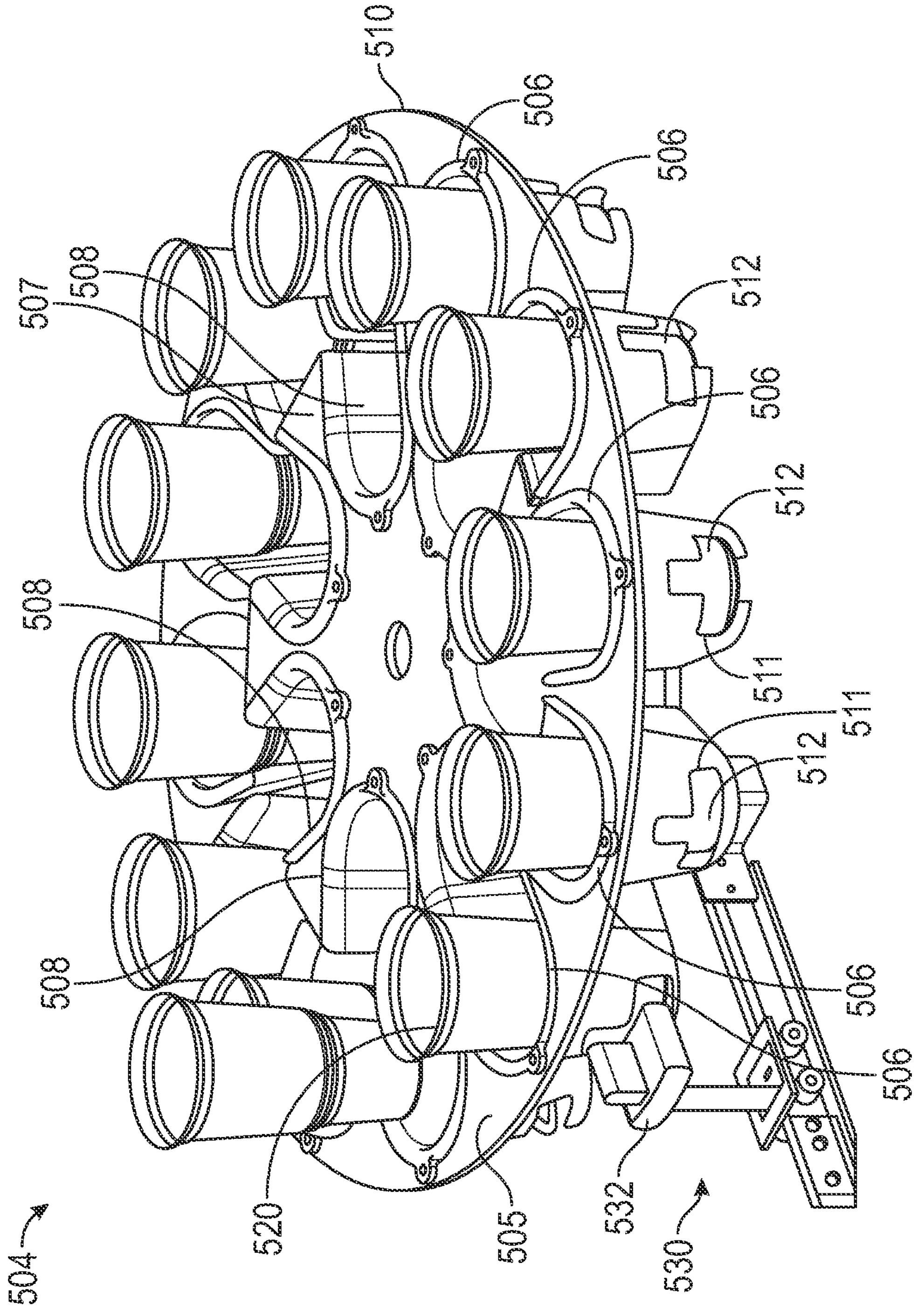
FIG. 26 is a perspective view of a modified turntable assembly of the beverage production system of FIG. 25 according to one embodiment.

Referring also to FIG. 26, the beverage production system 500 may also employ a modified turntable assembly 504 (also shown in cut-away in FIG. 25). The modified turntable assembly 504 may be similar to the turntable assembly 122 described above in some respects. The modified turntable assembly 504 is configured with an outer turntable 505 having an outer row of cup receptacles 506 and an inner turntable 507 having an inner row of cup receptacles 508. The inner and outer turntables 505 and 507, which may be collectively referred to as modified turntable 510, are configured to rotate independently from one another and may comprise drives, motors, and gearboxes (not shown) that operate similar to those described above with regard to inner turntable 124 and outer turntable 126 described above.

The cup receptacles 506 and 508 are configured to retain cups 50 dispensed from the cup dispensing station 130. The cup receptacles 506 and 508 may be sized to retain cups 50 of various sizes. The outer row of cup receptacles 506 may include an opening 512 near a bottom outer side 511 of the outer row of cup receptacles 506. Also, instead of being circular, the outer and inner row of cup receptacles 506 and 508 are U-shaped in this embodiment. As such, the outer and inner turntables 505 and 507 may be rotated so that the U-shaped opening of a particular outer row of cup receptacles 506 may be aligned with the U-shaped opening of a particular inner row of cup receptacles 508. For example, a cup 520 is shown in FIG. 26 disposed in an outer row cup receptacle 506 that is aligned with an inner row cup receptacle 508. The cup 520 may be filled with a beverage, via beverage dispensing station 502, while positioned in the outer row of cup receptacle 508.

Figure 27:
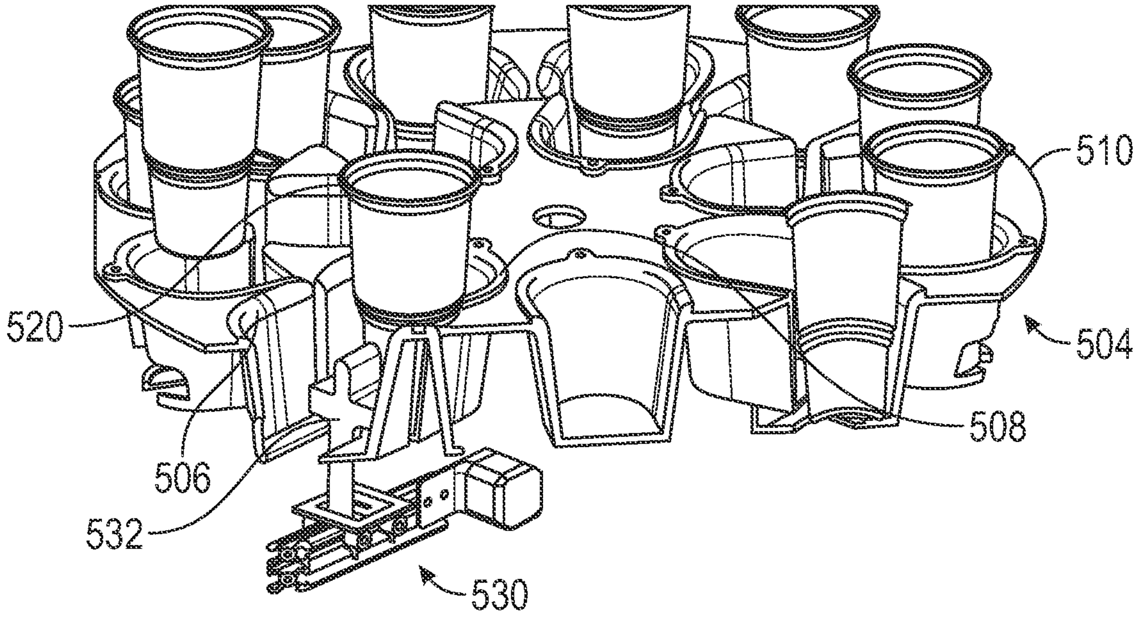
FIG. 27 is partial cut-away view of the modified turntable assembly of FIG. 26 shown with a slide assembly according to one embodiment.

Referring also to FIG. 27 in a partial cut-away view, a slide assembly 530 positioned below the turntable assembly 510 includes an arm 532 that may be actuated to extend through the opening 512 in the outer row of cup receptacles 506 retaining the cup 520 and slide or move cup 520 from a position in the outer row cup receptacle 506 to the into the aligned inner row cup receptacle 508. Once cups 520 are filled with beverages, the cups 520 may remain in the outer row of cup receptacles 506 or slide into unoccupied cup receptacles in one of the inner row of cup receptacles 508. Thus, in this embodiment, the inner row of cup receptacles 508 provides extra space for storing beverages filled on the outer row of cup receptacles 506 until they are retrieved for delivery to or by customers.

Figure 28:
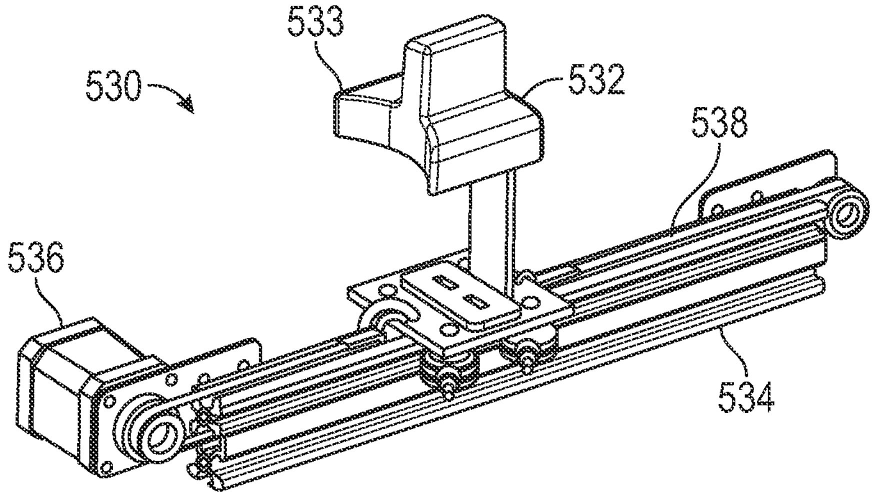
FIG. 28 is an enlarged perspective view of the slide assembly illustrated in FIG. 27 according to one embodiment.

FIG. 28 illustrates one embodiment of the slide assembly 530 in more detail. The slide assembly 530 includes the arm 532, a rail 534, a motor 536, and a belt drive 538. The arm 532 includes a portion 533 shaped to engage a curved side of cup 520. The arm 532 is slideably mounted to the rail 534 and also connected to the belt drive 538. The motor 536 is an electric motor, however in other embodiments, the motor 536 may comprise pneumatic motors, hydraulic motors, etc. The motor 536 is coupled to the belt drive 538 and when actuated, drives the belt drive 538 which causes the arm 532 to traverse the rail 534 and move the cup 520 as discussed above. The motor 536 may be coupled to computer and/or other systems that operate in concert to rotate the turntable 510 to bring the opening 512 (also referring to FIGS. 26 and 27) in one of the outer row of cup receptacles 506 into alignment with the arm 532 for sliding cups, such as cup 520, from the outer to the inner row of cup receptacles 506, 508.

While the modified turntable assembly 504 shown in FIGS. 26 and 27 is illustrated with twelve cup receptacles in the outer row of cup receptacles 506 and seven cup receptacles in the inner row of cup receptacles 508, the present disclosure contemplates fewer or more cup receptacles and fewer or more rows as may be determined by the overall size of the beverage production system 500, size of the cups 520, and other considerations as will suggest themselves to one skilled in the art.

Figure 29:
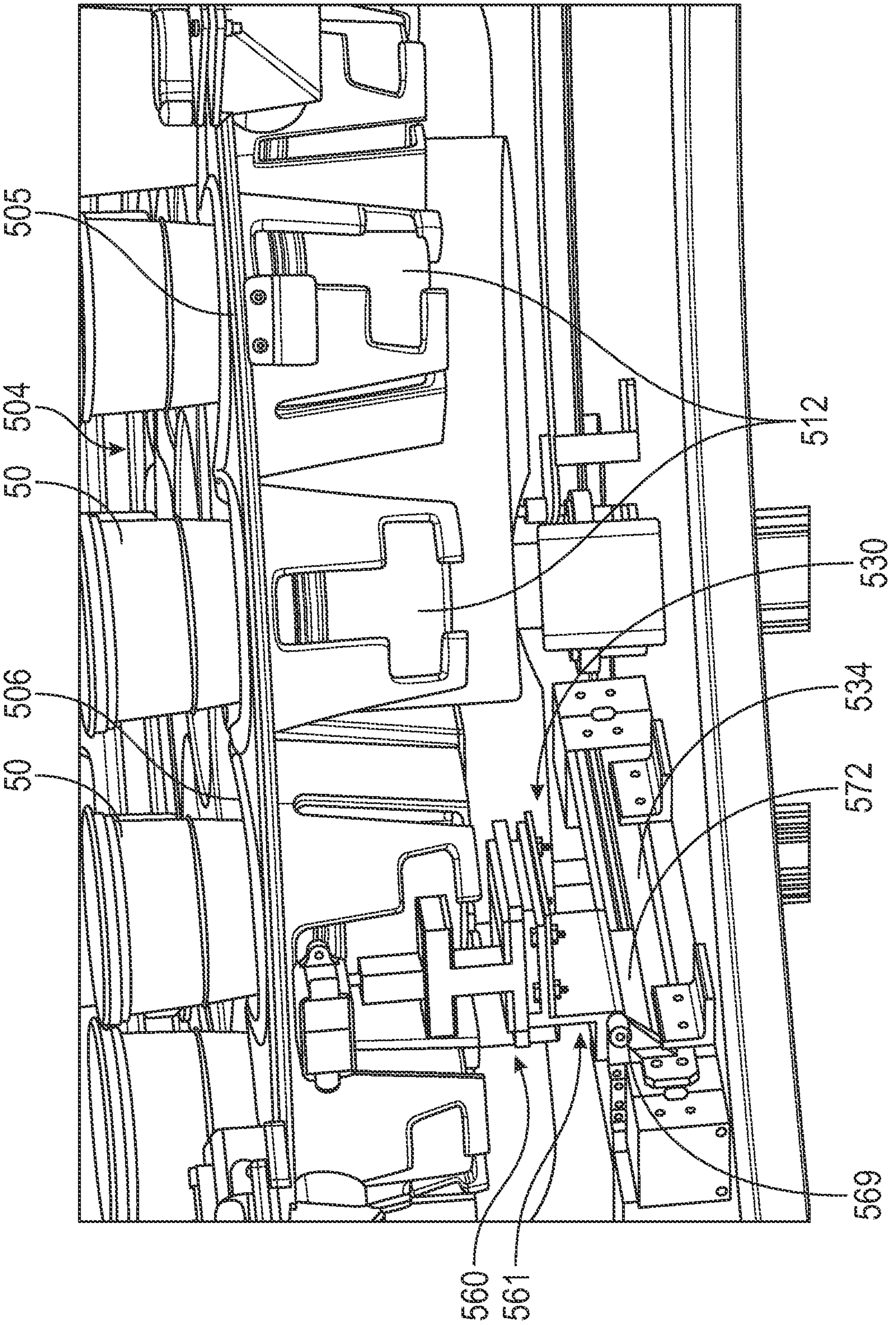
FIG. 29 is a side perspective view of the modified turntable assembly and another embodiment of the slide assembly.
Figure 30A:
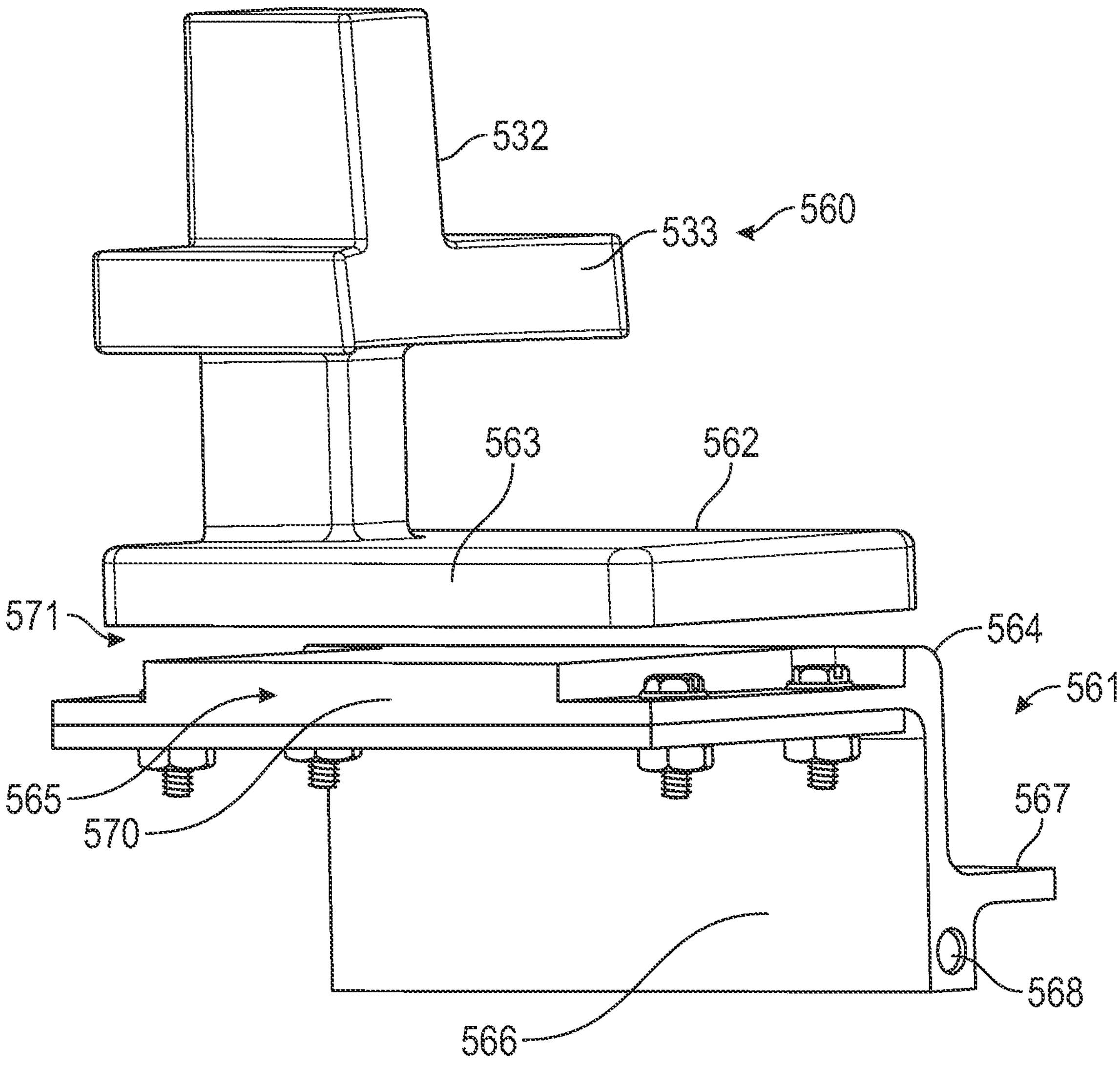
FIG. 30A is a perspective view of the upper and lower magnetic assemblies of the slide assembly shown in FIG. 29 according to another embodiment.

FIG. 29 is another partial cut-away view of the modified turntable assembly 504 illustrating the outer turntable 505 having the outer row of cup receptacles 506. FIG. 29 illustrates another embodiment of the slide assembly 530 positioned below the modified turntable assembly 504. As also shown in an exploded perspective view in FIG. 30A, the slide assembly 530 in this embodiment includes an upper magnetic assembly 560 and a lower magnetic assembly 561. The upper magnetic assembly 560 includes arm 532 with portion 533 configured to engage the cups 50 to transfer cups 50 from the outer row of cup receptacles 506 to the inner row of cup receptacles 508 via the opening 512 in the outer row of cup receptacles 506 substantially as discussed above. The upper magnetic assembly 560 includes a body 562 that may be a metal, plastic, or polymeric body or covering that houses a magnet located within in a lower plate area 563 of the upper magnetic assembly 560. The magnet located in the lower plate area 563 may be integrally formed with the lower plate area 563 or may be housed in an opening formed within the lower plate area 563.

The lower magnetic assembly 561 includes a bracket 564 that is generally L-shaped and includes a flat upper portion 565 that is generally parallel to the lower plate area 563 of the upper magnetic assembly 560. The upper portion 565 includes a magnet 570 coupled to the upper portion 565. The bracket 564 also includes a side portion 566 that is generally perpendicular to the upper portion 565. The bracket 564 includes a lip 567 and a mounting point 568. The lower magnetic assembly 561 is mounted to the rail 534 of the slide assembly 530 by engagement of the lip 567 with an upper portion of the rail 534 and attached at the mounting point 568 to an arm 569 mounted on a side of the rail 534. In this manner, as a belt drive 538 of the slide assembly 530 engages the arm 569 and traverses rail 534, the lower magnetic assembly 561 is carried forward and backward atop the rail 534. In some embodiments, the lip 567 of the lower magnetic assembly 561 may be mounted to a carriage 572 that is positioned atop the rail 534 and the belt drive 538 engages the carriage 572 and/or arm 569 to promote movement of the lower magnetic assembly 561 along slide assembly 530. The magnets of the upper and lower magnetic assemblies 560, 561 may be integrally formed, provided in openings or recesses in respective assemblies, press fitted, glued, mechanically fastened, or otherwise configured as will be readily apparent to one skilled in the art.

The magnets in the upper and lower magnetic assemblies 560, 561 may in some embodiment include multiple magnets in each of the upper and lower assemblies 560, 561. In embodiments with multiple magnets in each of the upper and lower assemblies 560, 561, some of the magnets may be positioned with a different direction of polarity relative to the polarities of the other magnets in each of the upper and lower assemblies 560, 561 so that the upper magnetic assembly 560 can only be magnetically positioned in one (the correct position, as show for example in FIG. 29) direction or orientation to prevent the operator from inadvertently placing the upper magnetic assembly 560 facing the wrong direction.

The rail 534 and lower magnetic assembly 561 are position below a sink 600 (discussed below with regard to FIGS. 31-35, not shown in FIG. 29). The modified turntable assembly 504 is disposed within the sink 600 so that spillage and waste from beverage preparation spills into the sink for draining and cleaning. The upper magnetic assembly 560 is mounted above the sink 600 just above the lower magnetic assembly 561. Thus, the sink 600 is positioned in a gap 571 between upper and lower magnetic assemblies 560, 561. In this manner, when the rail 534 causes the lower magnetic assembly 561 to traverse the slide assembly 530, the attraction of the magnet 570 on the upper portion 565 of the lower magnetic assembly 561 to the magnet in the body 562 in the upper magnetic assembly 560 causes the upper magnetic assembly 560 to traverse a course corresponding to the lower magnetic assembly 561 within and along the bottom of the sink 600.

Since the upper magnetic assembly 560 is disposed in the bottom of the sink 600 where spillage from beverages prepared by the beverage production system 500 may collect, the upper magnetic assembly 560 may require periodic cleaning. As discussed above, the upper magnetic assembly 560 may be fabricated such that the outer surfaces are plastic, polymeric, or otherwise provided with a coating that allows for easy cleaning. In this manner, the upper magnetic assembly 560 may be easily removed for cleaning since there is no mechanical or fixed connection with the slide assembly 530 and the only engagement between the upper and lower magnetic assemblies 560, 561 is magnetic. Thus, the magnetic coupling of the upper and lower magnetic assemblies 560, 561 allows for easy, by-hand removal and replacement by a user or operator of the beverage production system 500 without need of tools or disassembly of the slide assembly 530. Further this configuration prevents spillage from preparation of beverages to contact the lower magnetic assembly 561, the motor 536, the belt drive 538, rail 534, and so on positioned below or under the sink.

Figure 30B:
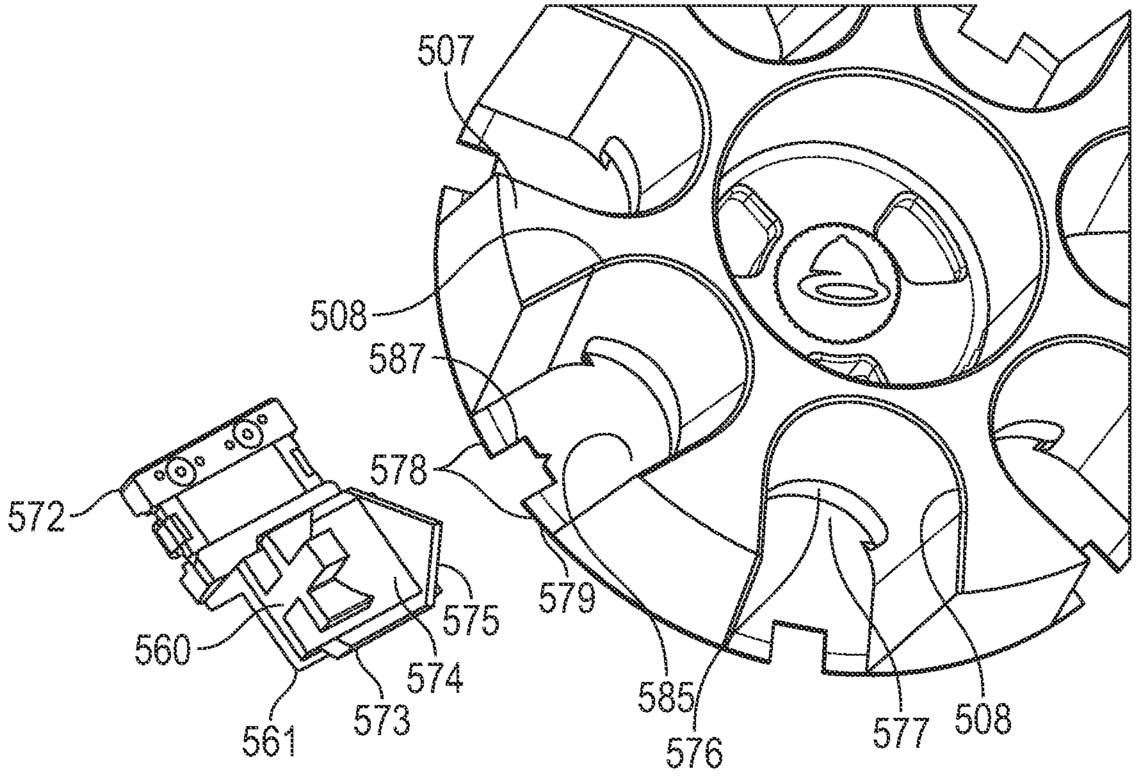
FIG. 30B is a perspective view of the upper and lower magnetic assemblies and inner turntable according to another embodiment.
Figure 30C:
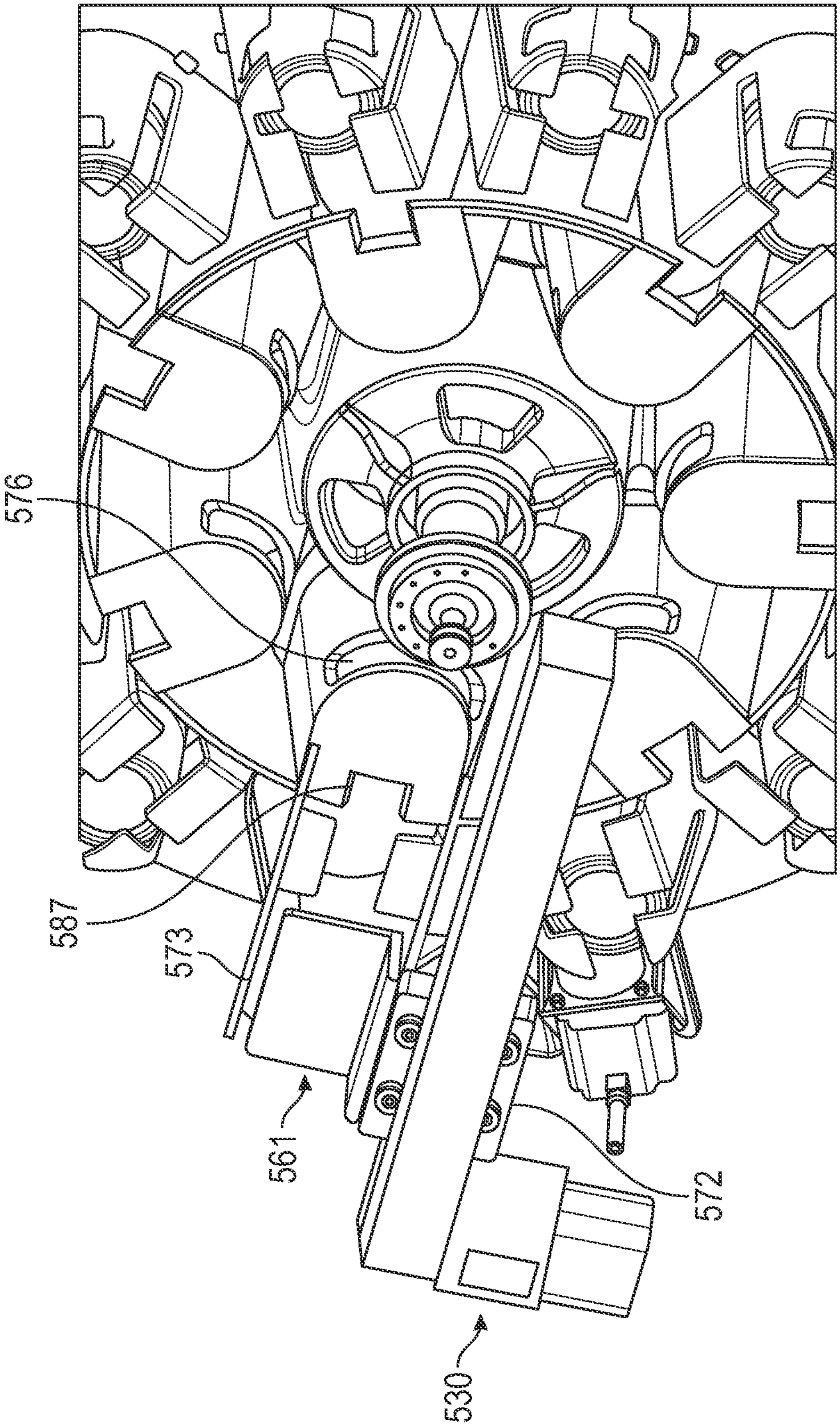
FIG. 30C is a perspective view of the underside of the slide assembly and modified turntable according to another embodiment.

FIG. 30B is a perspective view of another embodiment illustrating the lower magnetic assembly 561 coupled to the carriage 572 with the remainder of the slide assembly 530 and outer turntable 505 cut-away. FIG. 30C illustrates a lower or underneath perspective view of the inner and outer turntables 505, 507 and the slide assembly 530. In the illustrated embodiments, the upper magnetic assembly 560 is provided with a pusher plate 573 that may be attached to a bottom or lower portion of the body 562 of the upper magnetic assembly 560. In some embodiments, the pusher plate 573 may not be attached to the bottom of the body 562 but instead merely attached or fitted to the front end 574 of the body 562. The pusher plate 573 may be configured with a wedge 575 or V-shaped front edge. It will be appreciated that ice dispensed into cups 50 located in the outer turntable 505 may spill and collect in the outer row of cup receptacles 506, and as cups 50 are moved to the inner row of cup receptacles 508, ice may be pushed by the cups 50 and consequently also collect in to the inner row of cup receptacles 508. The ice may further fall and collect in the sink 600 below the inner and outer turntables 505, 507. Since the upper magnetic assembly 560 is positioned in the bottom of the sink 600, the ice may impede the smooth and efficient transition of the upper slide assembly 560 along the bottom of the sink 600 while transferring cups 50 between the outer and inner turntables 505, 507. The wedge 575 front edge of the pusher plate 573 acts as a snow plow moving or displacing ice located in the bottom of the sink 600 in the path of the upper magnetic assembly 560 during cup transfer.

FIGS. 30B-C also show another embodiment of the inner turntable 507 with modifications to the inner row of cup receptacles 508. In this embodiment, an opening 576 is provided in a back low portion 577 of each of the inner row of cup receptacles 508. The opening 576 allows for ice that collects or is pushed into the inner row of cup receptacles 508, for example by cups 50, to further be pushed and exit the inner row of cup receptacles 508, via opening 576, and fall into the sink 600 position below the inner turntable 507. This prevents the build-up of ice that might otherwise collect in bottom of the inner row of cup receptacles 508 and impede the transfer of cups 50 into the inner row of cup receptacles 508.

Further in this embodiment, the inner row of cup receptacles 508 includes a ramp 578 along a lower front edge 579 of the inner row of cup receptacles 508. The ramp 578 gradually increases in height or thickness from the lower front edge 579 toward a height of a bottom 585 of the inner row of cup receptacles 508. The ramp 578 allows a bottom edge of the cups 50 to transition more smoothly from the outer to the inner row of cup receptacles 506, 508, instead of striking or catching on a vertical or abrupt edge at the lower front edge 579 of the inner row of cup receptacles 508.

Also shown in FIGS. 30B-C is a notch 587 that forms a rectangular opening along the lower front edge 579 of the inner row of cup receptacles 508. The notch 587 allows the arm 532 of the upper magnetic assembly 560 to extend sufficiently into the inner row of cup receptacles 508 to allow for movement of the cup 50 completely into position in the inner row of cup receptacles 508.

Figure 31:
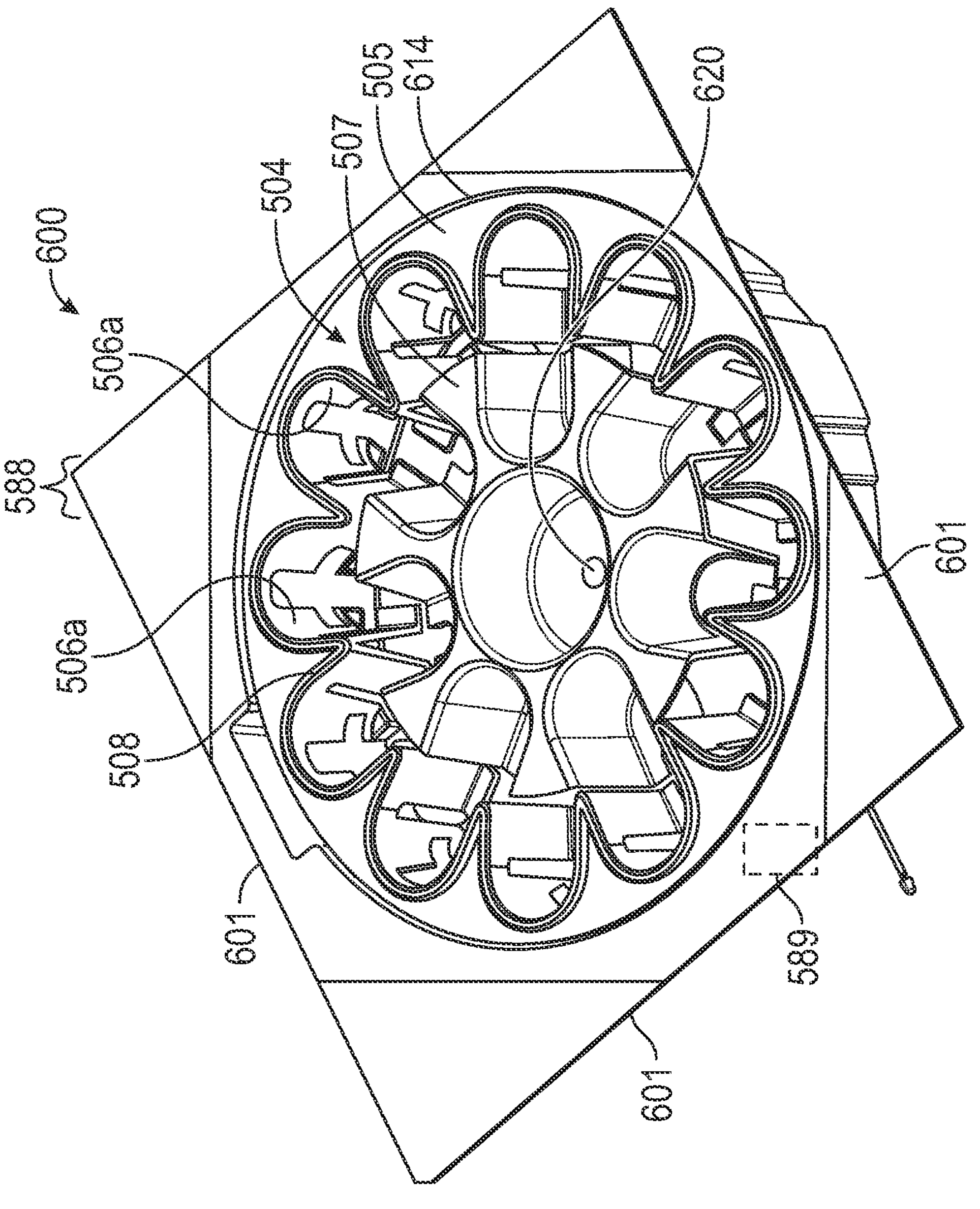
FIG. 31 is a perspective view of the modified turntable assembly positioned in a sink according to another embodiment.

FIG. 31 is a perspective view of the modified turntable assembly 504 disposed in a sink 600 according to another embodiment of the beverage production system 500. In this embodiment, an upper sensor 588 is shown positioned above the inner turntable 507. The upper sensor 588 may be attached to a portion or structure of the beverage production system 500 above the inner turntable 507. The upper sensor 588 is positioned to sense, vertically relative to the surface of the turntable 504, the presence or absence of a cup 50 in the inner row of cup receptacles 508. In this embodiment, only one sensor 588 is provided and positioned to determine whether a cup 50 is located in the inner row cup receptacle 508 at the position where cups 50 are transitioned by the slide assembly 530 from the outer to the inner row of cup receptacles 506, 508. However, it should be appreciated that in other embodiments, one or more additional sensors may be used and positioned to detect the presence of cups 50 in other locations or the presence of cups 50 in all the cup receptacles in the inner turntable 507. Further upper sensor 588 may be movable, such as driven by a motor, to sense cups 50 in other locations, or may include an array of sensors variously directed to sense cups 50 in any combination of cup receptacles in the inner turntable 507.

Similarly, a side sensor 589 is position adjacent the outer turntable 505 and may be attached to the sink 600 or to other structures of the beverage production system 500. The side sensor 589 is positioned to sense, horizontally relative to the surface of the turntable 504, the presence or absence of a cup 50 in the outer row of cup receptacles 506. In this embodiment, only one sensor 589 is provided and positioned to determine whether a cup 50 is located in the outer row cup receptacle 506 at the position where cups 50 are transitioned by the slide assembly 530 from the outer to the inner row of cup receptacles 506, 508. The side sensor 589 may be positioned at a height so as to detect horizontally across and above the outer turntable 505 and a portion of a cup 50 extending above outer turntable 505. It should be appreciated that in other embodiments, one or more additional sensors may be used and positioned to detect the presence of cups in other locations or the presence of cups 50 in all the cup receptacles in the outer turntable 505. Further, lower sensor 589 may be movable, such as driven by a motor, to sense cups 50 in other locations, or may include an array of sensors variously directed to sense cups 50 in any combination of cup receptacles in the outer turntable 505. The sensor 588, 589 may be photoelectric, ultrasonic, passive infrared or other motion sensors, infrared transducers, ultrasonic, cameras, computer visions, combinations thereof, or any known or after developed sensor capable of detecting the presence of one or more cups 50 in the inner and/or outer row of cup receptacles 506, 508.

The following is a brief overview, according to one embodiment, of the operation of a portion of the beverage production system 500. In one embodiment, the slide assembly 530 is positioned to transition cups 50 from the outer to the inner row of cup receptacles 506, 508 at a location immediately preceding the location in the outer turntable 505 where cups 50 are dispensed and filled. As cups 50 are dispensed and filled, the fulfilled beverages remain in cup receptacles in the outer turntable 505. As the outer turntable 505 is rotated, for example in a clock-wise direction, to continue dispensing and filling beverages, the side sensor 589 determines whether a cup 50 is present in the cup receptacle located adjacent the slide assembly 530. If no cup 50 is detected, the outer turntable 505 may be rotated to continue filling beverages. However, if the side sensor 589 detects a cup 50 in the adjacent cup receptacle in the outer turntable 505, then the upper sensor 588 detects whether a cup 50 is present in the inner row cup receptacle 508 at the location a cup 50 is transitioned to the inner turntable 507 by the slide assembly 530. If the upper sensor 588 determines no cup 50 is present in the adjacent inner row cup receptacle 508, then the slide assembly is actuated and the cup 50 is moved or transitioned from the outer row cup receptacle 506 to the inner row cup receptacle 508. The outer turntable 505 is then rotated to fill the next beverage in the cup receptacle vacated by the transition. If however the upper sensor 588 detects a cup 50 in the inner row cup receptacle 508 located adjacent the slide assembly 530, then the inner turntable 507 is rotated, for example in either direction, to determine whether the next inner cup receptacle is occupied. If the next cup receptacle on the inner row is occupied, the inner turntable 507 continues to be rotated until an empty cup receptacle is located or it is determined that all cup receptacles in the inner turntable 507 are occupied. The system may employ logic to periodically rotate or re-check for empty cup receptacles on either or both the outer and inner turntables 505, 507.

Figure 32:
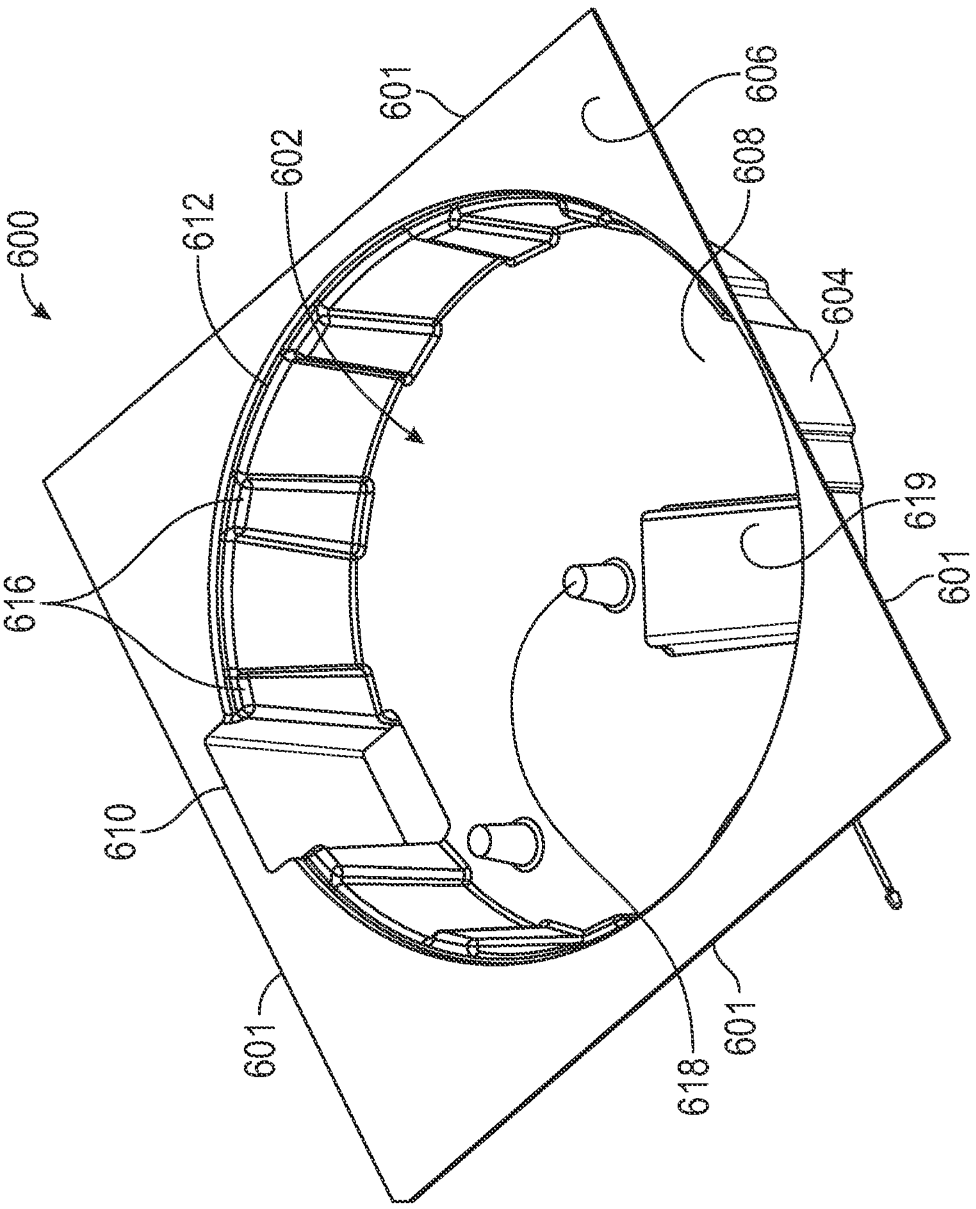
FIG. 32 is a perspective view of the sink and drain according to one embodiment.

FIG. 31 illustrates details about the sink 600. The sink 600 is substantially rectangular in this embodiment but may be oval, round, or otherwise shaped in other embodiments. The sink 600 may be constructed of plastic, polymeric, aluminum, or other materials. In this embodiment, the sink 600 a single, unitary component constructed of substantially polymeric material. Referring also to FIG. 32, the sink 600 has upper outer edges 601 that extend around the sink 600 from a recessed tub 602. The upper outer edges 601 are provided to retain and position the sink 600 in a cabinet, frame, or other structure (not shown) of the beverage production system 500. The recessed tub 602 has a wall 604 that extends from a top surface 606 to a bottom surface 608 of the sink 600 that defines a generally round outer shape of the recessed tub 602. The sink 600 includes an opening or drain 610 on the bottom surface 608 where spillage and waste from beverages produced by the beverage production system 500 may collect and be removed from the sink 600. Plumbing (not shown) may be connected the drain 610 to evacuate the spillage and waste.

Figure 33:
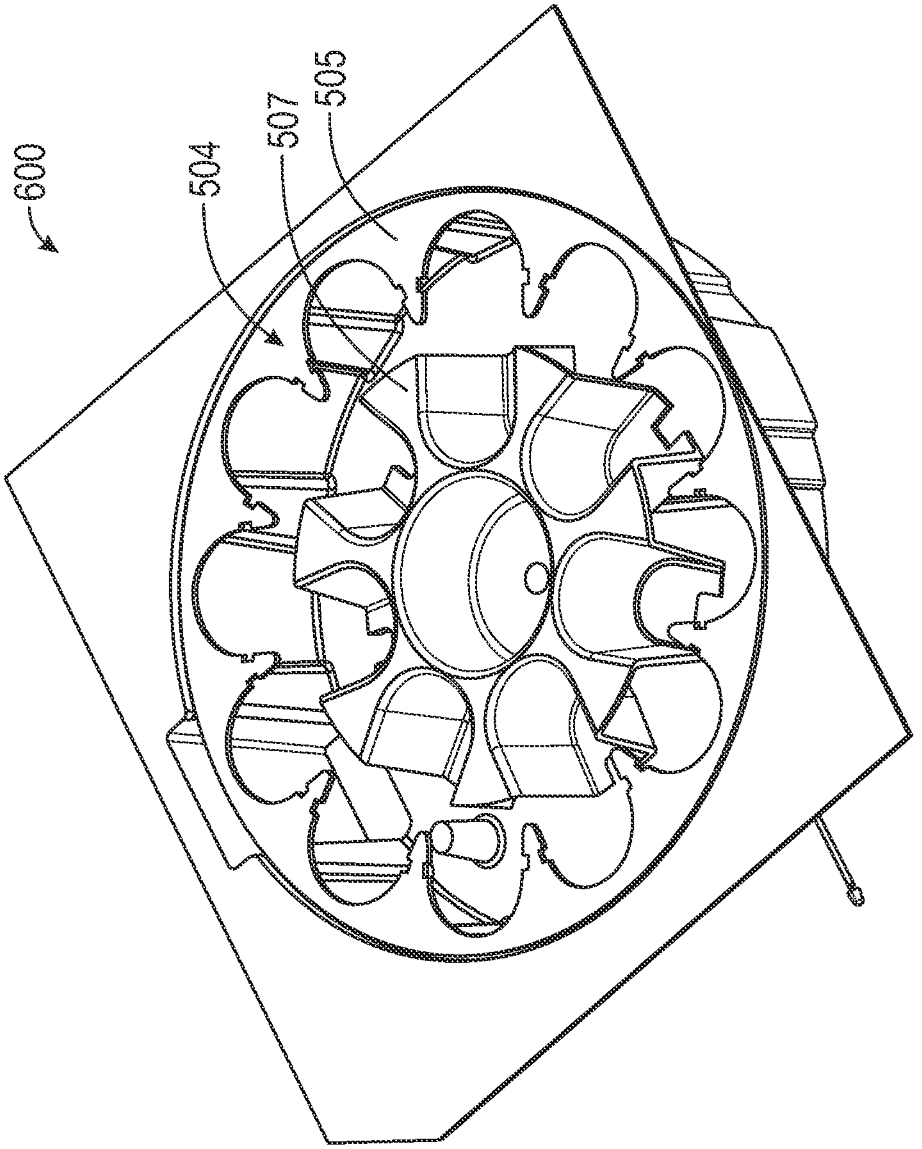
FIG. 33 is a perspective view of the modified turntable assembly and positioned in a sink with the cup holders removed according to another embodiment.

Referring to FIGS. 31-33, the sink 600 and recessed tub 602 are resized to receive the modified turntable assembly 504. In this view, the outer and inner turntables 505 and 507 with outer and inner rows of cup receptacles 506 and 508 are shown positioned in the recessed tub 602 of sink 600. Notably, cup holders **506*a* (discussed in greater detail below) are shown disposed in the outer row of cup receptacles 506 in FIG. 31 and shown removed from the view illustrated in FIG. 33. In some embodiments, such as illustrated in FIGS. 31-36, the cup holder 506*a* may only be provided in the outer row of cup receptacles 506 and the inner row of cup receptacles 508 may not include the cup holder 506*a* but instead the cup holders may be integrally formed as part of the inner turntable 507**.

The recessed tub 602 may include a lip 612 (see FIG. 32) extending about an upper portion of the recessed tub 602 that is configured to receive an outer edge 614 (see FIG. 31) of the outer turntable 505. The wall 604 may include ribs 616 extending from wall 604 or other various configurations to promote engagement with mating portions (not shown) of the outer turntable 505. Further, a feature 619, such as a track or channel is formed in the bottom 608 of the sink 600. The feature 619 is configured to promote guided movement of the upper magnetic assembly 560 along the bottom 608 of the sink 600 as the slide assembly 530 is actuated, as discussed above with regard to FIGS. 27-30.

Figure 34:
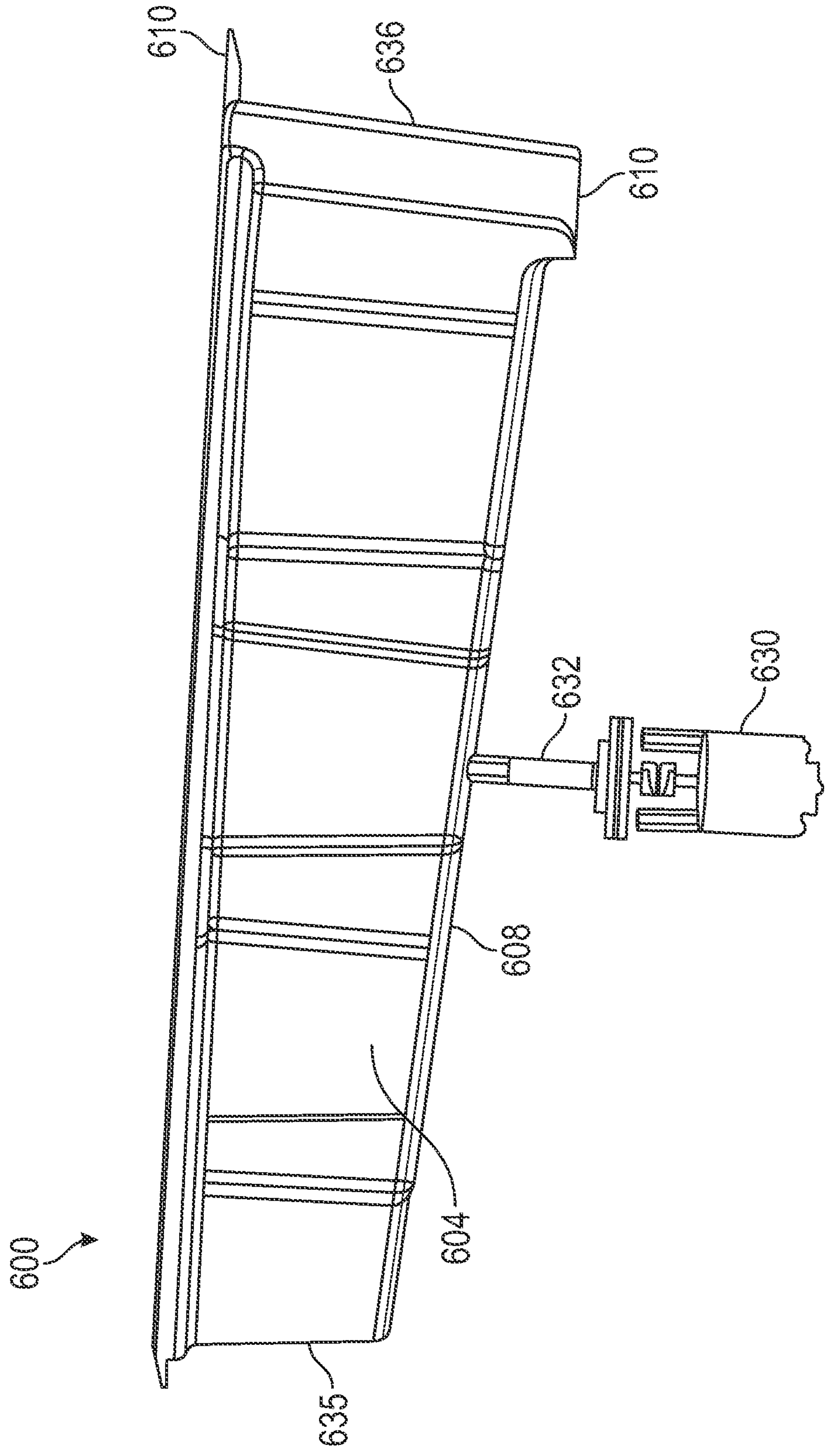
FIG. 34 is a perspective view of another embodiment of the sink with the modified turntable assembly removed.

The sink 600 may also include a centering post 618 provided in the middle of the recessed tub 602 and extending from the bottom 608 of the sink 600 which is configured to mate with an opening 620 in the center of the inner turntable 507. In some embodiments, the centering post 618 is provided to orient the inner turntable 507 for rotation about the centering post 618. In this embodiment, a motor or drive may be positioned elsewhere and engage the inner turntable 507 for rotation of the inner turntable 507. Referring also to FIG. 34, a side view of the sink 600 is illustrated. In this embodiment, the centering post 618 may be omitted and an opening (not shown) in the bottom 608 of the sink 600 may be provided at the location of the centering post 618. A motor 630 may drive a shaft 632 that extends through the opening and an engagement end 634 (see also FIG. 35) of the shaft 632 may be configured for attachment to the inner turntable 507 for rotation of the inner turntable 507. In this embodiment, the inner turntable 507 is formed with a centrally located opening formed to mate with the engagement end 634 of the shaft 632 for rotation. As illustrated in FIG. 34, the sink 600 can been seen as generally sloped from a left side 635 to a right side 636 towards the drain 610 to promote flow of liquid spillage in the recessed tub 602 toward the drain 610 for evacuation.

Figure 35:
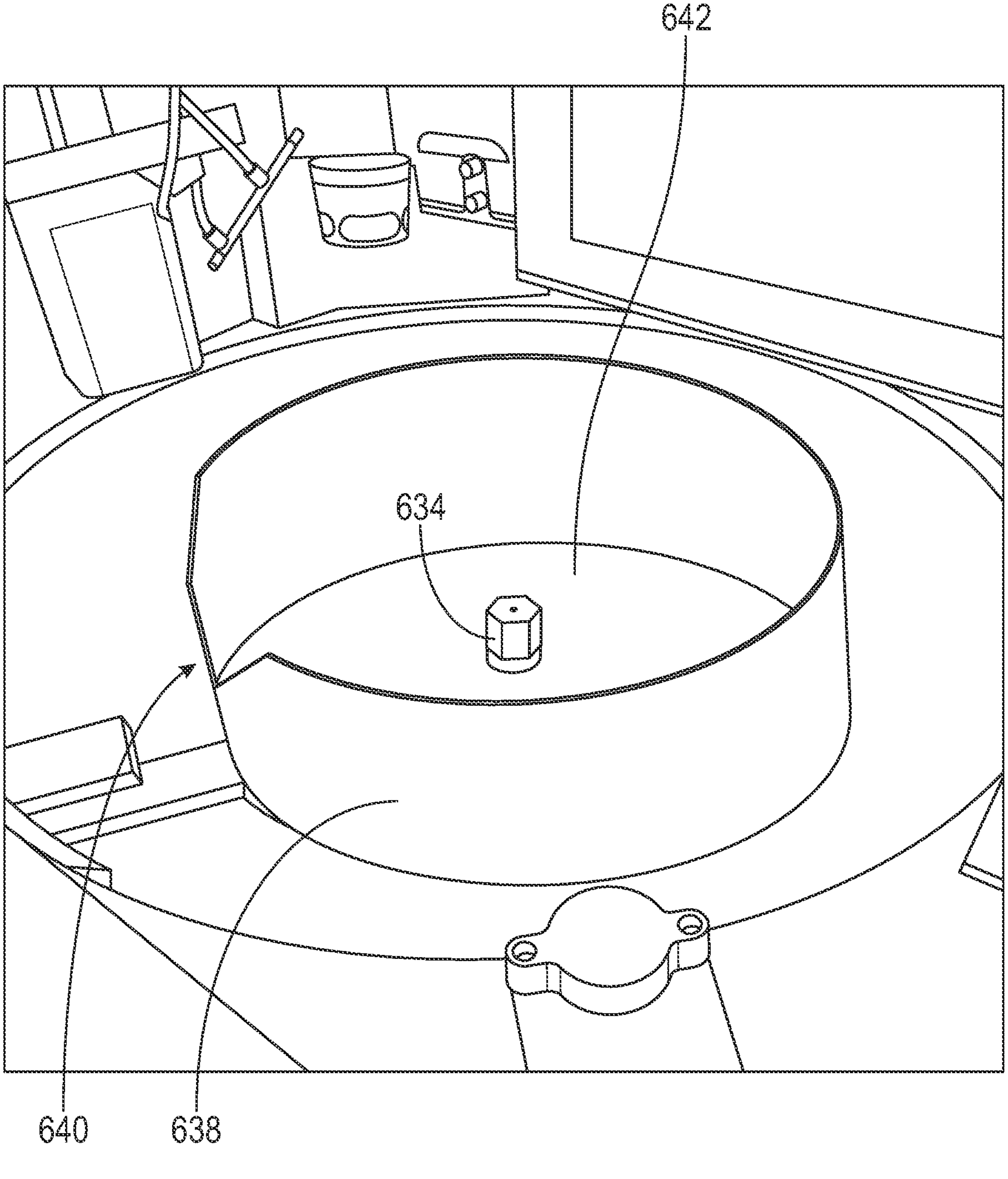
FIG. 35 is a perspective view of the sink and drain according to one embodiment.

In the embodiment illustrated in FIG. 35, the sink 600 may also include and inner wall 638 that generally defines an inner concentric ring (relative to an outer concentric ring defined by the wall 604 of the recessed tub 602) within the recessed tub 602 that is sized and configured to receive the inner turntable 507. In this embodiment, the inner wall 638 does not form a complete circle and includes an opening 640. The opening 640 is provided at the location on the modified turntable assembly 504 at which cups 50 are transferred from the outer row of cup receptacles 506 to the inner row of cup receptacles 508 by the slide assembly 530, as previously discussed, to allow the cups 50 to pass therebetween. The inner wall 638 may provide additional structure to stabilize the inner turntable 507 during rotation and may also act as a barrier to prevent cups 50 not being transitioned between outer and inner turntables 505 and 507 from moving or slipping out of the inner row of cup receptacles 508 during rotation. In this embodiment, the inner wall 638 may prevent liquid spillage from directly reaching the drain 610. Accordingly, in this embodiment, the inner wall 638 may be provided with a drain access opening 642 along a lower portion of the wall 638 adjacent the bottom 608 portion of the sink 600. The drain access opening 642 may be located on a side of the wall 638 nearest the drain 610 such that the sloped overall design of the sink 600 bottom 608 discussed above (see FIG. 34) allows spillage to exit the area within the inner wall 638 and flow to the drain 610.

As can be seen in FIGS. 29-35, each of the individual cup holders 506*a*, the outer and inner turntables 505 and 507, and the upper magnetic assembly 560 of the slide assembly 530 are all readily removeable, separately or together, for ease of cleaning the individual cup holders 506*a*, the outer and inner turntables 505 and 507, and the upper magnetic assembly 560. Once removed, the sink 600 and recessed tub 602 can be access and cleaned, with or without removal of the sink 600, and any excess fluid from cleaning will slope to the drain 610 and exit the sink 600. Thus, the inner turntable 507 can be easily removed and replaced back into position in the sink by simply lifting the inner turntable 507 out of resting engagement with the engagement end 634 (see also FIG. 35) of the shaft 632. Similarly, the outer turntable 505 may be easily removed and replaced into position in the sink 600 without any disassembly or reassembly of drive system or other components.

Figure 36A:
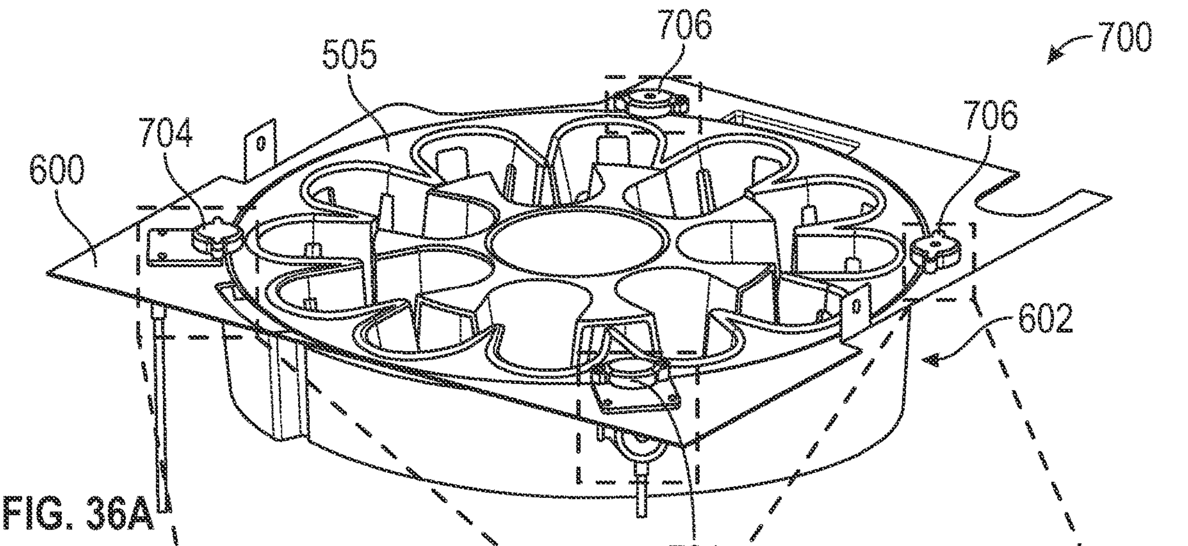
FIGS. 36A-E are views of the modified turntable assembly drive system, according to one embodiment.
Figure 36B:
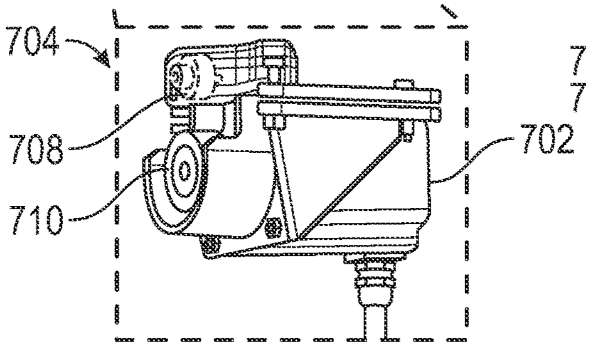
Figure 36C:
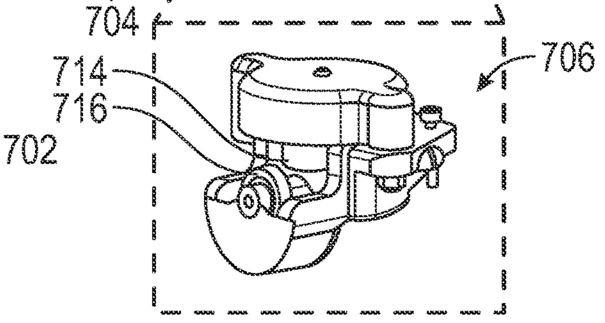
Figure 36D:
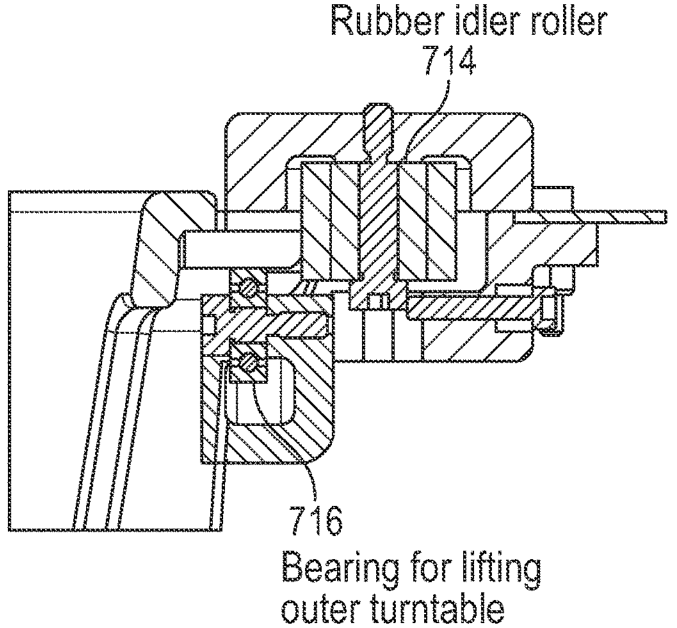
Figure 36E:
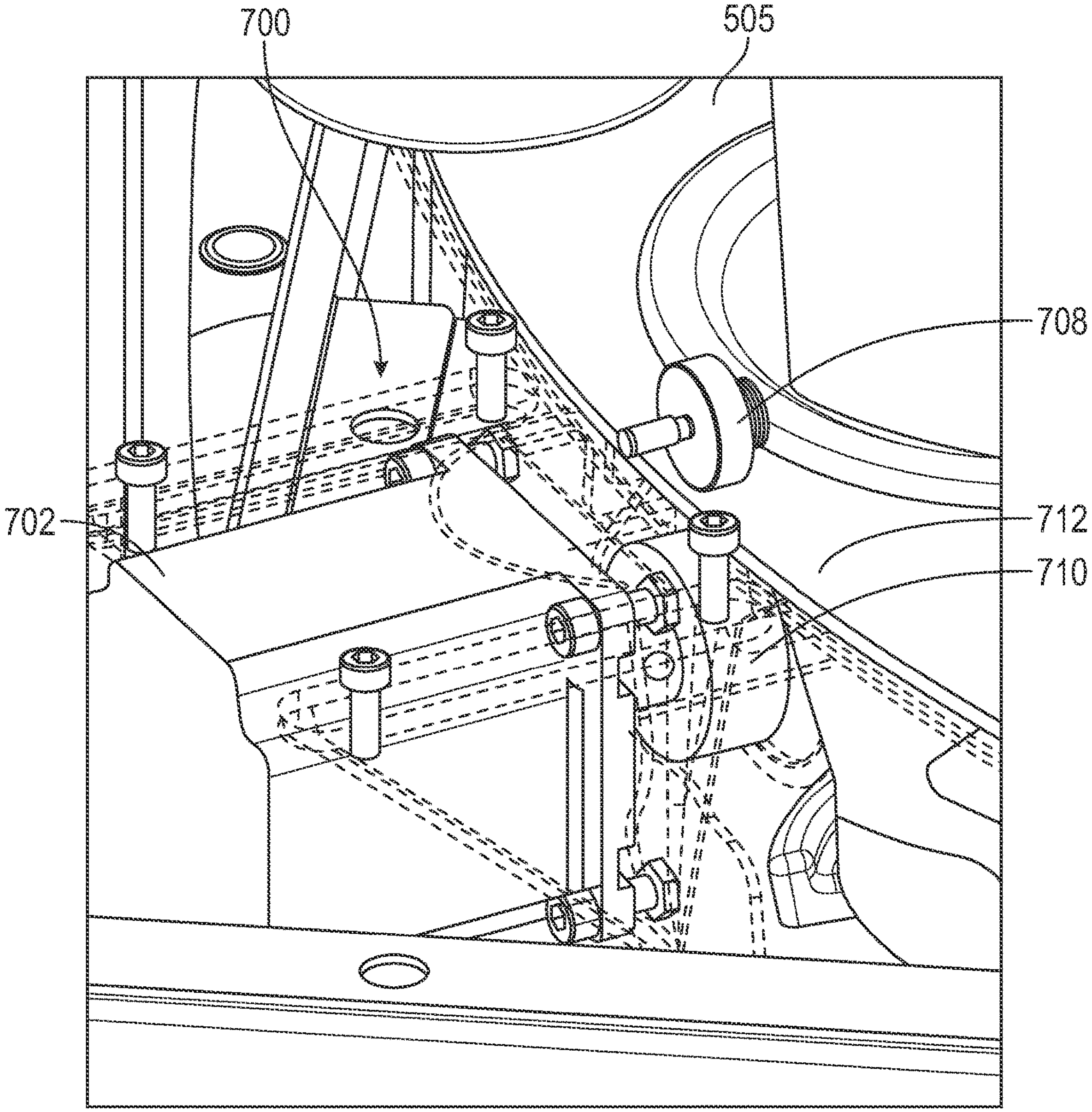

FIGS. 36A-E, are perspective views illustrating one embodiment of a drive system 700 for driving the outer turntable 505. FIG. 36A illustrates the outer turntable 505 disposed in the recessed tub 602 of the sink 600. In this embodiment, the drive system 700 may include two pinch drives 704 and two idlers 706 mounted to the sink 600. The pinch drives 704 each include an electric motor 702, but in other embodiments pneumatic or other systems may be employed. The motor 702 drives up-down pinch rollers 708, 710. In some embodiments, the electric motor 702 may drive the rotation of both pinch rollers 708, 710, while in other embodiments the drive may drive the rotation of only the down pinch roller 710 and the up pinch roller 708 is provided for stability and tensioning or vice-versa. The pinch drive 704 and up-down pinch rollers 708, 710 can be seen in exploded view in FIG. 36E where an edge portion 712 of the outer turntable 505 is shown positioned between the up-down pinch rollers 708, 710 such that the up-down pinch rollers 708, 710 frictionally engage the upper and lower surfaces of the edge portion 712 of the outer turntable 505. Thus, as the electric motor 702 drives one or both of the pinch rollers 708, 710, the frictional engagement of the up-down pinch rollers 708, 710 with the edge portion 712 of the outer turntable 505 promotes rotation of the outer turntable 505 in the desired direction.

Idlers 706 include idle roller 714 and lift bearing 716. Idle roller 714 is positioned against and engages the outer edge of the outer turntable 505 and is provided to tension and stabilize the outer turntable 505 along a horizonal plane parallel to the upper horizontal surface of the outer turntable 505. Similarly lift bearing 716 is located under and engages a lower surface of the edge portion 712 of the outer turntable 505 and is provided to tension and stabilize the outer turntable 505 along a vertical plane parallel to the vertical surface of wall 604 of the recessed tub 602, for example to prevent sagging of the outer turntable 505 near the location of the idler 706. The up-down pinch rollers 708, 710 and idle roller 714 and lift bearing 716 may be constructed of rubber or other material to promote frictional engagement of the rollers with the outer turntable 505 surfaces.

Although pinch drives 704 and idlers 706 are shown disposed at certain positions about the sink 600 and outer turntable 505, the pinch drives 704 and idlers 706 may be provided in other arrangements and configurations in other embodiments. Similarly, although two pinch drives 704 and two idlers 706 are shown, it is contemplated that fewer or more may be provided in other embodiments. Also, while two idlers 706 are described, it will be appreciated that the idlers 706 are provided primarily to support the outer turntable 505 and that other support structures or systems may be employed as will readily suggest themselves to one skilled in the art.

Figure 37:
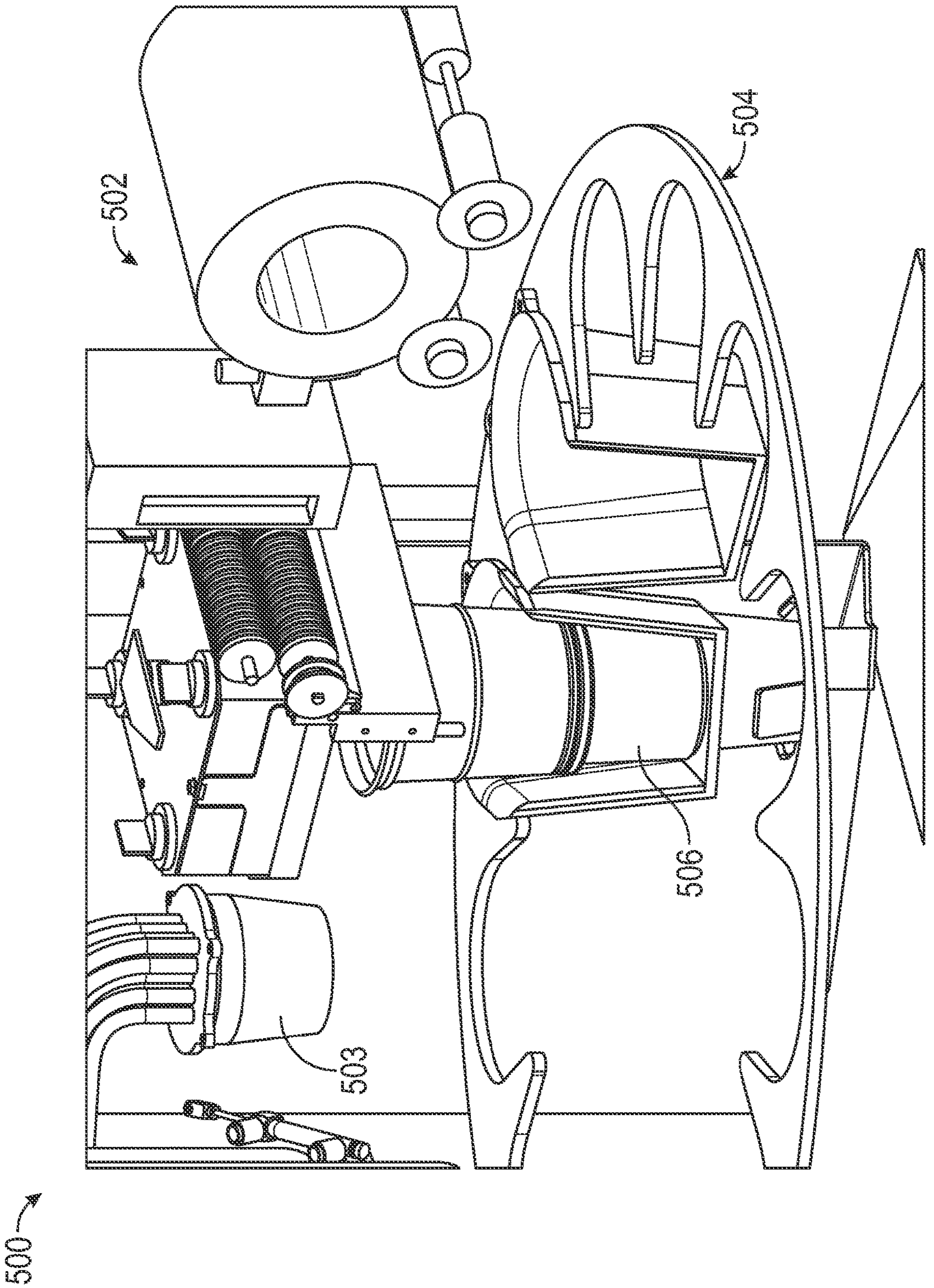
FIG. 37 is another perspective view of the beverage production system of FIG. 25 illustrating a lidding and printing assembly according to one embodiment.

Referring to FIG. 37, a portion of the beverage production system 500 is shown in more detail. A cup 50 is shown disposed in one of the outer row of cup receptacles 506 (shown in partial cut-away) of the modified turntable assembly 504 (also shown in partial cut-away). The lidding and printing assembly 502 and beverage dispensing station 503 are also illustrated.

Figure 38:
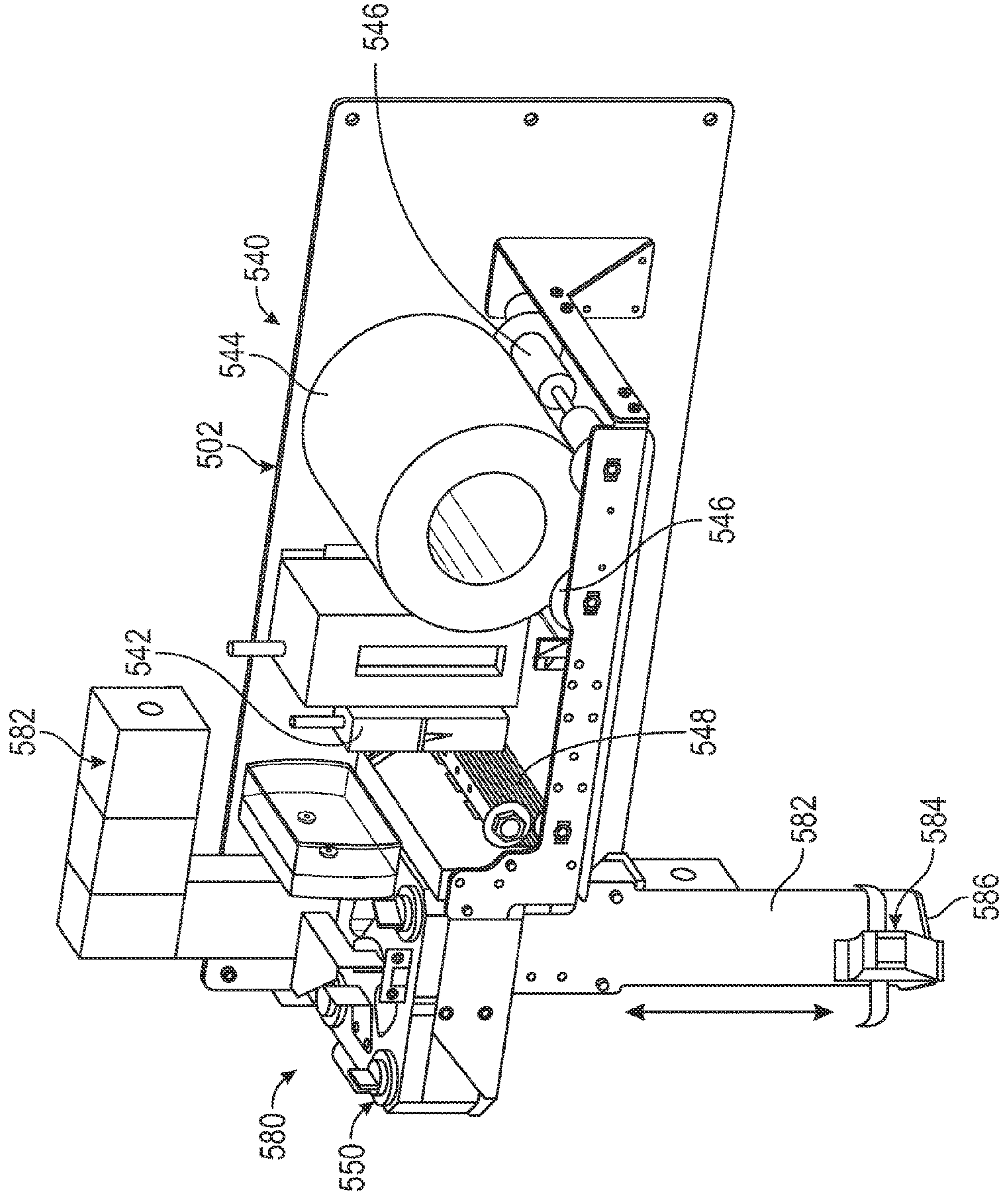
FIG. 38 is view of the lidding and printing assemblies and lift assembly according to one embodiment.

Referring also to FIG. 38, the lidding and printing assembly 502 is shown in more detail. The lidding and printing assembly 502 includes sealing film 544, an in-line printer 540, and piercer 542. The sealing film 544 may be provided in a roll (as shown) and positioned on a series of rollers 546. The sealing film 544 may be fed into one or more motor/rollers 548 such that when the sealing film 544 is drawn by the one or more motor/rollers 548 the roll of sealing film 544 unrolls and extends above the cup 50 into position for sealing as a lid 60. The in-line printer 540 prints beverage identifying indicia on the upper or top side of the sealing film 544 such that it is visible to the server or customer. The beverage identifying indicia may identify the type and size of the beverage, associated order number, customer name, or other any other useful or identifying information.

The piercer 542 may puncture a hole, score, or make various indentions in the sealing film 544 to promote introduction of, for example but not limited to, a drinking straw through the sealing film 544. Sealer bulbs 550 are positioned above the sealing film 544 and cup 50 lip or rim. The sealer bulbs 550 may then be electrified to generate heat to heat seal the sealing film 544 about the lip or rim of the cup 50. The sealing film 544 may then be separated, such as but not limited to, by cutting the sealing film 544 or tearing along perforated or scored sections of the sealing film 544. The present disclosure also contemplates that the process of printing, piercing, and heat sealing may occur in other orders in other embodiments.

Also shown in FIG. 38 is a lift assembly 580. The lift assembly 580 operates to lift the cup 50 vertically from a seated position in the outer row of cup receptacles 506 to bring the top lip or rim of the cup 50 into position below the lidding and printing assembly 502 for lidding the cup 50. Lift assembly 580 includes a linear actuator 582 and cup centering device 584. The cup centering device 584 is coupled to an elbow 586 that extends from the bottom of the linear actuator 582. A belt driven motor (not shown) drives the linear actuator 582 vertically up and down perpendicular to a plane parallel with the surface of the modified turntable assembly 504. The belt driven motor (not shown) may be electric, hydraulic, pneumatic, etc. A plunger and limit switch 583 is configured to determine when the linear actuator 582 has raised the cup 50 vertically sufficient into position for lidding.

Figure 39A:
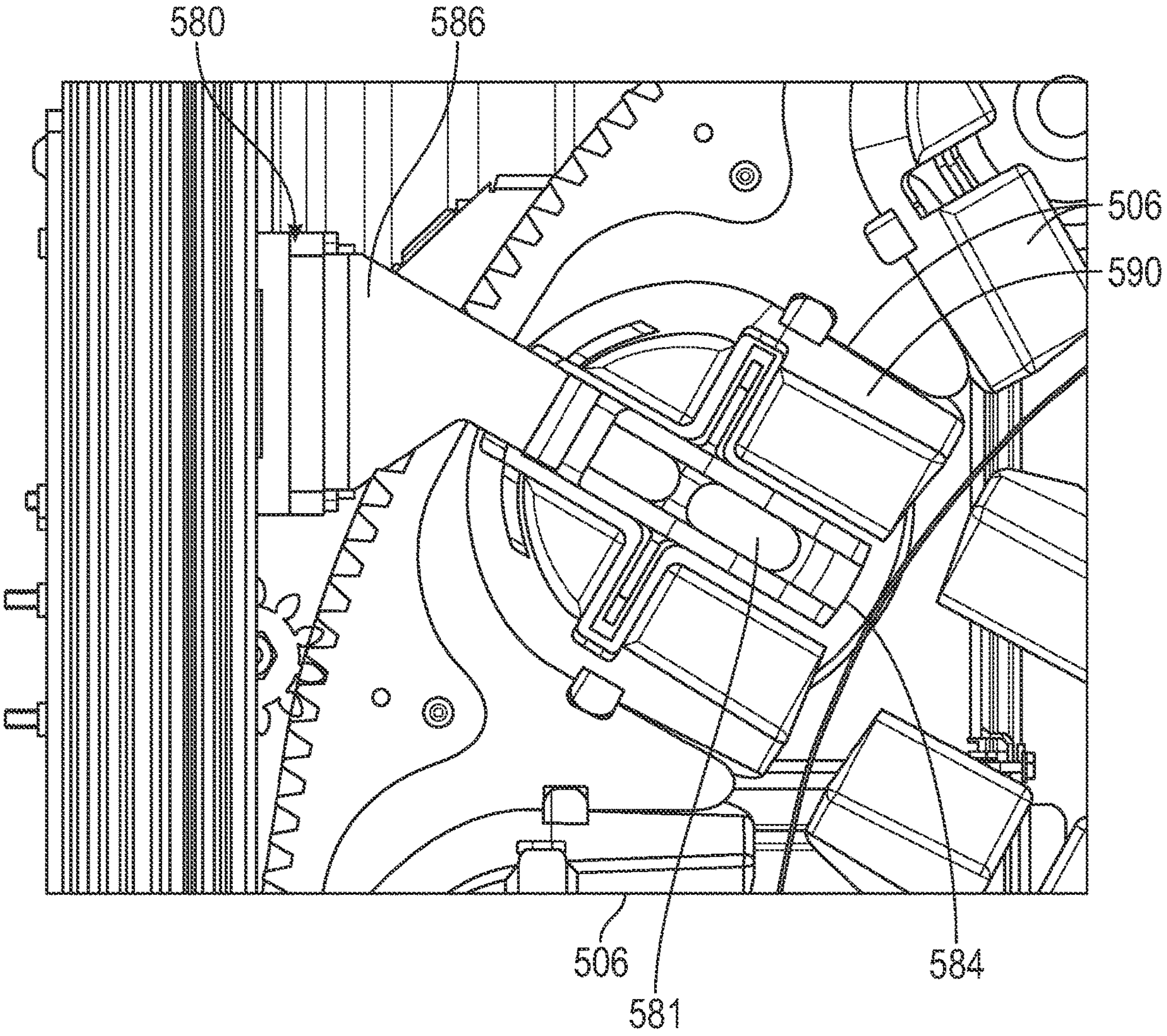
FIG. 39A is a top view of a portion of the modified turntable assembly and the lift assembly according to one embodiment.
Figure 39B:
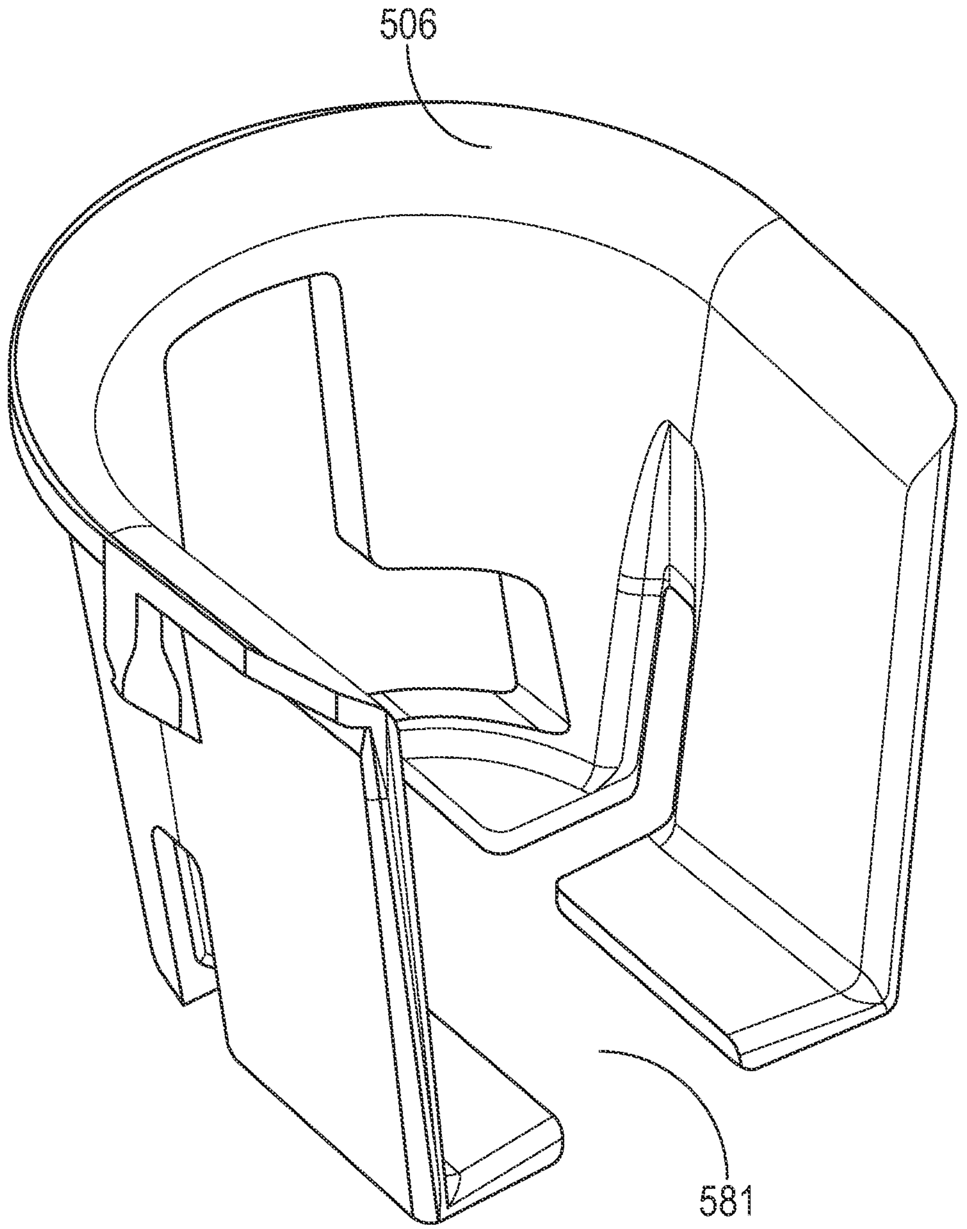
FIG. 39B is a perspective view of a cup receptacle according to one embodiment.

Referring also to FIG. 39A, a top down view of a portion of the modified turntable assembly 504 is shown. As can be seen, the cup centering device 584 is positioned in an opening in a bottom 590 of the outer row of cup receptacles 506. In the present embodiment, the cup centering device 584 is cross-shaped and extends through a larger but similarly configured cross-shaped opening 581 in a bottom of the outer row of cup receptacle 506. FIG. 39B further illustrates a perspective view in more detail of one of the outer row cup receptacle 506, which may also be referred to as cup holder 506*a*. The cup centering device 584 is configured to engage a bottom of the cup 50 and lift the cup 50 vertically out of the outer row of cup receptacles 506 as the linear actuator 582 raises. The cup centering device 584 may be configured to promote engagement of the bottom of the cup 50 so that the cup centering device 584 is generally centered about the bottom of the cup 50 to stabilize the cup 50 during the lifting and lowering process. Although the cup centering device 584 is shown as generally cross-shaped, other shapes and configurations will readily suggest themselves as alternatives for engaging the bottom of the cup 50 for these purposes.

When the lidding and printing process is complete, the linear actuator 582 lowers the cup 50 back into position in the outer row of cup receptacles 506. Before the outer turntable 505 is rotated, the linear actuator 582 may be further lowered such that the cup centering device 584 is positioned below and clear of the bottom of the outer row of cup receptacles 506 so as not to interfere with the rotation of the outer turntable 505.

In other embodiments (not shown), all or portions of the lidding and printing assembly 502 may be positioned above the cup 50 and moved vertically downward toward the cup 50 for lidding the cup 50 while the cup 50 remains stationary in the outer row of cup receptacles 506.

Figure 40A:
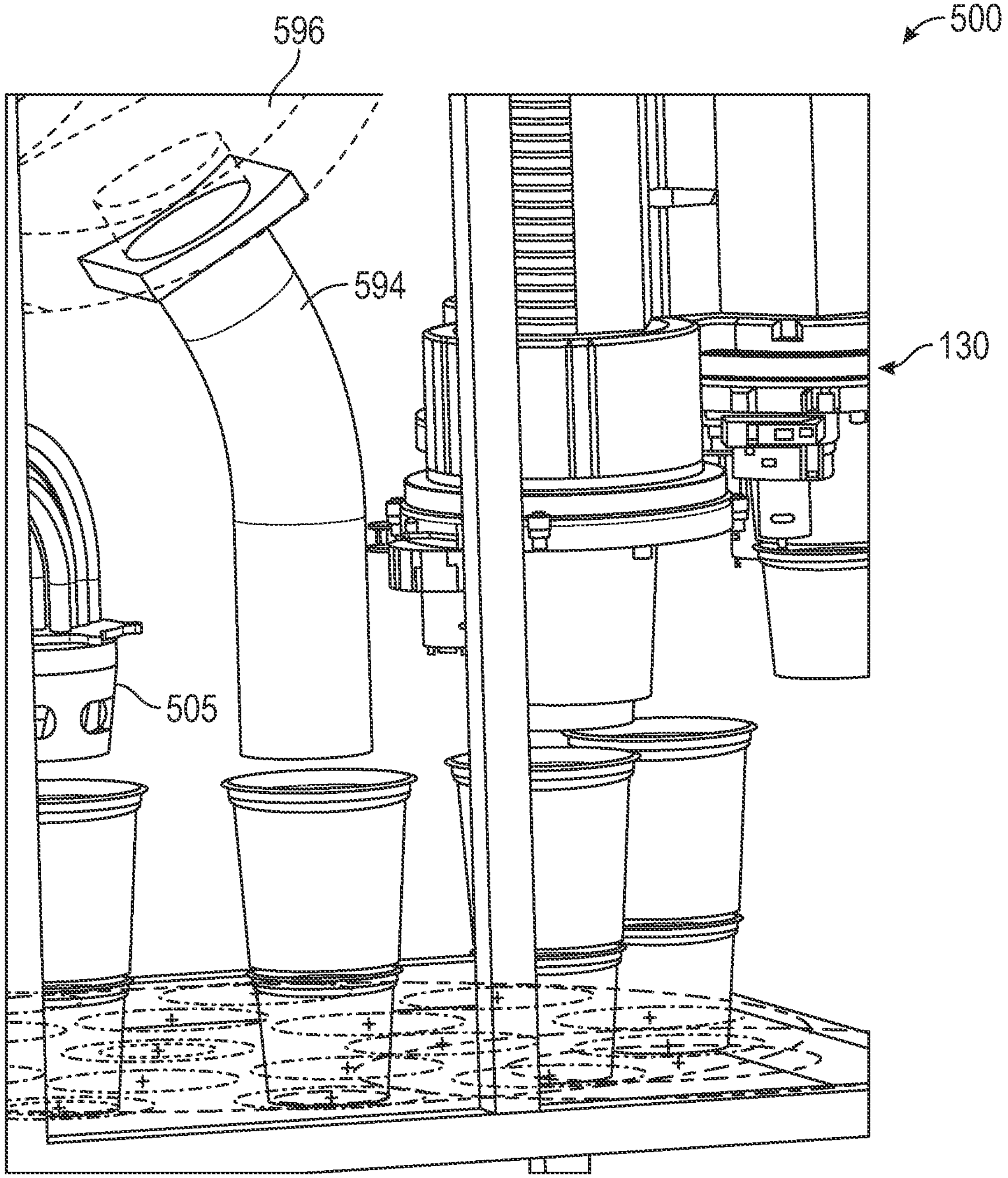
FIG. 40A a perspective view of a portion of the beverage production system of FIG. 25 according to one embodiment.
Figure 40B:
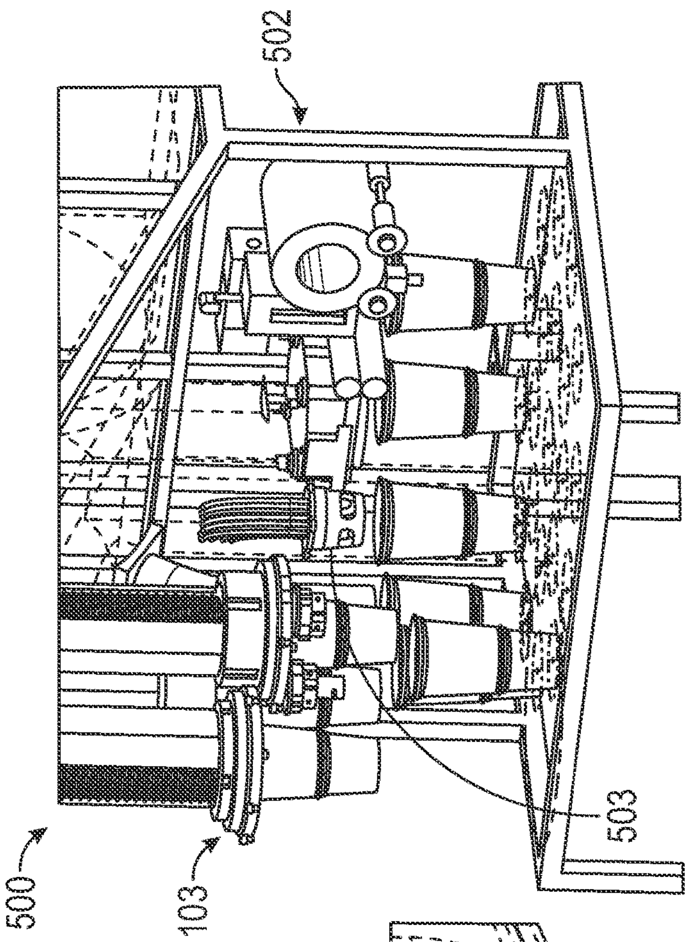
FIGS. 40B and 40C are perspective views of other portions of the beverage production system of FIG. 25 according to further embodiments.
Figure 40C:
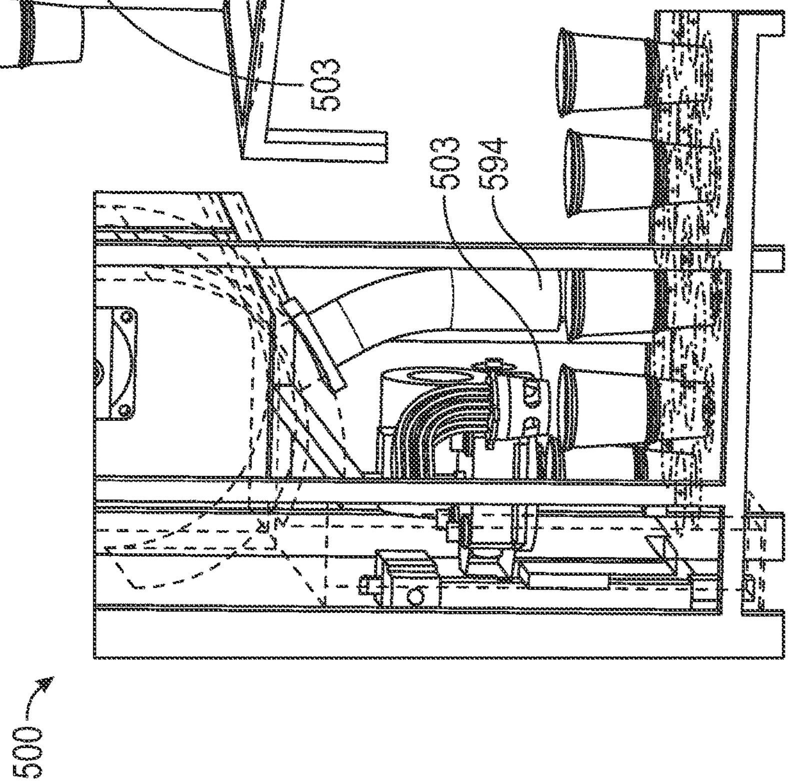

FIG. 40A illustrates another view of a portion of the beverage production system 500. An ice chute 594 is shown connected to a portion of an ice dispenser 596 for dispensing ice into cups 50 positioned in the outer row of the cup receptacles 506. In this embodiment, the ice dispenser 596, as previously discussed with reference to FIG. 12, is configured to provide ice only into cups 50 on the outer row of cup receptacles 506. FIGS. 40B and 40C illustrate yet other portions of the beverage production system 500. As can be seen, the beverage production system 500 includes the cup dispensing station 130, ice dispensing chute 594, beverage dispensing station 503, and printing and lidding assembly 502 positioned in series. Thus, the beverage production system 500 fulfills orders by dispensing cups 50 into the outer row of cup receptacles 506, dispensing ice into the cups 50, filling the cups 50 with the beverage via the beverage dispensing station 503, and lidding and printing the label on the cup 50 via the lidding and printing assembly 502. As discussed above, the process also includes moving, as desired, the filled beverages from the outer row of cup receptacles 506 to the inner row of cup receptacles 508 to enable more beverages to be prepared and stored until retrieved for service.

It will be appreciated that the overall configuration of the beverage production system 500 may have advantages over the beverage production system 100 described further above. For example, fulfilling beverage in only the outer row of cup receptacles 506 may be accomplished with only a single station for each of dispensing cups, ice, beverages, and lidding versus multiple rows which require multiple stations for each process and consequently require extra space, equipment, and complexity.

Figure 41:
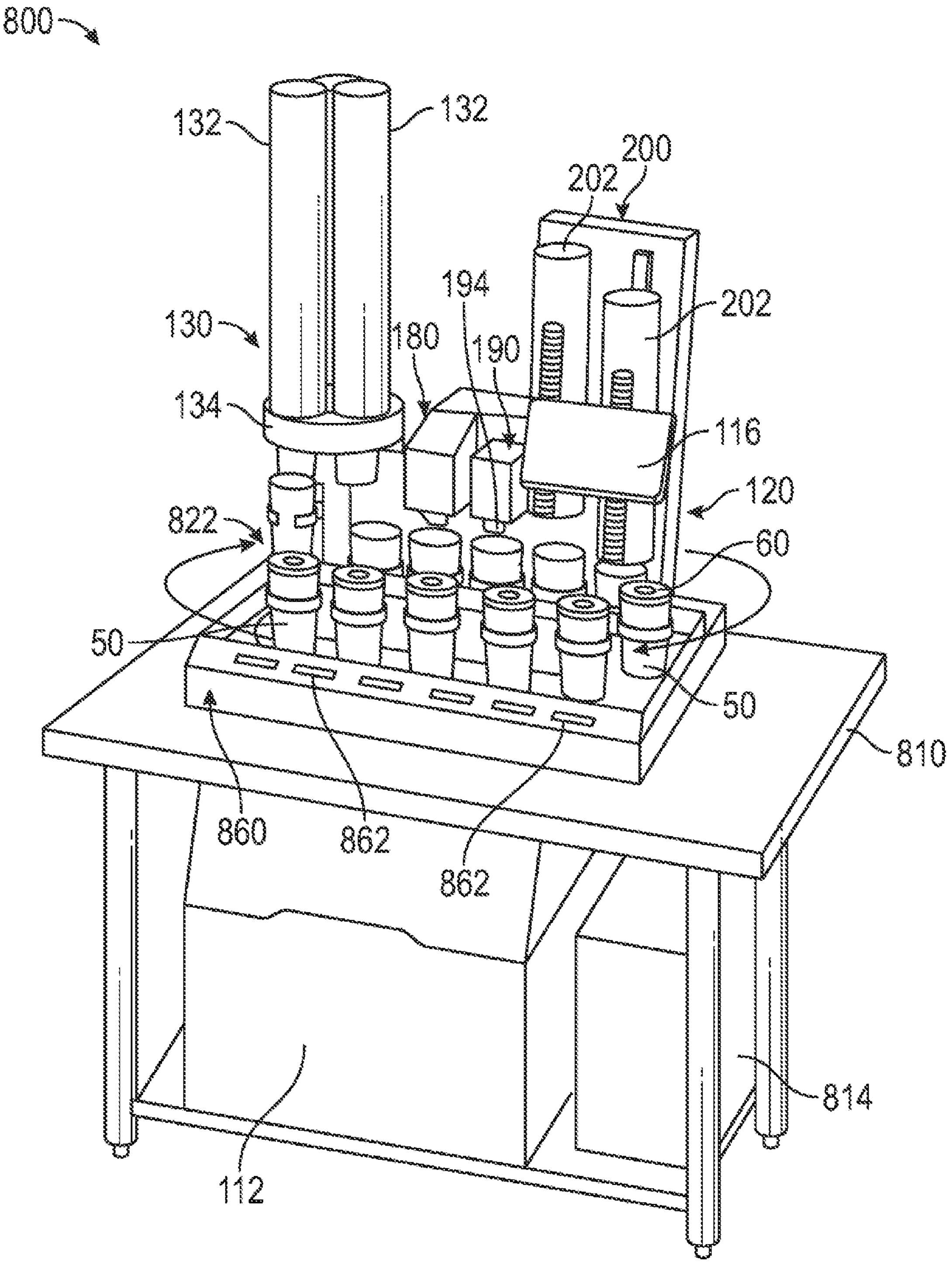
FIG. 41 is a perspective view of another embodiment of the beverage production system.

Referring now to FIG. 41, another embodiment of a beverage production system 800 is shown. The beverage production system 800 includes support table 810, as well as several components of the systems described above including a beverage handling assembly 120 positioned on the support table 810, and an ice chamber 112 and electronics housing 814 disposed under table 810.

Beverage handling assembly 120 includes a plurality of stations for performing various stages or steps of the beverage production process. In particular, beverage handling assembly 120 includes a cup dispensing station 130, an ice dispensing station 180, a beverage dispensing station 190, and a lidding station 200. Beverages may be produced by progressing through the stations 130, 180, 190, 200 with a conveyor assembly 822.

Figure 42:
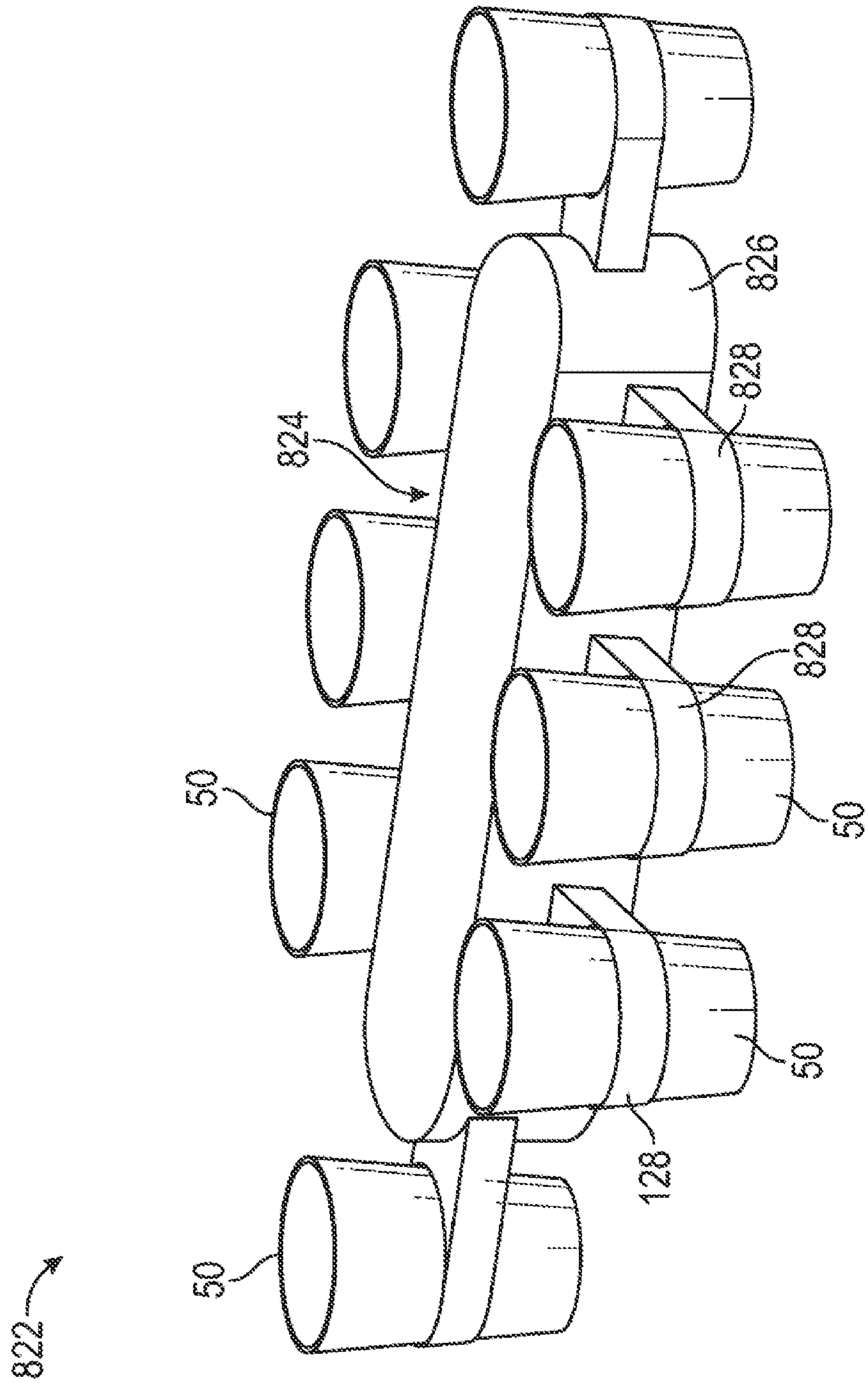
FIG. 42 is a perspective view of the conveyor assembly of the beverage production system of FIG. 41 according to some embodiments.

Referring now to FIG. 42, conveyor assembly 822 includes a central hub 824 and a plurality of cup receptacles 828 movably coupled to hub 824. In particular, central hub 824 has perimeter or side surface 826 that is obround or stadium shaped. The cup receptacles 828 are moveably coupled to central hub 824 such that during operation cup receptacles 828 may be traversed along the perimeter 826 to progress through the stations 130, 180, 190, 200 of beverage handling assembly 120.

Figure 43:
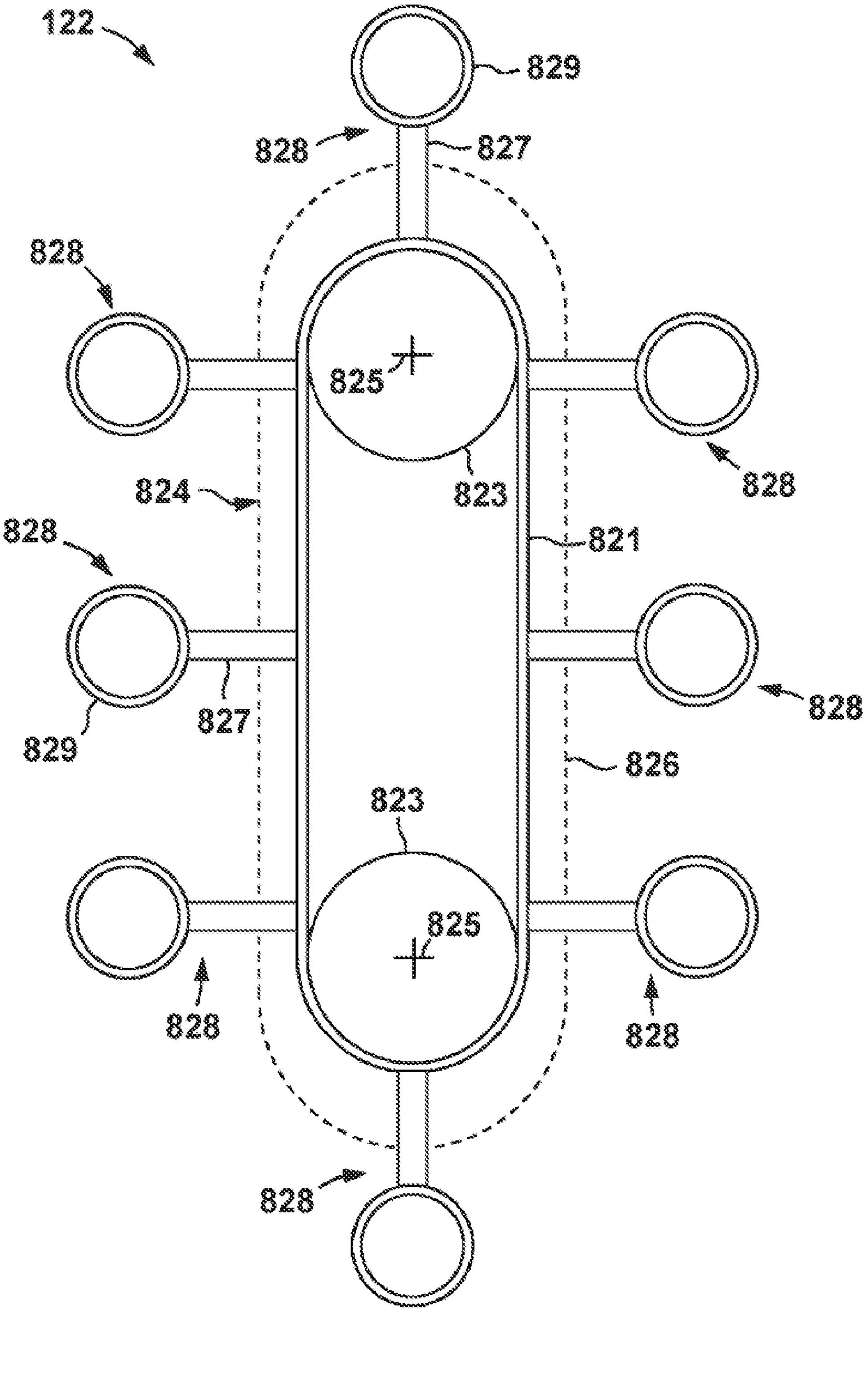
FIG. 43 is a top view of the conveyor assembly of FIG. 42 according to some embodiments.

Referring now to FIG. 43, in some embodiments, cup receptacles 828 may be coupled to a continuous conveyor 821 that is rotated about a pair of pulleys 823. The conveyor 821 may comprise a belt or chain that is coupled to the plurality of cup receptacles 828. In particular, each cup receptacle 828 includes a cup holder 829 that is coupled to the conveyor 821 with a support 827. Each pulley 823 includes a central axis 825. During operations, one or both of the pulleys 823 may be actuated (e.g., via an electric, pneumatic, hydraulic motor or other suitable driver) to rotate about the corresponding axes 825 to thereby rotate conveyor 821 generally about central hub 824. The rotation of conveyor 821 about pulleys 823 also moves the cup receptacles 828 along the perimeter 826 of central hub 824.

Figure 44:
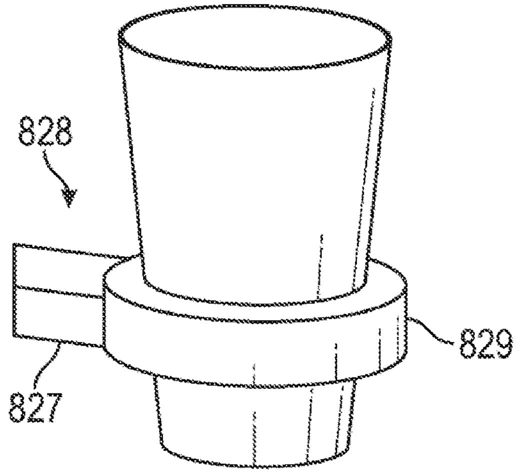
FIGS. 44-47 are perspective views of the cup receptacles of the conveyor assembly of FIG. 42 according to some embodiments.

Cup receptacles 828 may include a number of different shapes, designs, and features in various embodiments. For instance, referring now to FIG. 44, in some embodiments, cup holder 829 may comprise a ring that may tightly engage with a cup 50 so as to prevent (or at least restrict) movement of the cup 50 therein as the cup receptacle 828 is moved along the perimeter 826 of central hub 824 during operations (FIGS. 42 and 43).

Figure 45:
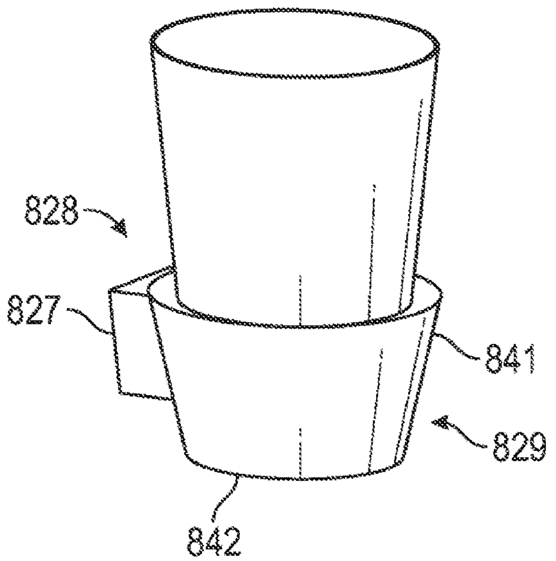

Referring now to FIG. 45, in some embodiments, cup holders 829 may comprise a cup-shaped member having a sidewall 841 and a bottom 842. The side wall 841 may loosely contact the cup 50 in some embodiments to allow some movement of cup 50 within the cup holder 829 during operations.

Figure 46:
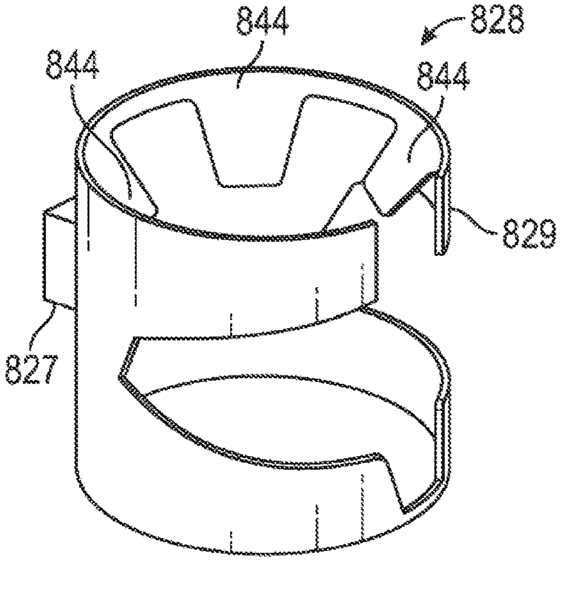

Referring now to FIG. 46, in some embodiments, cup holders 829 may comprise a plurality of leaf spring elements 844 that are biased into engagement with a cup 50 (FIGS. 42 and 43) inserted therein. In some embodiments, the leaf spring elements 844 may engage with cup 50 to prevent movement of cup 50 during operations.

Figure 47:
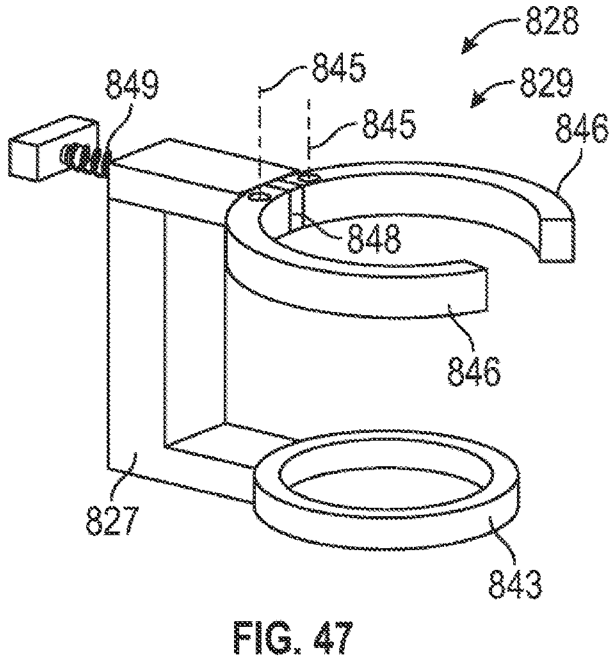

Referring now to FIG. 47, in some embodiments, cup holders 829 may comprise a pair of gripper arms 846 that may actuate to engage with and hold a cup 50 during operations. For instance, in some embodiments, one or both of the gripper arms 846 are pivotably coupled to an elongate member 848 that may telescope into support 827. A biasing member 849 (e.g., a coiled spring) may be coupled to elongate member 848 to bias elongate member 848 into support 827. As elongate member 848 moves into support 827 (e.g., via biasing member 849), the gripper arms 846 may engage with support 827 and rotate toward one another about axes 845. Thus, during operations, when a cup 50 is inserted within holder 829, the gripper arms 846 may close on the inserted cup 50 via the spring force provided by biasing member 849. In addition, in some embodiments, an additional support ring 843 may be included on holder 829, below gripper arms 846 to provide additional support to cups 50 inserted therein. Without being limited to this or any other theory, the actuation of the gripper arms 846 may allow different sizes (e.g., having different widths) to be securely held within cup holders 829 during operations. In some embodiments, gripper arms 846 may actuate away from one away from one another against the spring force provide by biasing member 849 to accept a dispensed cup 50 when holder 829 is aligned with the cup dispensing station 130. The actuation of the gripper arms 846 away from one another may be accomplished via engagement of the gripper arms 846 (or a component coupled thereto) with a camming surface on or adjacent to conveyor assembly 822.

Referring now to FIGS. 42 and 43, as will be described in more detail below, during operations, cup receptacles 828 may be moved along perimeter 826 of central hub 824 so as to align the cup receptacles 828 (and particularly cup holders 829) with the stations 130, 180, 190, 200 to dispense cups 50, ice, beverages, and lids 60, respectively, as part of the beverage production process.

Referring to FIG. 41, the beverage production system 800 may include systems substantially similar in operation and configuration to those previously described above, such as tubular magazines 132, dispenser 134, of the cup dispensing station 130, beverage dispensing nozzle 194, tubular magazine 202 containing lids 60 of the lidding station 200.

In addition, beverage production system 800 is provided with a user interface 116. An employee or customer may select the desired beverage(s) on the user interface 116 which then initiates the beverage production process generally described above. In some embodiments, the beverage production system 800 may receive commands to produce beverages via other electronic devices that are communicatively coupled to beverage production and dispensing system 800 via a suitable network or connection. For instance, in some embodiments, beverage production system 800 may receive commands to produce beverages from a point-of-sale system of the restaurant or dining facility that may receive orders via customer or employee. In some embodiments, the point-of-sale system may comprise part of a computer system that also includes the beverage production system 800 (e.g., computer system 400 described above).

Once commands to produce beverage(s) are received by beverage production system 800, the cup receptacles 828 may be progressed through the stations 130, 180, 190, 200 via conveyor assembly 822 as previously described. Simultaneously, the assemblies and mechanisms within each of the stations 130, 180, 190, 200 may actuate in the manner described above to produce beverages.

In some embodiments, the beverage production system 800 may include a beverage identification assembly 860 to identify beverages that have advanced through the stations 130, 180, 190, 200 and are ready for retrieval by an employee or customer. In particular, beverage identification assembly 860 may comprise a plurality of lights 862 (e.g., light emitting diodes (LED) and/or other suitable light emitting devices) coupled to beverage handling assembly 120 that are configured to emit a selected color of light that may correspond with a particular beverage (or order). During operations, the cups 50 (including or not including lids 60) may be aligned with selected ones of the lights 862 via conveyor assembly 822, and the lights 862 emit a color of light that corresponds with the aligned beverage(s). In some embodiments, the lights 862 may comprise electronic displays (e.g., liquid crystal displays, plasma displays, organic LED (OLED) displays, micro-LED displays) that may display images (e.g., text and/or symbols) to convey sufficient information (e.g., names, order number, table number, vehicle identification) for identifying the beverages.

Figure 48:
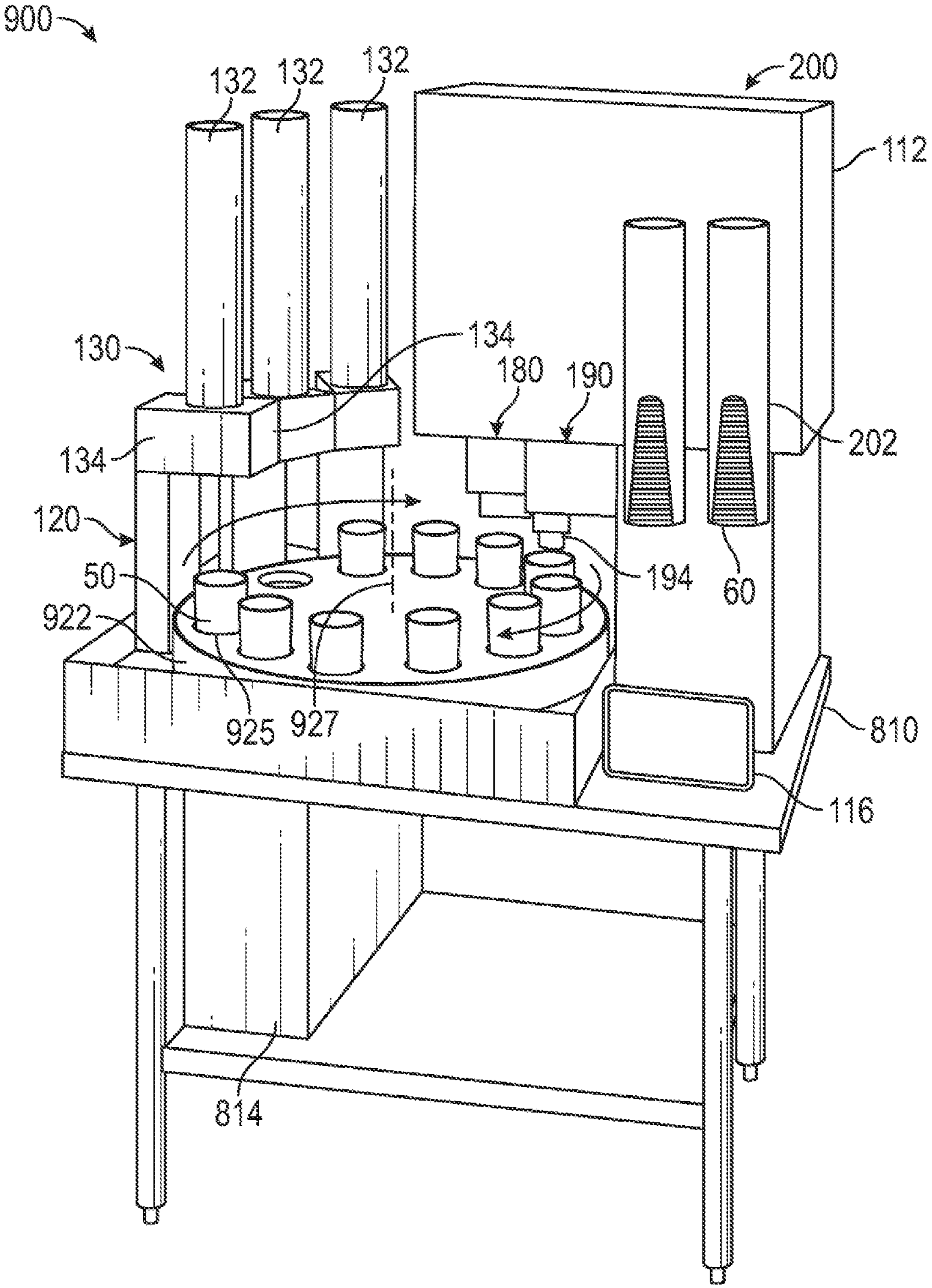
FIG. 48 is a perspective view of another embodiment of the beverage production system.

Referring now to FIG. 48, another embodiment of a beverage production system 900 is shown. The beverage production system 900 may include a number of features substantially similar in configuration and operation to those previously discussed such as the support table 810, the beverage handling assembly 120 positioned on the support table 810, an ice chamber 112 supported above beverage handling assembly 120, and an electronics housing 814 disposed under table 810.

Beverage handling assembly 120 includes the plurality of stations for performing various stages or steps of the beverage production process. In particular, beverage handling assembly 120 includes the cup dispensing station 130, the ice dispensing station 180, the beverage dispensing station 190, and the lidding station 200.

Beverages may be produced by progressing through the stations 130, 180, 190, 200 with a turntable 922. More specifically, turntable 922 is a cylindrical member that includes a plurality of cup receptacles 925 disposed about a peripheral edge thereof. During operation, a driver (e.g., electric motor, hydraulic motor, magnetic motor, pneumatic motor) may rotate the turntable 922 about a central axis 927 to align the cup receptacles 925 with the stations 130, 180, 190, 200 to dispense cups 50, ice, beverages, and lids 60, respectively, as part of the beverage production process.

Figure 49:
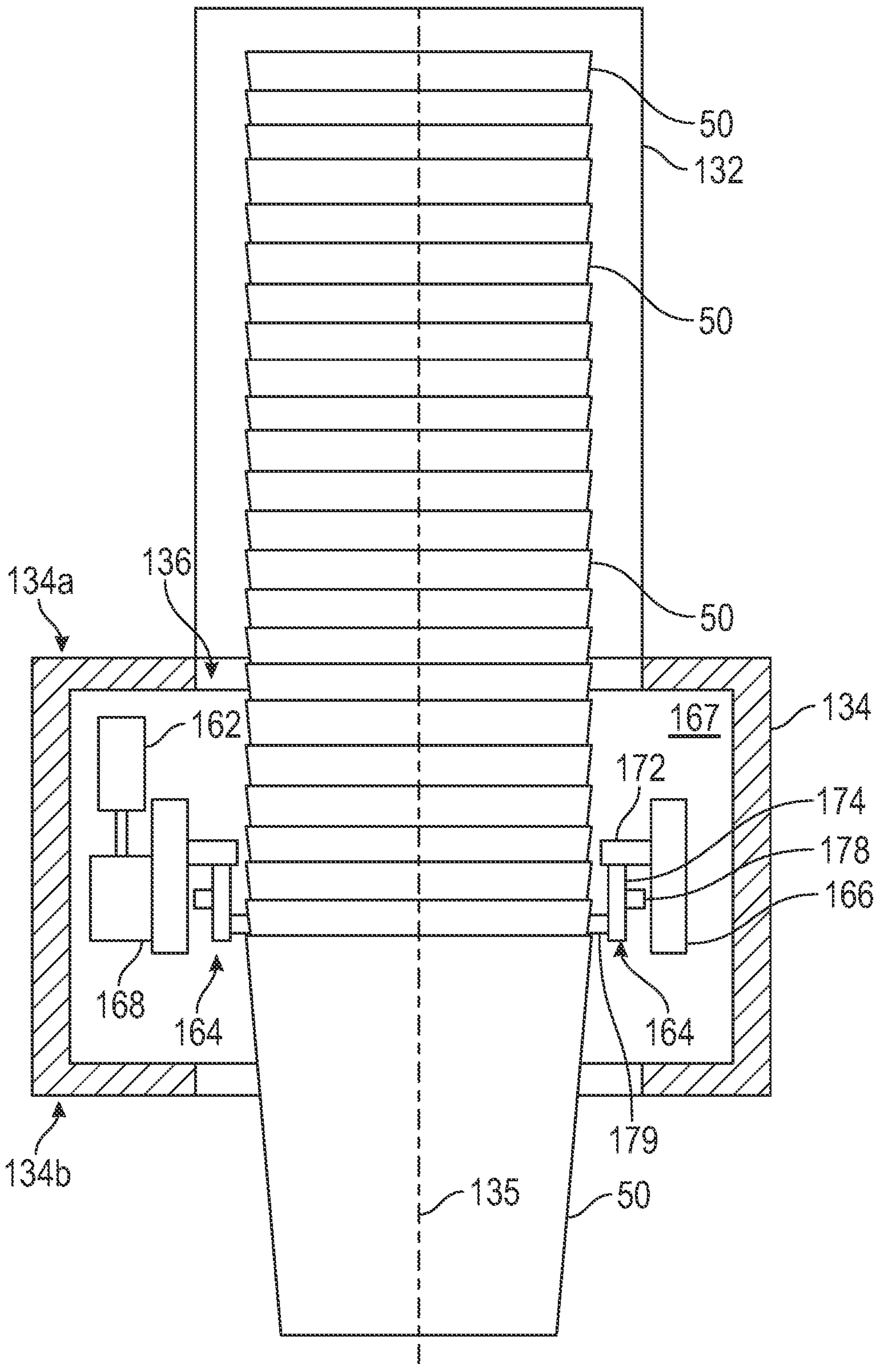
FIG. 49 is a side cross-sectional view of a cup dispensing station of the beverage production system of FIG. 48 according to some embodiments.

In this embodiment, referring now to FIGS. 48 and 49, a plurality of magazines 132 are coupled to and extend from corresponding dispensers 134.

Magazines 132 may receive a plurality of stacked cups 50 therein. Each dispenser 134 is generally aligned with the cup receptacles 925 so that during operations, cups 50 may be supplied to dispensers 134 from magazines 132, and then are dispensed from dispensers 134 into aligned cup receptacles 925 on turntable 922. In some embodiments, magazines 132 may be de-coupled from dispensers 132 to facilitate loading of cups 50 therein.

In some embodiments, each dispenser 134 may be configured to dispense a different size and/or type of cup 50 into cup receptacles 925 during operations. As shown in FIG. 48, dispensers 134 are arranged such that each dispenser 134 is aligned with a different one of the cup receptacles 925 for a particular rotative position of turntable 922 about axis 927.

Referring specifically now to FIG. 49, each dispenser 134 includes a central axis 135, a first or upper side **134*a* and a second or lower side 134*b* opposite upper side 134*a*. A receptacle 136 extends axially through dispenser 134 between sides 134*a*, 134*b* with respect to axis 135. The corresponding magazine 132 is engaged within receptacles 136 on upper side 134*a* and extends away from upper side 134*a* along axis 135. During operations, cups 50 that are dispensed from magazines 132 move through receptacle 136 and are ejected from lower side 134*b***.

Dispenser 134 has an internal chamber 167 that cups 50 may enter and exit through via the receptacle 136. A ring gear 166 is disposed within chamber 167 and aligned with receptacle 136 along axis 135. A driving gear 168 is engaged (e.g., meshed) with gear teeth or other suitable structures on a radially outer surface of each of the ring gear 166. Driving gear 168 is coupled to a driver 162 that may be mounted within internal chamber 167. During operations, driver 162 may rotate driving gear 168 to thereby drive rotation of the ring gear 166 about axis 135. In some embodiments, driver 162 comprises an electric motor; however, in other embodiments, the driver 162 may comprise a pneumatic motor, a hydraulic motor, etc. A plurality of wedge members 164 are positioned within ring gear 166, each wedge member 164 includes a cylindrical body 174 including a central or longitudinal axis. The dispenser 134 otherwise operates substantially similar to that described above with regard to FIGS. 6 and 7.

Figure 50:
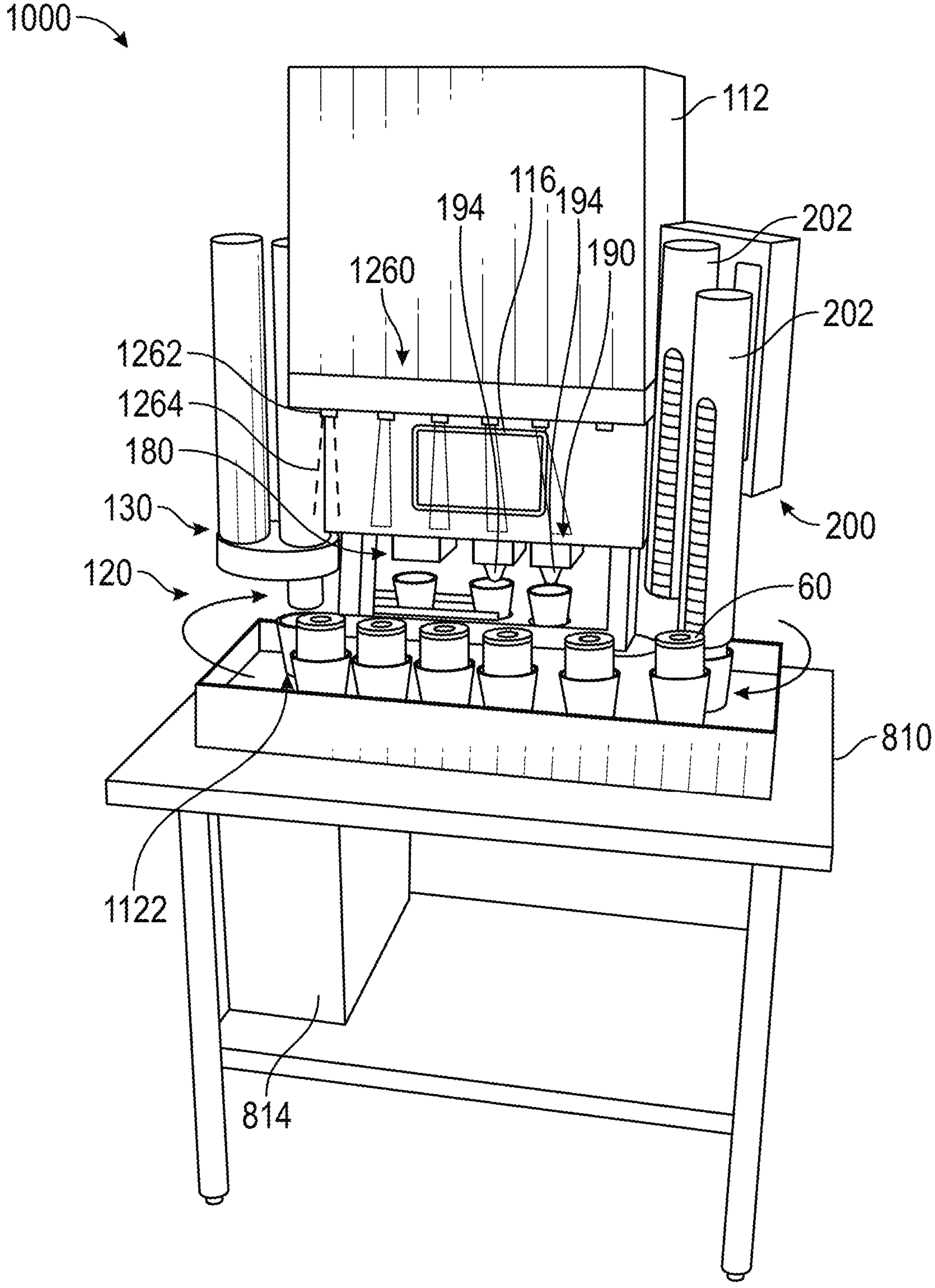
FIG. 50 is a perspective view of yet another embodiment of the beverage production system.

Referring now to FIG. 50, another embodiment of a beverage production system 1000 is shown. Similar to the systems discussed above, the beverage production system 1000 includes support table 810, a beverage handling assembly 120 positioned on the support table 1110, an ice chamber 112 supported above the beverage handling assembly 120, and an electronics housing 814 disposed under table 810.

Beverage handling assembly 120 includes a plurality of stations for performing various stages or steps of the beverage production process that may be similar in configuration and operation to those previously discussed above, such as the cup dispensing station 130, the ice dispensing station 180, the beverage dispensing station 190, and the lidding station 200. Beverages may be produced by progressing through the stations 130, 180, 190, 200 with a conveyor assembly 1122. In some embodiments, conveyor assembly 1122 may be configured and operate similar to conveyer 822 described above with regard to FIGS. 42-47. Similarly, cup dispensing station 120 and lidding station 200 may operate according to any of the various configuration discussed above.

Beverage production system 1000 may also include beverage identification assembly 1260 may comprise a plurality of emitters 1262 coupled to beverage handling assembly 120 that are configured to emit light 1264 onto cups 50 and (if present) lids 60 that may be used to identify a particular beverage or beverage order. In some embodiments, the light 1264 may be color-coded so as to identify a particular beverage (or order) with a different color. In some embodiments, the light 1264 may form images (e.g., text and/or symbols) on the beverages that may provide sufficient information (e.g., names, order number, table number, vehicle identification). In some embodiments, emitters 1262 may comprise light emitting diodes (LEDs) and/or other suitable light emitting devices.

Figure 51:
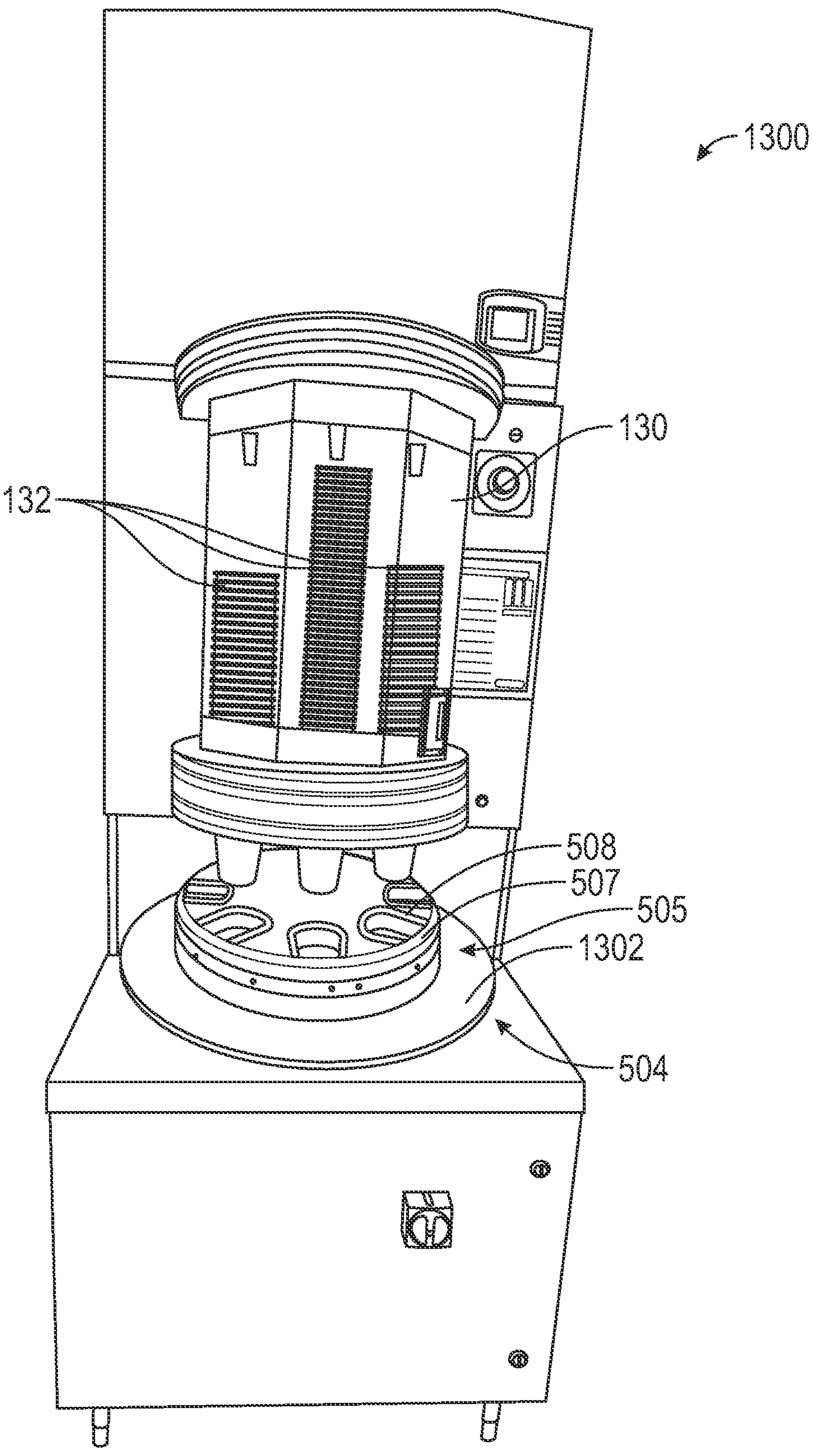
FIG. 51 is a perspective view of yet another embodiment of the beverage production system.
Figure 52:
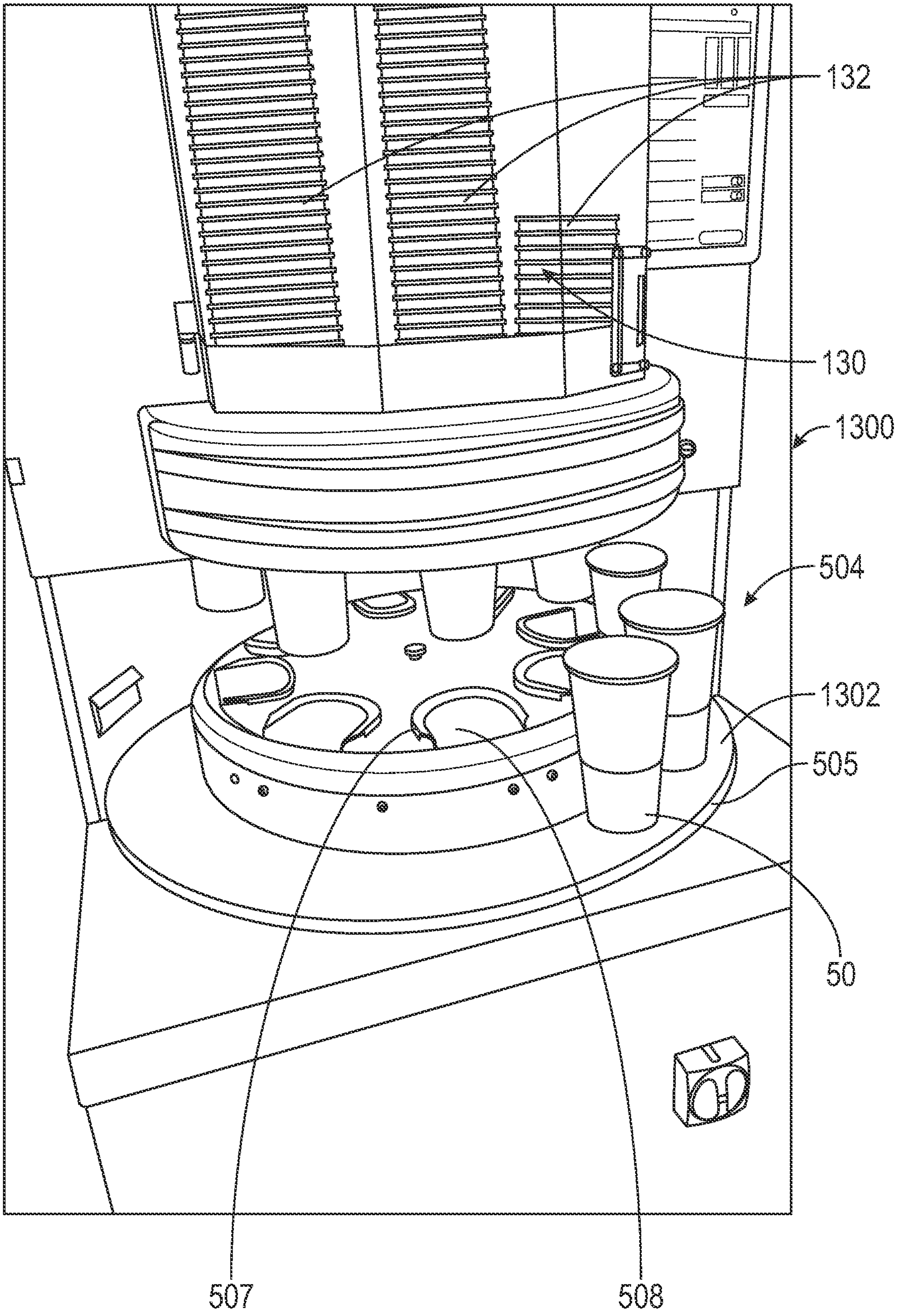
FIG. 52 is another perspective view of the beverage production system illustrated in FIG. 51.
Figure 53:
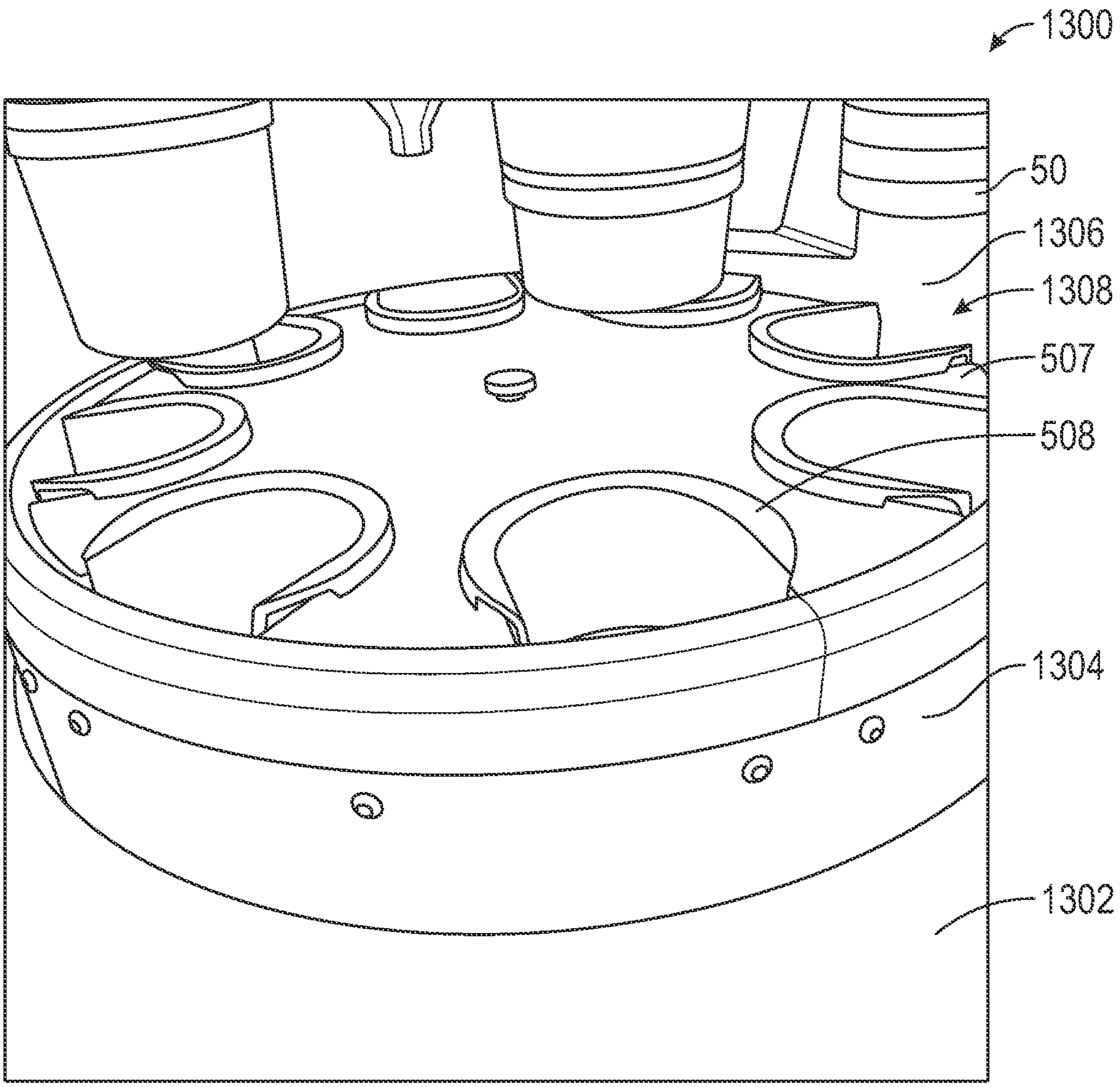
FIG. 53 is a perspective view illustrating the turntables of the beverage production system illustrated in FIGS. 51 and 52.

FIGS. 51-53 illustrate yet another embodiment of a beverage production system 1300. The beverage production system 1300 may be similar to the various beverage production systems previously described, such as for example the beverage production system 500, in some respects. For example, in this embodiment, the modified turntable assembly 504 includes the outer turntable 505 and an inner turntable 507. However, in this embodiment, the outer turntable 505 does not have the outer row of cup receptacles 506 and instead the outer turntable 505 is a flat rotating surface or dial 1302. The dial 1302 may be constructed of various materials including plastic or polymeric materials, rubber, stainless steel, or other materials. In some embodiments, the dial 1302 may be constructed of materials that promote frictional engagement of the cup 50 with the dial 1302 to prevent cups from sliding off the dial 1302 while still allowing the cups 50 to be transitioned onto the dial 1302. The inner turntable 507, in this embodiment, continues to have the inner row of cup receptacles 508. In the present embodiment of the beverage production system

1300, the inner row of cup receptacles 508, which may also be referred to as cup holders **506*a* in this portion of the description, are separate, removable components from the inner turntable 507, although it is contemplated that these components may be integrally formed in other embodiments. Similar to that described above, the inner and outer turntables 505 and 507 are configured to rotate independently from one another and may comprise drives, motors, and gearboxes (not shown) that operate similar to those described above with regard to inner turntable 124 and outer turntable 126, and the beverage production system 500** described above.

The beverage production system 1300 employs another embodiment of the cup dispensing station 130. In this embodiment, the plurality of tubular magazines 132 are fixed above the modified turntable assembly 504 and arranged to dispense cups 50 of various sizes into the inner row of cup receptacles 508. Cups 50 are dispensed automatically from the tubular magazines 132 in various manners as previously discussed. For example, when a particular size beverage is ordered, the beverage production system 1300 causes the tubular magazine 132 containing the ordered size cup 50 to dispense or drop the cup 50 into the cup receptacle 506 immediately below using techniques described herein.

In this embodiment, beverages are fulfilled in the inner turntable 507 and moved to the outer turntable 505 for retrieval by users. Referring to FIG. 53, the beverage production system 1300 includes a separating wall 1304 that is rounded and located between the inner and outer turntables 507, 505. The separating wall 1304 provides a barrier to assist in the positioning of the cups 50 in the inner row of cup receptacles 508 as the cups 50 are dropped into the inner row of cup receptacles 508 and rotated to the stations for receiving ice and a beverage.

Figure 54:
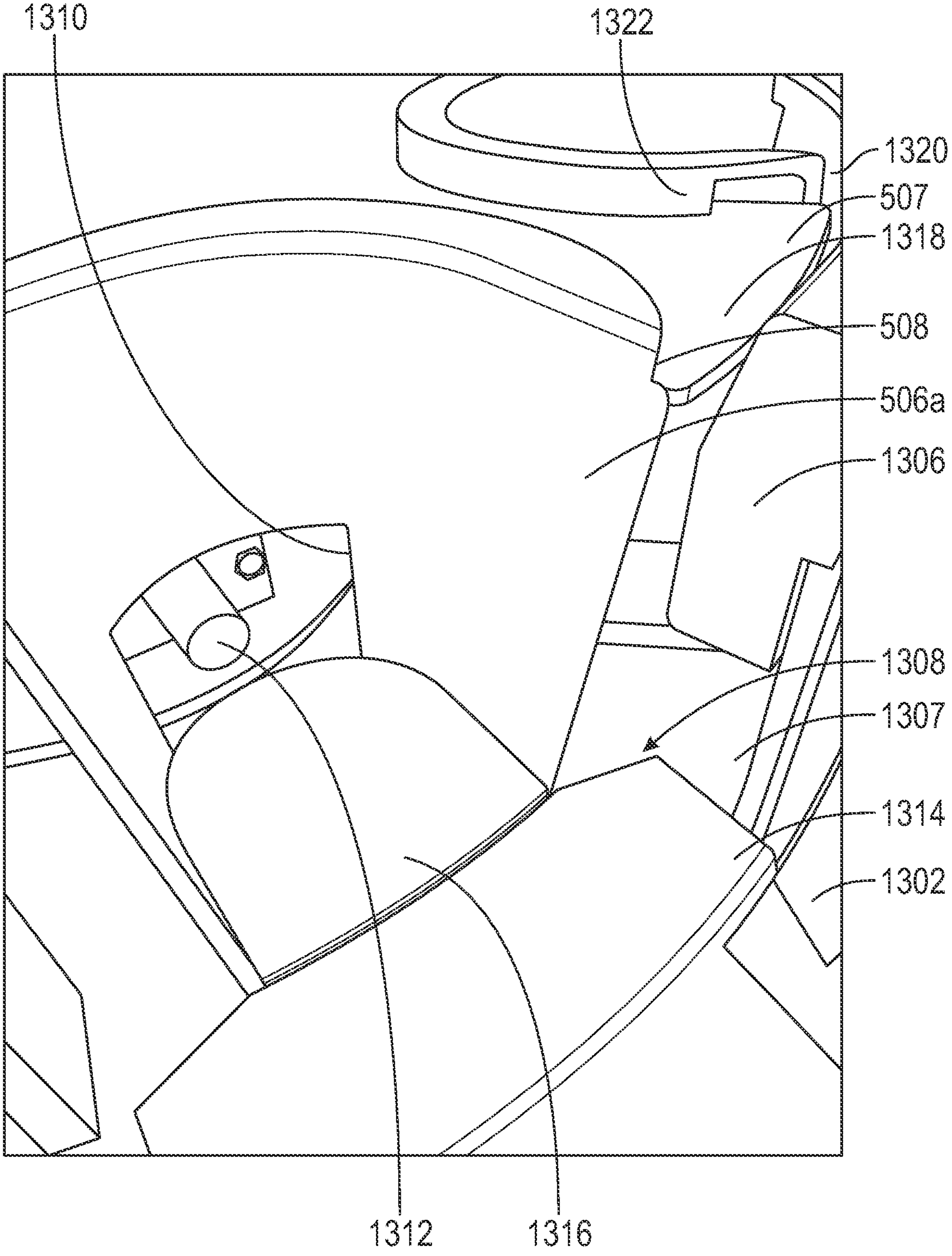
FIG. 54 is a view of an embodiment of the cup holders and the transition assembly of the beverage production system.

Referring also to FIG. 54, in some embodiments, a sink 1307, similar to sink 600 described above, may be employed in the present embodiment and be modified to include the separating wall 1304 as a component of or integral to the sink 1307. The separating wall 1304 includes a gap 1306 such that the separating wall 1304 does not extend completely around the circumference of the inner turntable 507. The gap 1306 in the separating wall 1304 is located at a transfer location 1308 where cups 50 are transferred from the inner row cup receptacle 508 to the dial 1302 of the outer turntable 505. Similar to that described above, cup receptacles 508 may include a receptacle opening 1310 to allow for a transition arm 1312 of a transition assembly (not shown) to slide a cup 50 located in the adjacent cup receptacle 508 onto the outer turntable 505. The transition assembly may be similar to the slide assembly 530 discussed above and be magnetically driven or may include other motors or drives to drive the transition arm 1312 to accomplish such movement of the cup 50, as will be well understood to those skilled in the art. The transition arm 1312 may be similar in function to the arm 532, discussed above, of the transition assembly 530. In this embodiment, the transition arm 1312 is a substantially cylindrical shaft but may be otherwise configured in other embodiments.

Figure 55:
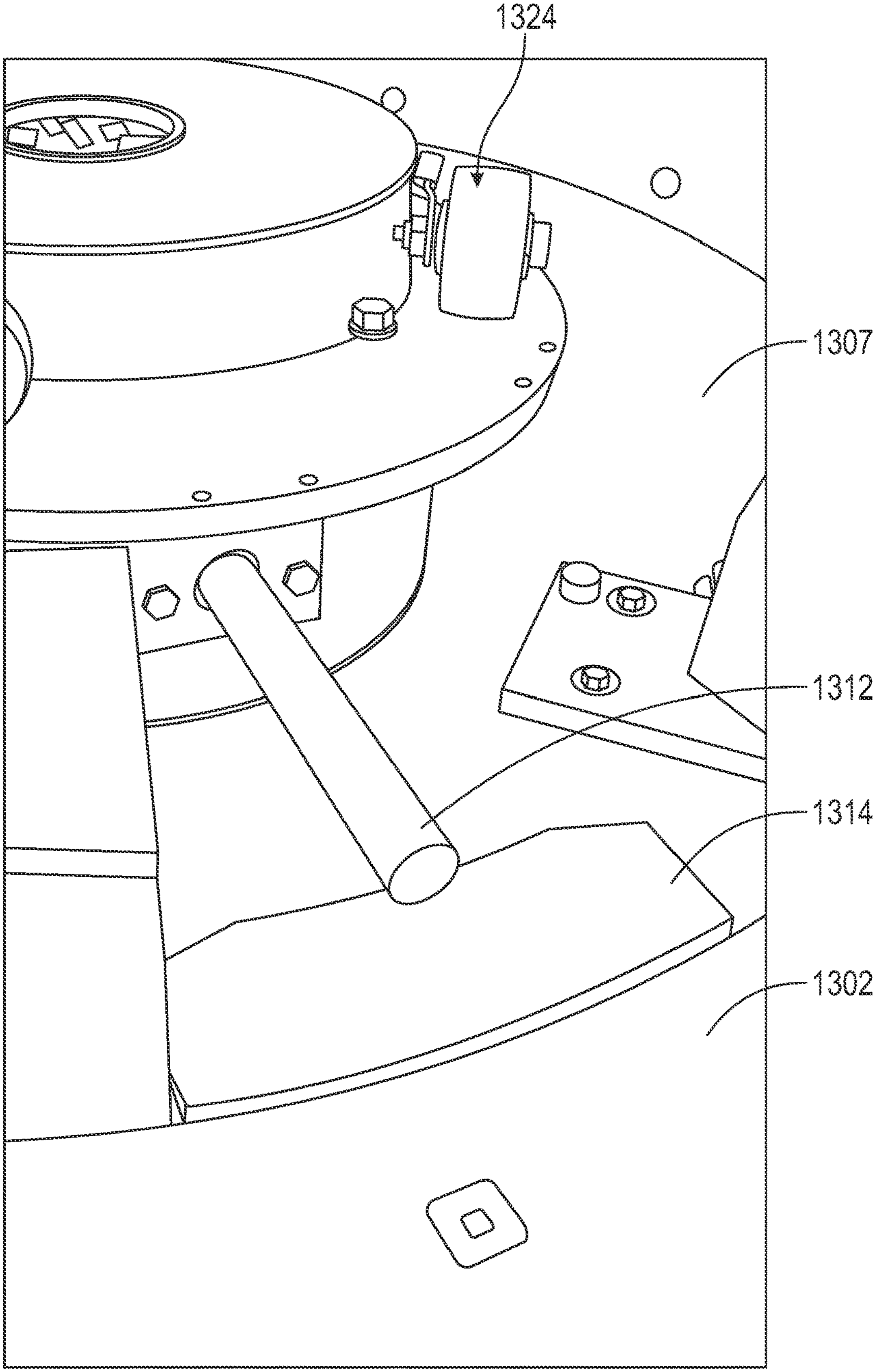
FIG. 55 is another view of the beverage production system and the transition assembly.

Referring also to FIG. 55, the transition arm 1312 is illustrated in an extended position. Also illustrated is a transition platform 1314 located between a cup receptacle bottom 1316 and the dial 1302. It will be appreciated that a width of the separating wall 1304 may create a spacing differential, in some embodiments, between the cup receptacle bottom 1316 and the dial 1302. The transition platform 1314 spans the space between the cup receptacle bottom 1316 and the dial 1302 to allow for a smooth and even transition or movement of the cup 50 from the cup receptacle 580 to the dial 1302. Also, as can be seen in the embodiments illustrated in FIGS. 54 and 55, the inner turntable 507 includes an upper frame 1318 that is a substantially round plate configured with U-shaped openings 1320 configured to receive the cup holders 506*a*. In this embodiment, an upper lip 1322 of the cup holders 506*a* extend over the U-shaped openings 1320 and gravitationally rest on the upper frame 1316.

FIG. 55 illustrates the sink 1307 which is exposed by the removal of the upper frame 1316 and the plurality of cup receptacles 508. While the upper fame 1318 and cup receptacles 508 are described as separate components, these and other components of the beverage production systems described herein may be integrally formed as one or more unitary components for ease of construction, operation, or based on other considerations.

Also illustrated are drive system components 1324, which may include motors, rollers, and other components, as previously described or otherwise needed, for rotating the inner and/or outer turntables 507, 505.

Figure 56:
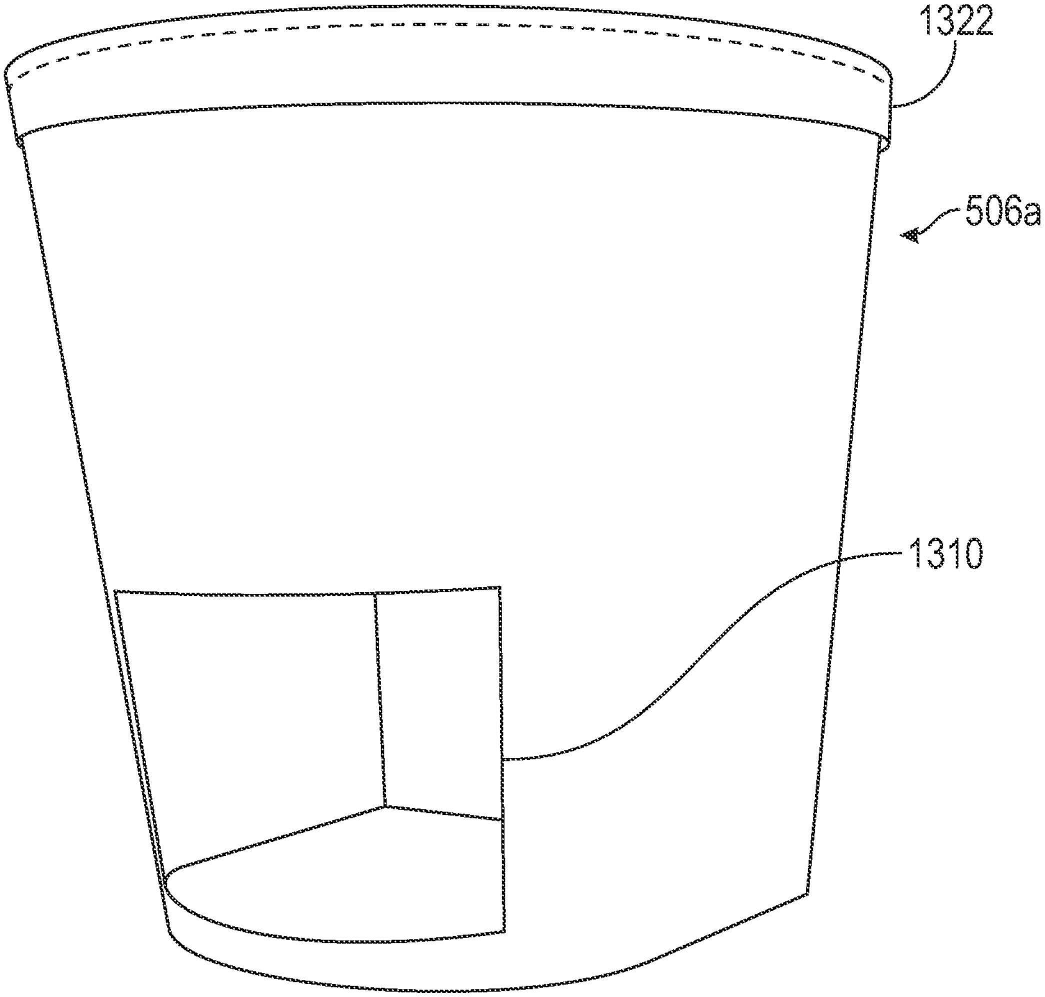
FIG. 56 is a rear perspective view of a cup holder according to one embodiment.
Figure 57:
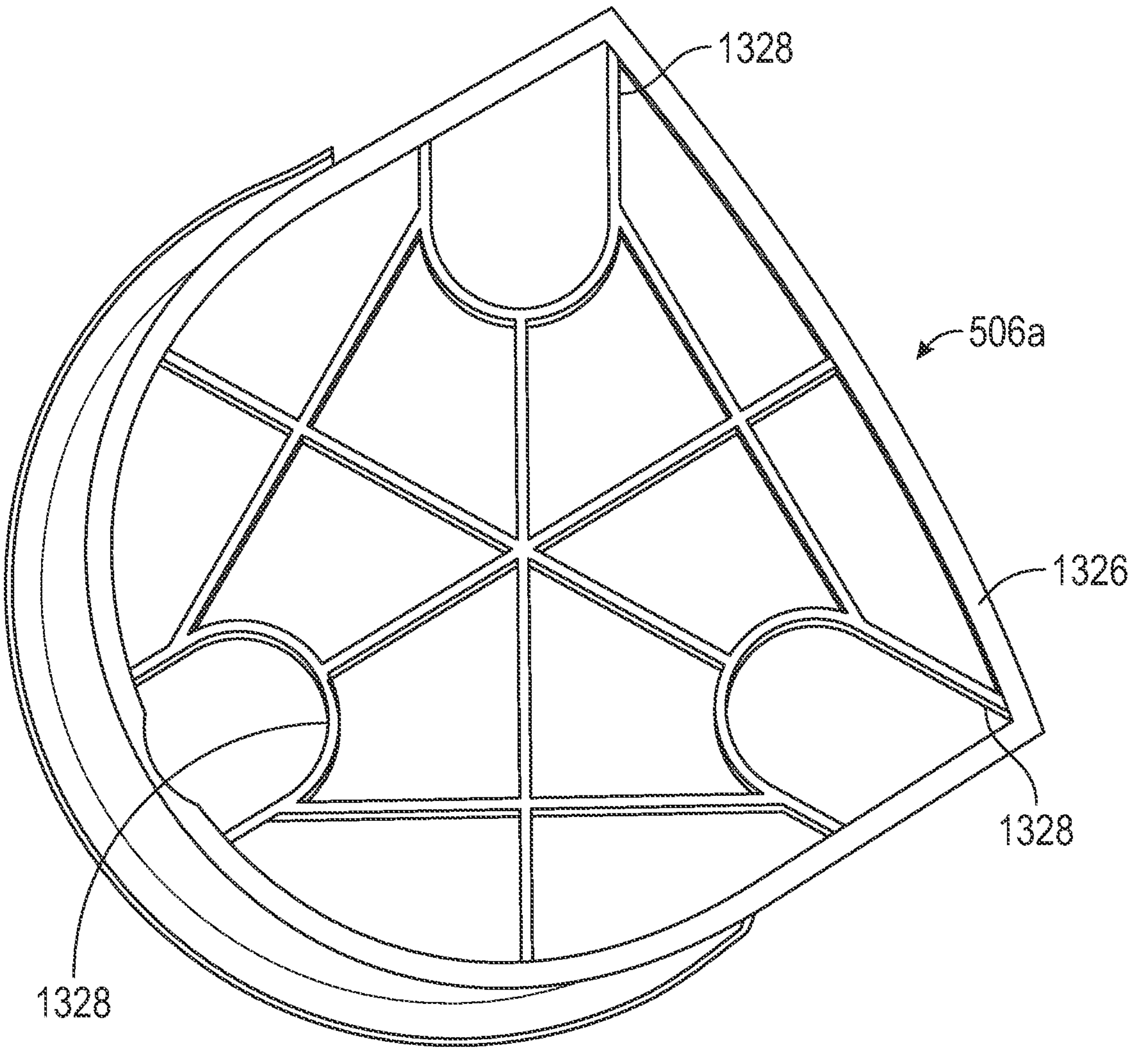
FIG. 57 is a bottom perspective view of the cup holder according to one embodiment.

FIG. 56 illustrates another view of the cup holder 506*a*, according to the present embodiment. In this illustration, the upper lip 1322 and cup receptacle opening 1310 can be seen. Also referring to FIG. 57, a bottom side 1326 of the cup holder 506*a* is shown. As will be discussed in more detail below, in the present embodiment, the entire cup holder 506*a* may be raised out of the inner turntable 507 as part of the beverage fulfillment process. While in the present embodiment, the cup holder 506*a* is raised for the purposes of lidding the cup 50, in other embodiments, the cup holder 506*a* may be raised for dispensing ice and/or adding the beverage to the cup 50 as well. According this this embodiment, the bottom side 1326 of the cup holder 506*a* is provided with grooves 1328 for being securely and stably lifted. While the present embodiment illustrates grooves 1328, other embodiments anticipate various configurations for the bottom side 1326 of the cup receptacle 508 for stably engaging the cup receptacle 508 during vertical movement, as will readily suggest themselves to one skilled in the art.

Figure 58:
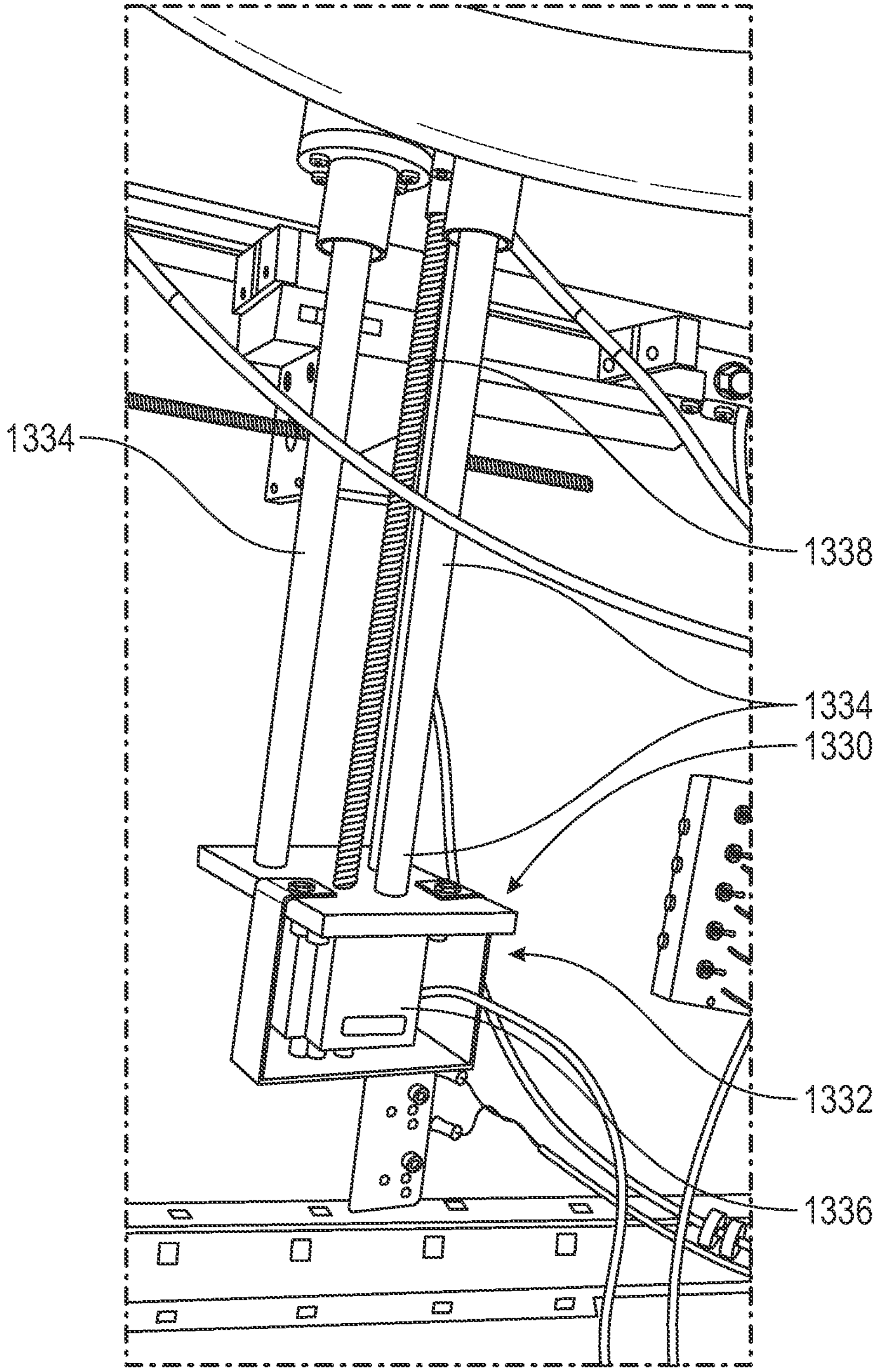
FIG. 58 is a perspective view of a lift mechanism according to one embodiment.

FIG. 58 illustrates one embodiment of a lift mechanism 1330 configured to vertically lift the cup receptacle 508 during beverage fulfillment. In this embodiment, the lift mechanism 1330 is provided underneath the inner turntable 507 and sink 1307 adjacent the cup receptacle 508 to be raised for lidding and printing. The lift mechanism 1330 includes generally a drive system 1332 and a plurality of lift shafts 1334. The lift shafts 1334 are attached to the drive system 1332 such that when the drive system 1332 is actuated, the drive system 1332 causes the lift shafts 1334 to raise vertically. While the drive system 1332 may operate in various manners, in this embodiment, the drive system 1332 may include a stepper motor 1336 and lead screw 1338 attached thereto.

Figure 59:
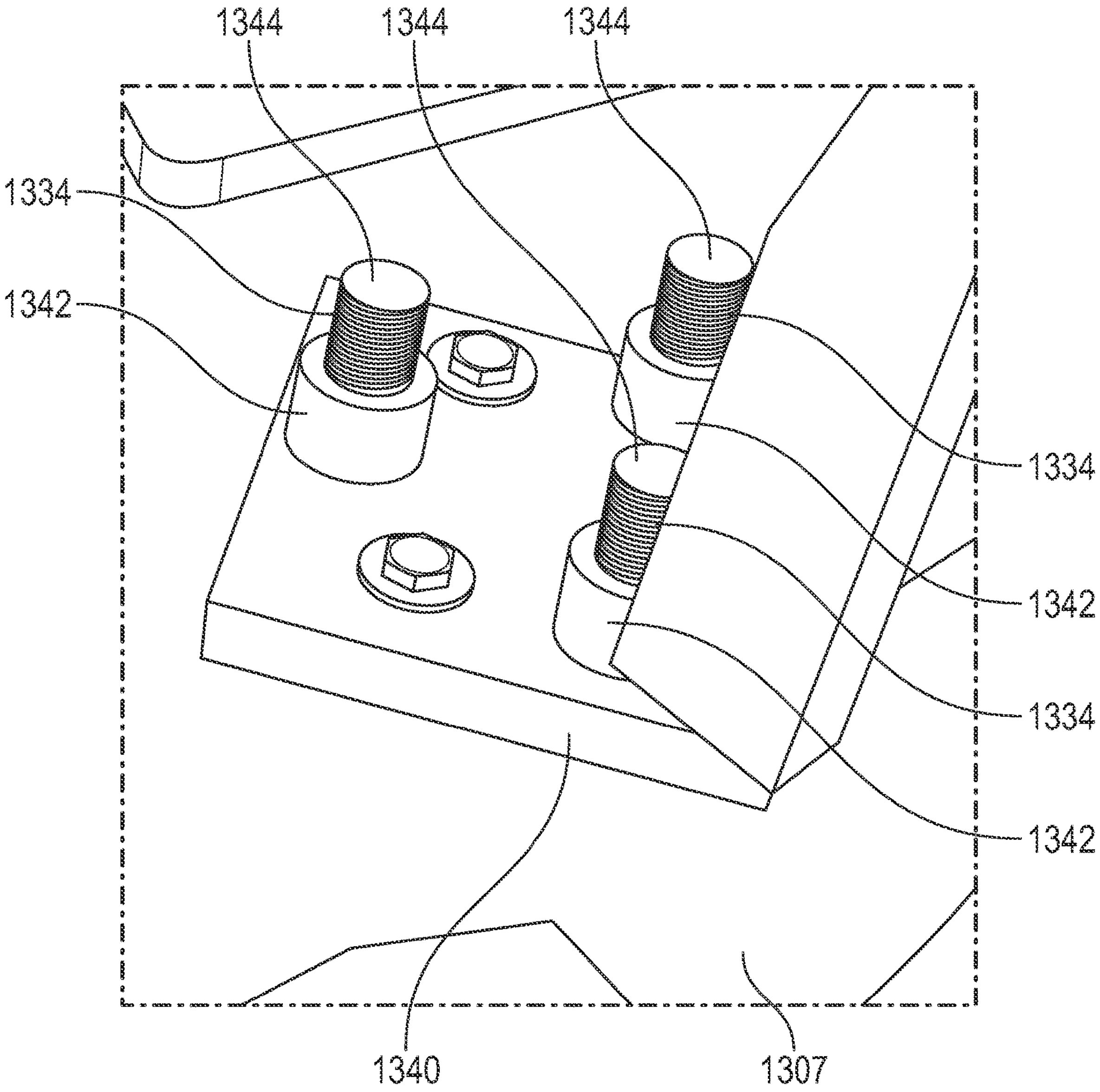
FIG. 59 is a perspective view of a positioning plate according to one embodiment.

Referring also to FIG. 59, a positioning plate 1340 may be mounted in the sink 1307 adjacent and below the location of the cup receptacle 508 to be lifted. The positioning plate 1340 is provided with plate openings 1342 sized to receive the lift shafts 1334 therethrough. The lift shaft ends 1344 are configured and arranged to engage the grooves 1328 on the bottom side 1326 of the cup holder 506*a* when the lift shafts 1334 are actuated by the drive system 1332. While lift mechanism 1330 is shown having three (3) lift shafts 1334, other numbers of lift shafts 1334 may be used.

Figure 60:
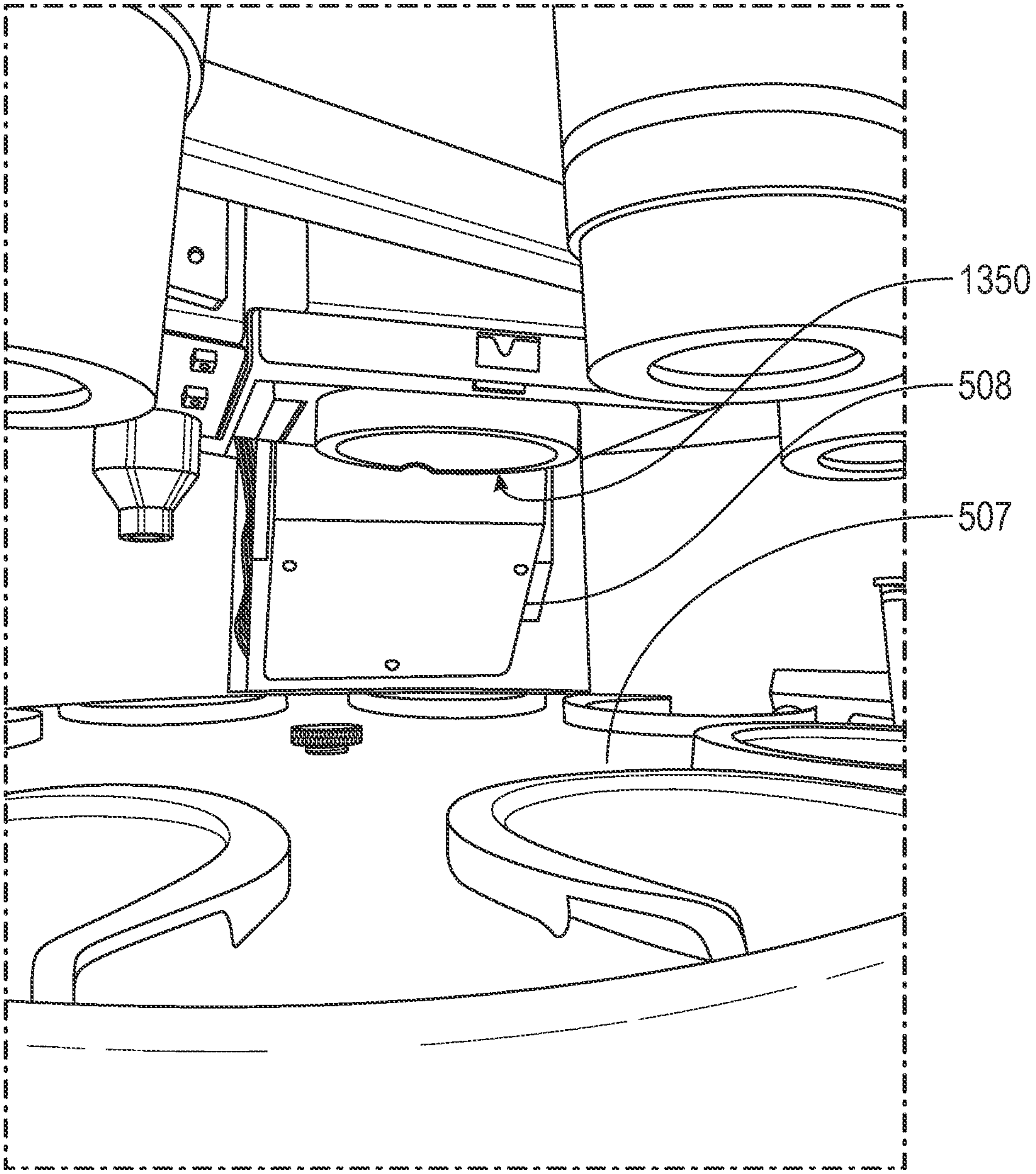
FIG. 60 is a perspective view of a lidding and printing system according to one embodiment.
Figure 61:
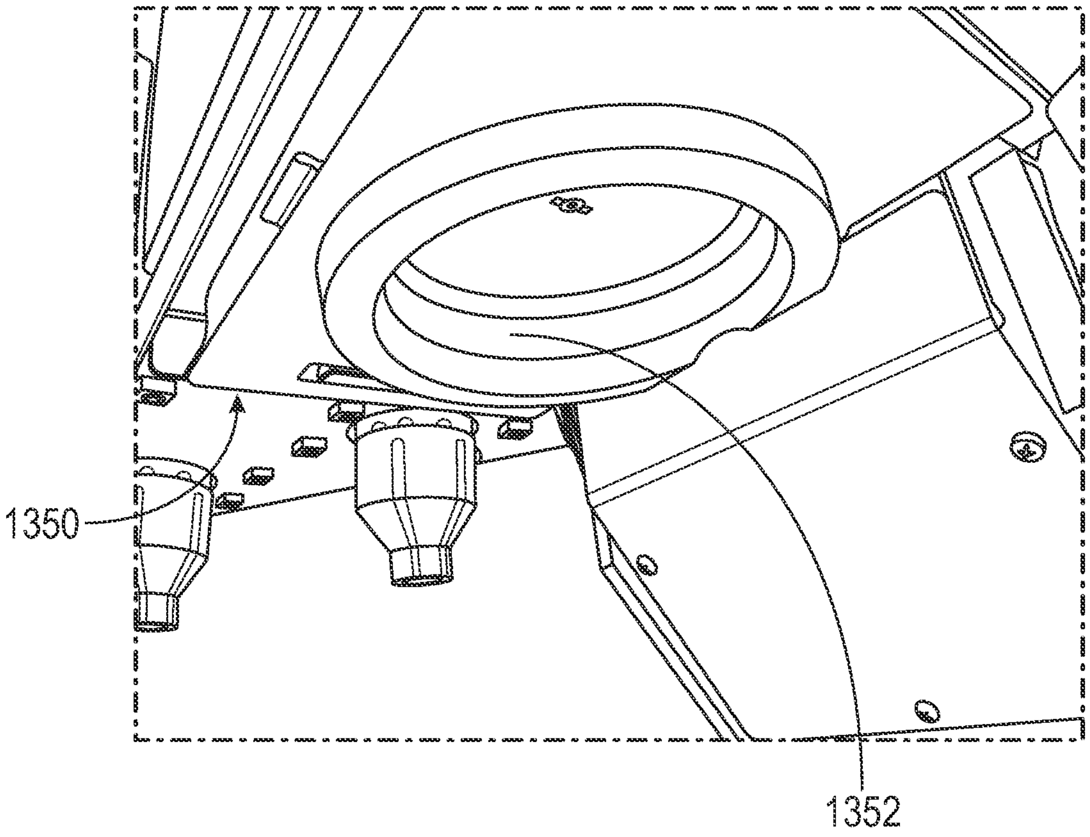
FIG. 61 is another perspective view of the lidding and printing system according to one embodiment.

FIGS. 60 and 61 illustrate a view of a lidding and printing system 1350 located above the inner turntable 507 above the cup receptacle 508 to be lifted by the lift mechanism 1330. In this embodiment, the lift mechanism 1330 lifts the cup holder 506*a* for lidding and printing a cup 50 located in the cup receptacle 508. As discussed above, in other embodiments, other lift mechanisms 1330 may be provided for lifting other cup receptacle 508 at other beverage fulfillment locations. The lidding and printing system 1350 may include aspects of the lidding and printing assembly 502 discussed above for lidding and printing. For example, the lidding and printing system 1350 may include sealing film 544, an in-line printer 540, and piercer 542, as discussed above, as well as other components. In this manner, when the cup receptacle 508 is lifted, a cup 50 located therein is positioned in the opening 1352 of the lidding and printing system 1350 for lidding and printing the cup 50.

Figure 62:
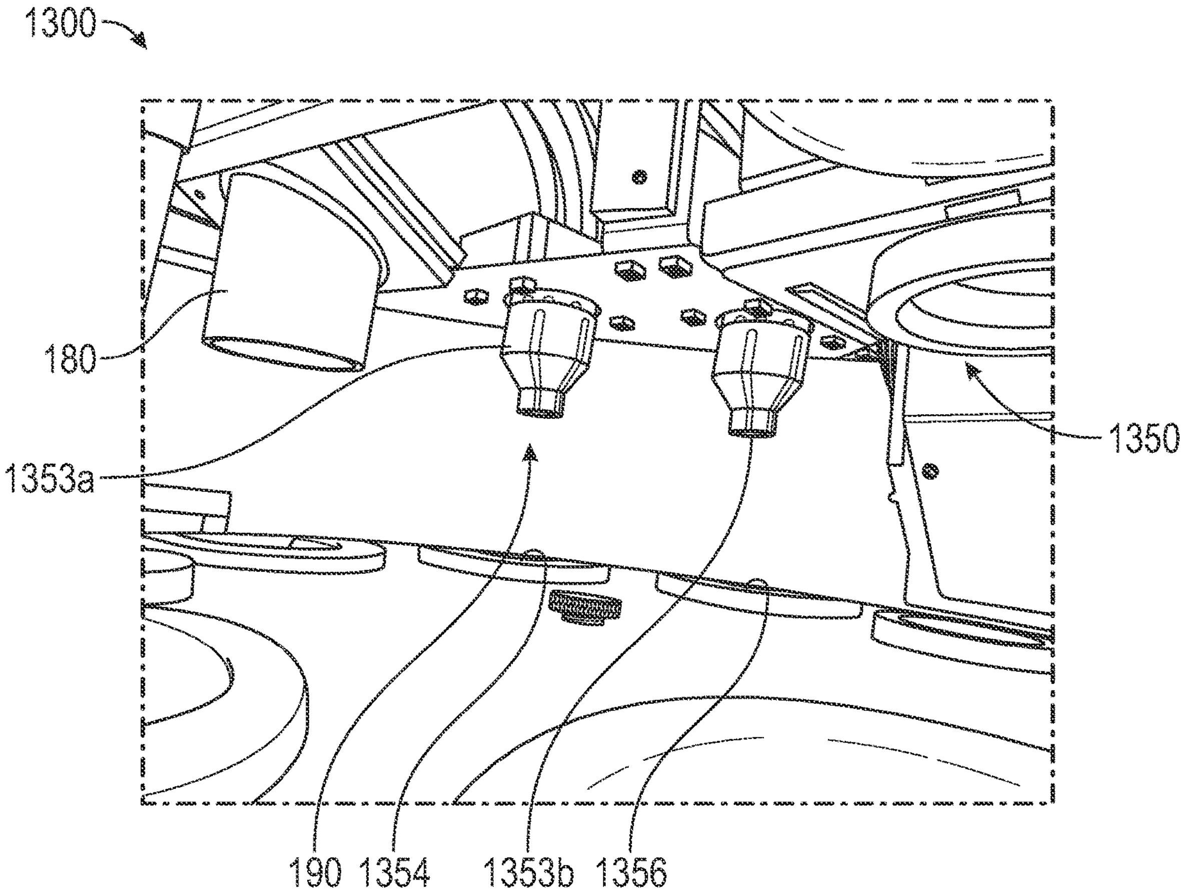
FIG. 62 is a perspective view of another embodiment of the beverage production system.

FIG. 62 illustrates locations of the ice dispensing station 180, the beverage dispensing station 190, and the lidding and printing system 1350, according to one embodiment. As can be seen, as the inner turntable 507 rotates clockwise, cups 50 are dispensed into the cup receptacles 508, a cup 50 is positioned under the ice dispensing station 180 for dispensing ice into the cup 50, then to the beverage dispensing station 190 for dispensing beverages into the cup 50, and then to the lidding and printing system 1350 for lidding the cup 50 and providing identifying indicia on the lid.

In this embodiment, the beverage dispensing station 190 includes two (2) nozzles 1353A, 1353B for dispensing beverages, although other numbers of nozzles are contemplated. In this embodiment, first nozzle 1353A may be used to substantially fill the cup 50 with a beverage at a first location 1354, while second nozzle 1353B may be used to top-off or complete filling of the beverage at a second location 1356. It may be useful to provide two beverage fill locations to completely fill the cup 50 with the desired beverage. However, in other embodiments, first and second nozzles 1353A, 1353B may be used to dispense different types of beverages, to provide redundancy, or increase the production or number of beverages that may be fulfilled.

Once the beverage fulfillment is completed on the inner turntable 507, the filled cup 50 may be transitioned to the outer turntable 505 via transitioning arm 132. The outer turntable 505 may then be indexed or rotated clockwise one or more cup positions to provide space for the next completed beverage. By providing the outer turntable 505 with the dial 1302 instead of separate cup receptacles, this design may provide the benefit of providing additional space for a more completed beverage and also allow easier access to the completed beverages.

Operationally, the beverage production system 1300 may receive input from point-of-sale or other systems, such as the computer system 400 as discussed above. Further, sensors provided at various locations about the beverage production system 1300 may be used to control the advancement of the inner and outer turntables 507, 505 to ensure, for example, that completed beverages on the dial 1302 are accessible to users and further do not interfere with newly fulfilled beverages transitioning from the inner turntable 507.

While the beverage production system 1300 has been described has having cup receptacles 508 on only the inner turntable 507 and no cup receptacles on the outer turntable 505, it is contemplated that the outer turntable 505 might have one or more cup holders 506*a* and that the inner turntable 507 might have fewer or no cup receptacles 508 in other embodiments. Further, while beverage production is described in this embodiment as being accomplished on the inner turntable 507, it is contemplated that beverages might also be fulfilled on the outer turntable 505 instead or in addition. Further, while filled beverages are described as being transitioned from the inner to the outer turntables 507, 505, filled beverages might remain in the inner turntable 507 or might be filled on the outer turntable 505 and transitioned to the inner turntable 507.

Figure 63:
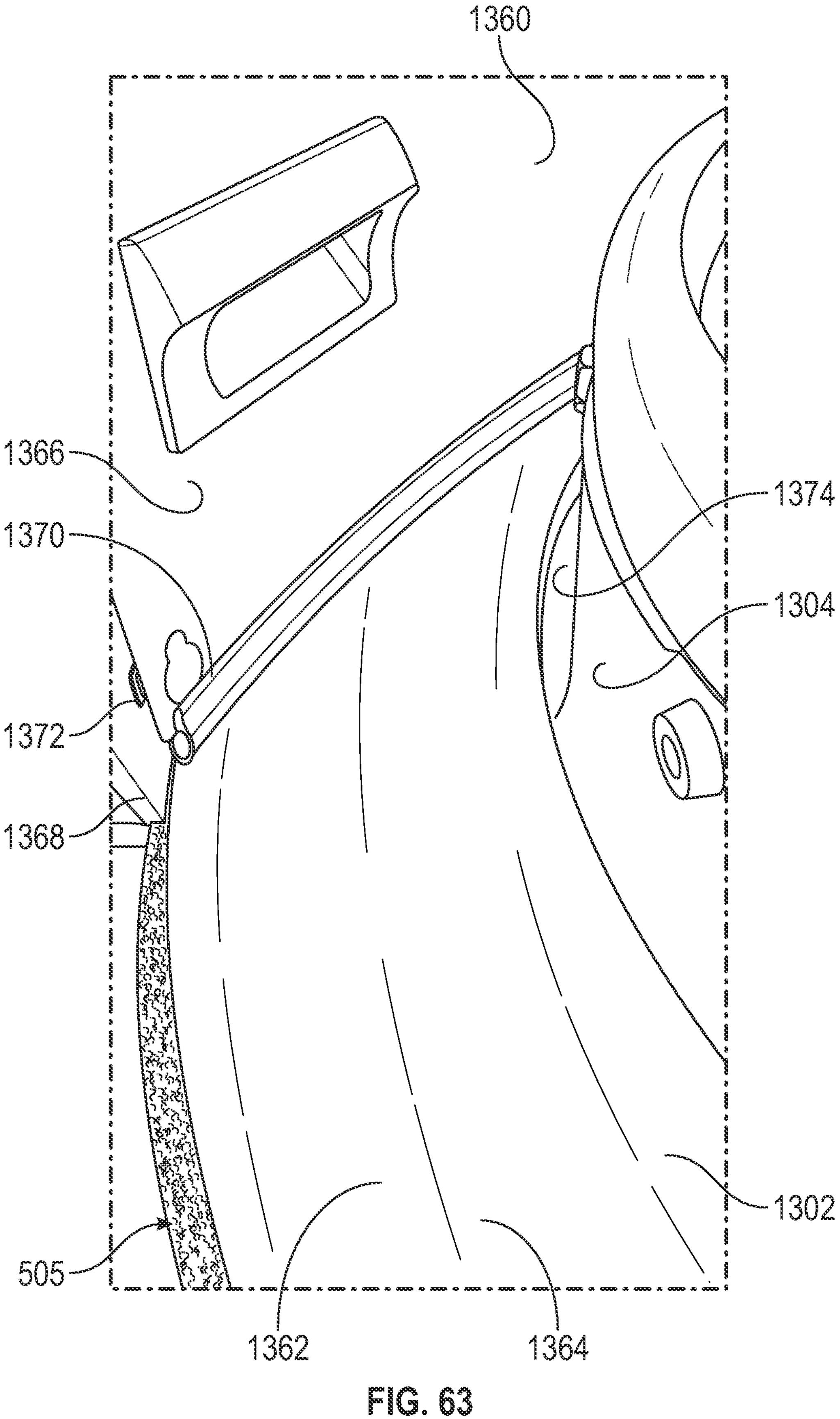
FIG. 63 is a perspective view of a wiper according to one embodiment of the present disclosure.

FIG. 63 illustrates a wiper 1360 that engages the dial 1302 to remove material 1362 that may collect on an upper surface 1364 of the dial 1302. It will be appreciated that material, for example, beverage spillage, ice, and moisture may collect on the upper surface 1364 of the dial 1302 during beverage fulfillment. As the cups 50 are transitioned onto the dial 1302 the upper surface 1364 may become slippery and cups 50 may not remain stable on the dial 1302 and undesirably slide or move on the dial 1302 when the outer turntable 505 is rotated or indexed. The wiper 1360, in this embodiment, may include a body 1366 with an engaging member 1368 attached to a lower end 1370 of the engaging member 1368. The engaging member 1368 is positioned adjacent the upper surface 1364 of the dial 1302. As the dial 1302 rotates, the engaging member 1368 engages and wipes or removes moisture that may collect on the upper surface 1364 of the dial 1302. In this embodiment, the wiper 1360 is located adjacent a left side 1372 of the beverage production system 1300 and arcs across a width of the dial 1302. Moisture collected by the engaging member 1368 may be wiped or swept off the dial 1302 for collection into a channel 1374 between the dial 1302 and the separating wall 1304. The channel 1374 may be formed as part of the sink 1307 or otherwise to provide for waste removal of the materials 1362 to a drain, as discussed above. In some embodiments, multiple wipers 1360 may be used and provided at other locations about the dial 1302 so long as the wipers 1360 do not interfere with the completed beverages rotating on the dial 1302. For example, during beverage production, it may be convenient to prevent rotation or indexing of filled beverages beyond the left side 1372 of the beverage production system 1300, since beverages might become unreachable by the users. Accordingly, the wipers 1360 may be preferably located adjacent the dial 1302 at locations that avoid engaging filled beverages. While the wiper 1360 is described as having an arced design, other embodiments are envisioned where the wiper 1360 might be substantially straight, wedge-shaped, or otherwise configured. In other embodiments, the wiper 1360 might be located near the dial 1302 and be periodically actuated, such as via a motor, to wipe across the upper surface 1364 of the dial 1302 and then be stored away from the upper surface 1364 to allow completed beverages on the dial 1302 to pass by without engaging the wiper 1360. Still other configurations will readily suggest themselves to one skilled in the art.

Figure 64:
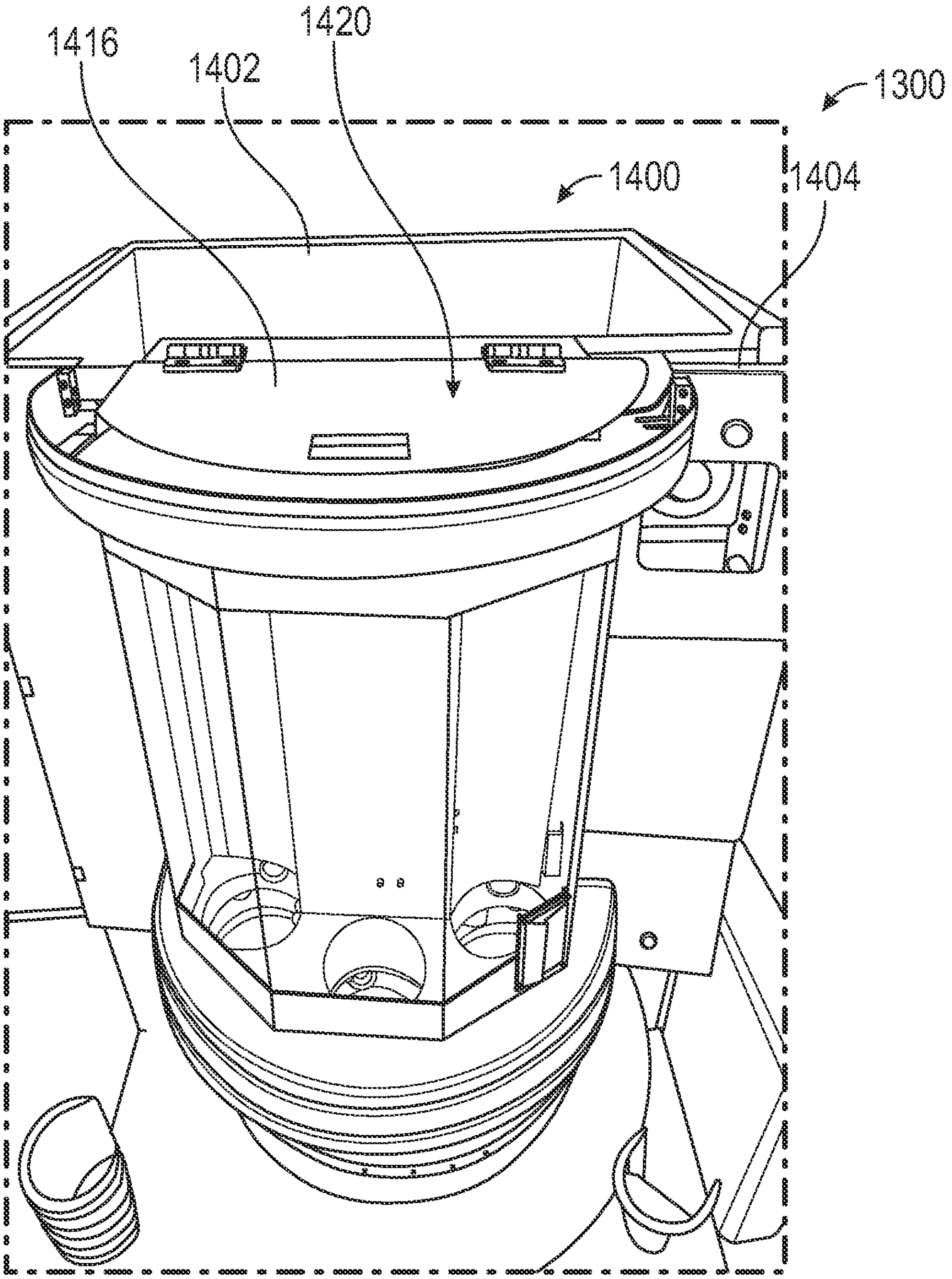
FIG. 64 is a perspective view of another embodiment of the beverage production system.
Figure 65:
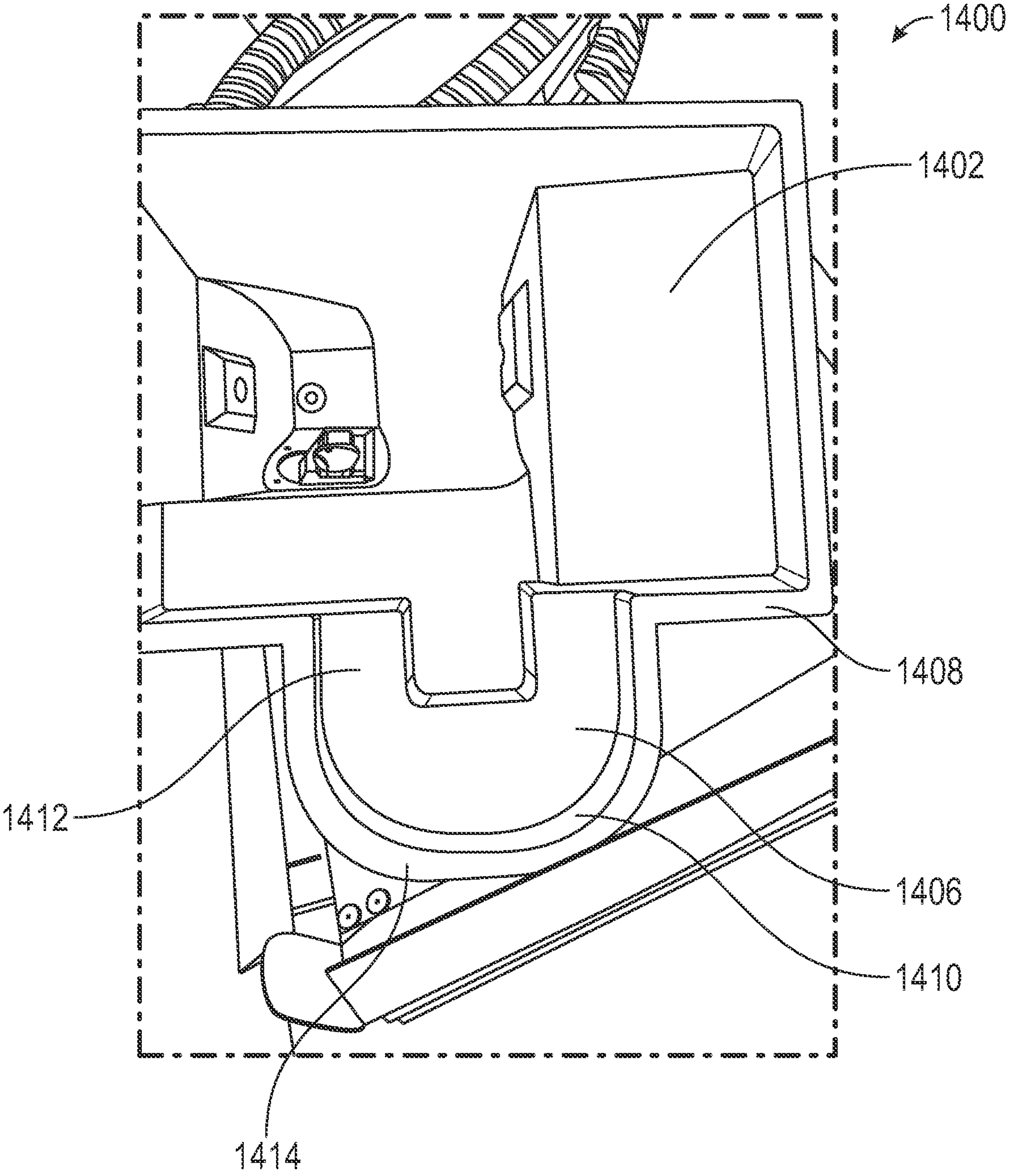
FIG. 65 is a top view of an ice bin according to one embodiment of the present disclosure.

FIG. 64 illustrates yet another embodiment of the beverage production system 1300. While the beverage production system 1300 illustrated in FIG. 51 is provided with an ice maker or machine 1390 positioned atop the beverage production system 1300, in some embodiments, the ice machine may be omitted and the ice may be manually filled. In either case, the embodiment shown in FIG. 64 illustrates an ice bin 1400 which may be automatically or manually filled with ice. The ice bin 1400 sits atop the beverage production system 1300 and may include augers and other systems (not shown) to promote the movement and processing of ice through the beverage production system 1300, as discussed above. Referring also to FIG. 65, the ice bin 1400 is shown removed from the beverage production system 1300. The ice bin 1400 includes a includes a bin tub 1402 for receiving and dispensing ice. The ice bin 1400 may be variously sized to be received in an upper portion 1404 of the beverage production system 1300. The ice bin 1400, in this embodiment, includes a fill chute 1406 which extends from a front side 1408 of the ice bin 1400 adjacent the bin tub 1402. The fill chute 1406 may be sloped from a front 1410 to a back 1412 towards the bin tub 1402 to promote ice placed in the fill chute 1406 to flow into the bin tub 1402. The fill chute 1402 may be generally rounded along a front side 1414 to conveniently receive ice manually poured into the fill chute 1406. However, the ice bin 1400 and fill chute 1406 may be otherwise configured in other embodiments. The ice bin 1400 may be constructed of various materials including metallic, such as stainless steel, polymeric materials, thermoform plastic, or the like.

Figure 66:
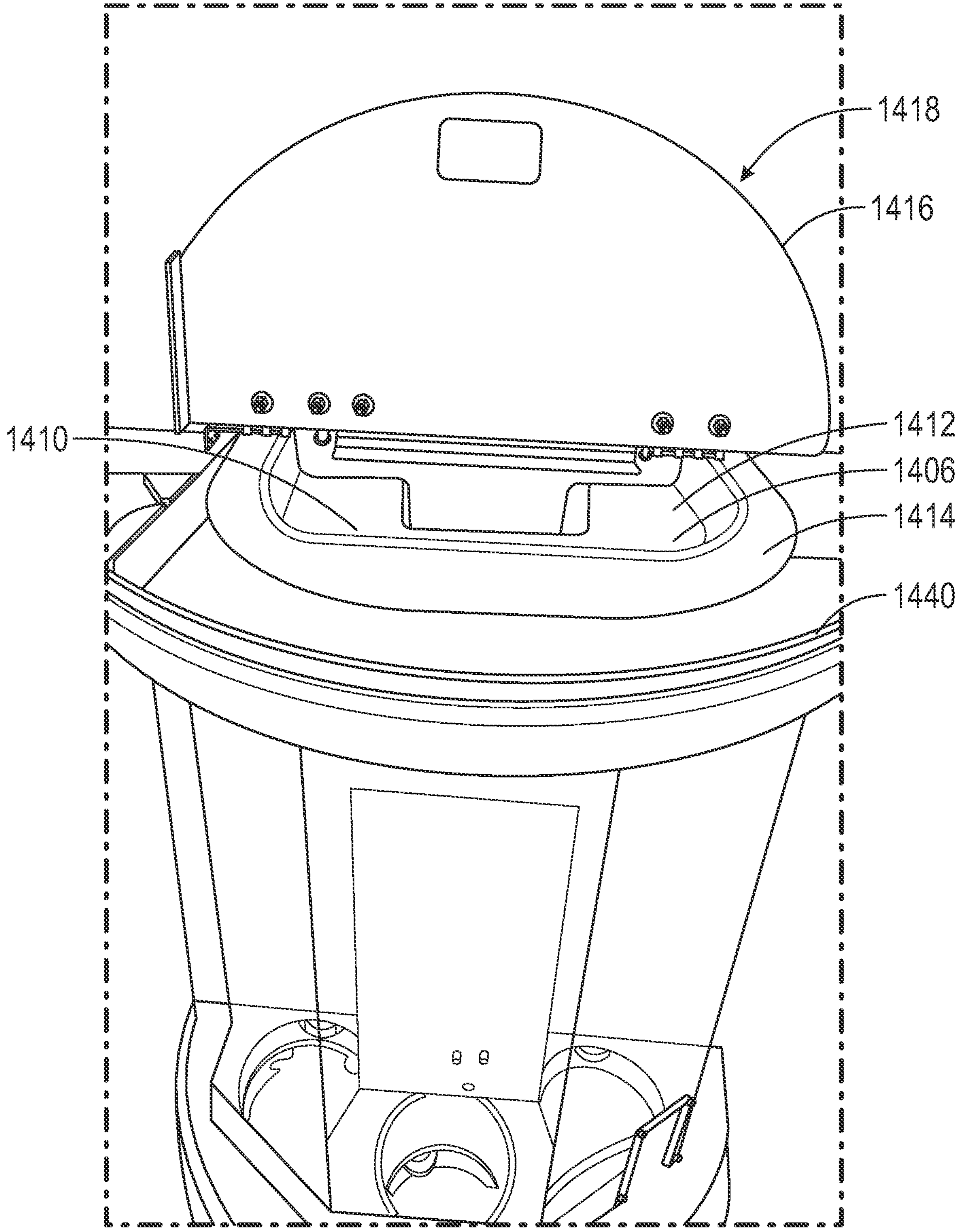
FIG. 66 is a perspective view of a fill chute and chute cover according to one embodiment of the present disclosure.

As shown in FIG. 66, a chute cover 1416 may be pivotally attached to the ice bin 1400 adjacent the fill chute 1406. In this illustration, the chute cover 1416 is shown in an up or open position 1418 which provides access to load ice into the ice bin 1400 via the fill chute 1406. FIG. 64 illustrates the chute cover 1416 provided in a down or closed position 1420 which prevents dust or debris from entering the ice bin 1400 and also prevents any hazards from inadvertent contact with moving parts during operation. The chute cover 1416 may be constructed of various materials including metallic, such as stainless steel. or polymeric materials.

Figure 67:
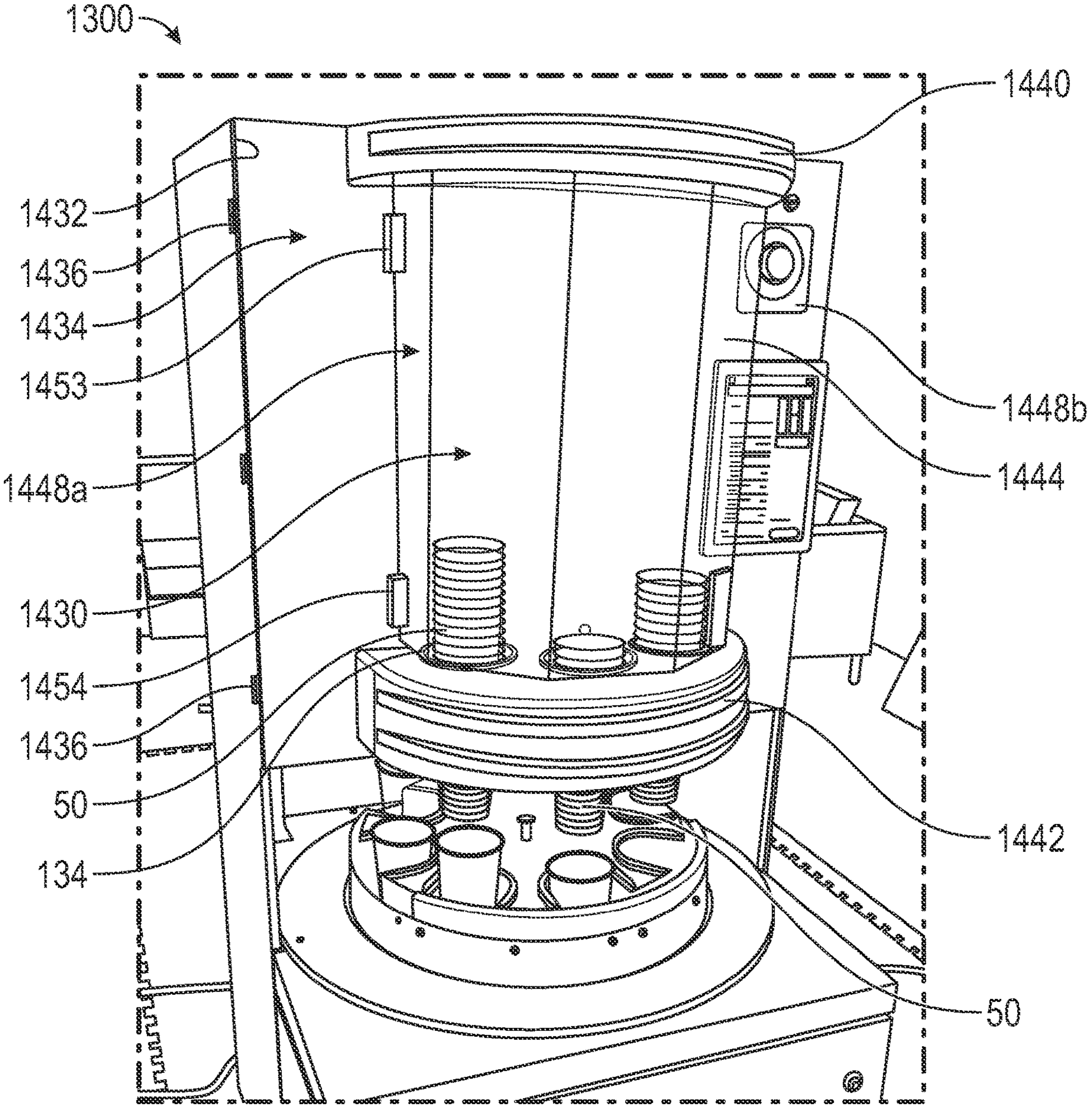
FIG. 67 is a perspective view of an embodiment of the beverage production system.
Figure 68:
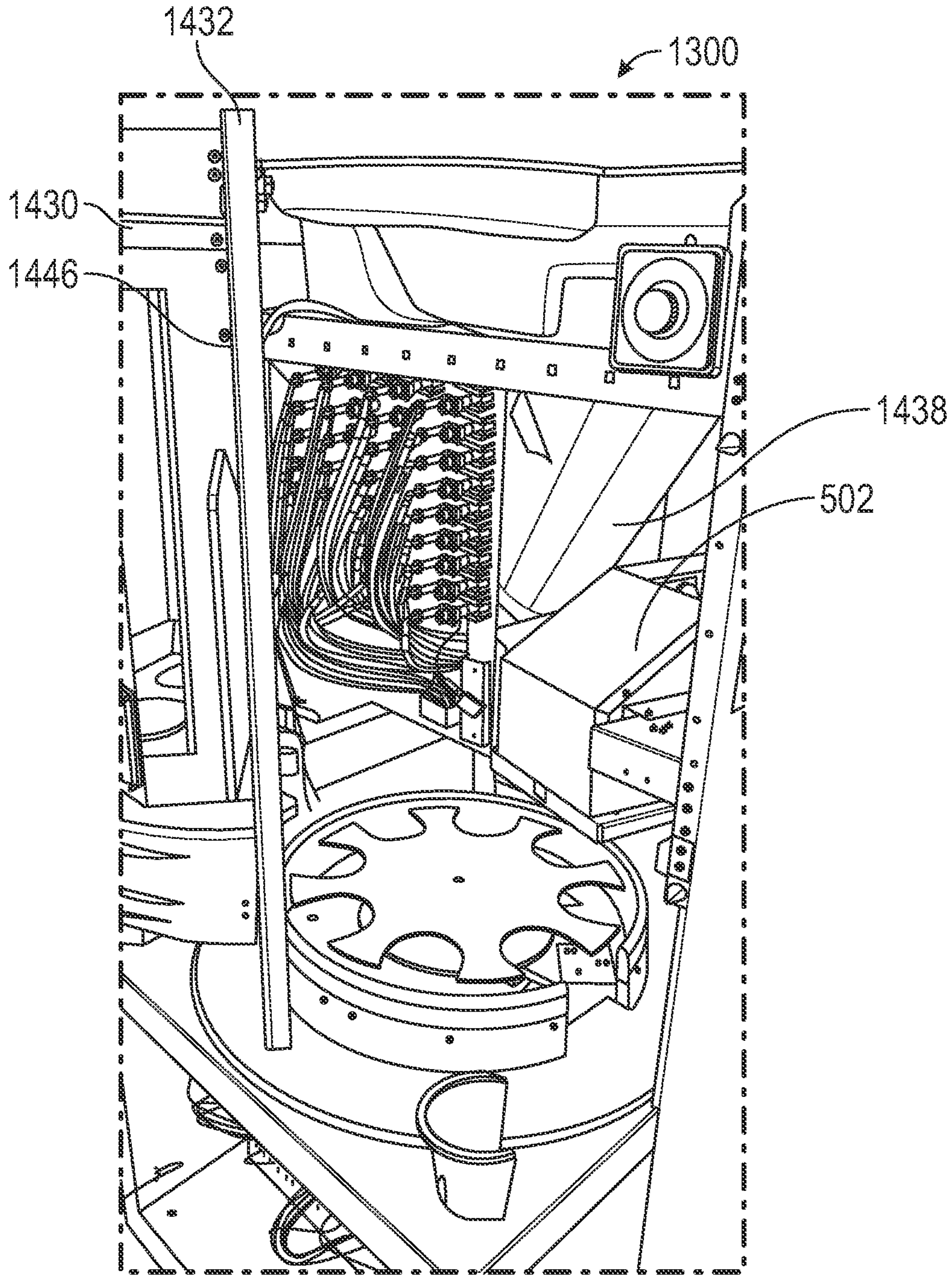
FIG. 68 is a view of an upper interior of the beverage production system according to one embodiment of the present disclosure.

Referring to FIG. 67, a front view of the beverage production system 1300 is provided that illustrates an embodiment of a cup dispenser 1430. In this embodiment, the beverage production system 1300 may include a door 1432 mounted on a front 1434 of the beverage production system 1300. The door 1432 may be provided with door hinges 1436 to enable the door 1432 to open. Referring also to FIG. 68, the door 1432 is illustrated in an open position which provides access to an upper interior 1438 of the beverage production system 1300 where controls and other systems, which will be discussed below, may be retained. As can be seen, when the door 1432 is opened, both the door 1432 and the cup dispenser 1430 attached thereto pivots or rotates on the door hinges 1436 to expose and allow access to the upper interior 1438 of the beverage production system 1300.

Figure 69:
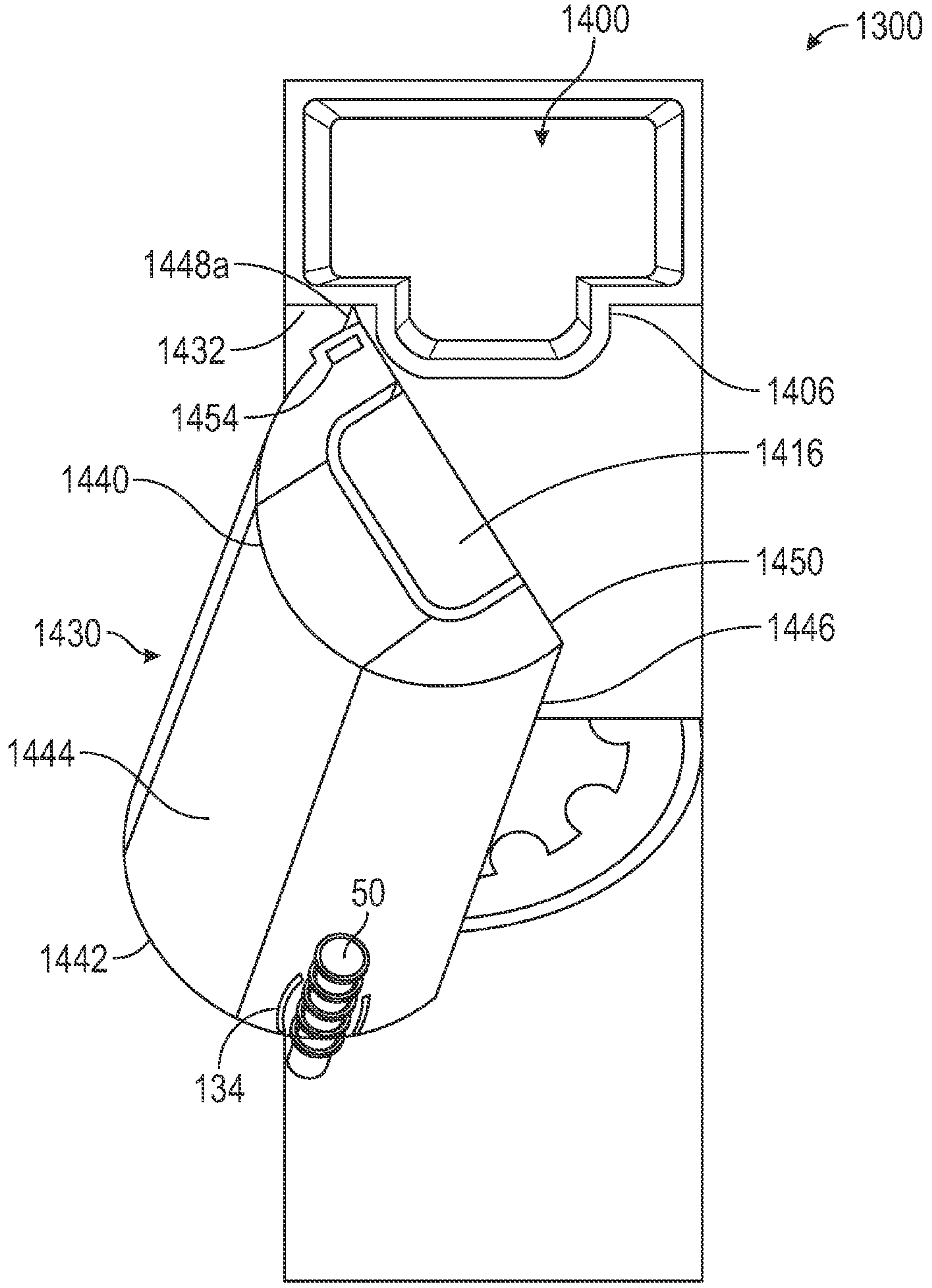
FIG. 69 is a view of the beverage production system illustrating a cup dispenser in an open position according to one embodiment of the present disclosure.

Referring also to FIG. 69, the cup dispenser 1430 is shown in an open position while the door 1432 of the beverage production system 1300 is closed. As can be seen, the cup dispenser 1430 is substantially semi-circular and includes an upper and lower support structure 1440, 1442 and a dispenser cover 1444 extending therebetween. A dispenser back wall 1446 extends from sides 1448*a* and 1448*b* of the dispenser cover 1444 between the upper and lower structures 1440, 1442 along a back side 1450 of the cup dispenser 1430. The dispenser cover 1444 and dispenser back wall 1446 define a cup storage area 1452 therein for retaining cups 50 to be dispensed. As can be seen in FIG. 66, the upper support structure 1440 may be configured as an arced or curbed member shaped to receive the semi-circular shape of the front side 1414 of the fill chute 1406. The cup dispenser 1430 may include dispenser hinges 1453 enabling the cup dispenser 1430 to be separately openable for refilling cups 50 while the door 1432 of the beverage production system 1300 remains closed, as shown in FIG. 69. This configuration allows the cup dispenser 1430 to be opened without opening the door 1432 and allowing moisture or other access to the upper interior 1438 of the beverage production system 1300 when refilling cups 50. This configuration also allows for refilling the ice via the chute cover 1416 and fill chute 1406 without opening the cup dispenser 1430 or door 1432 which prevents ice from spilling into the cup storage area 1452 or elsewhere. This configuration also allows the cups 50 to be restocked without stopping the beverage production system 1300, while door 14332 remains closed to protect against hazards in upper area 1438.

In this embodiment, the dispenser cover 1444 may be clear plastic which allows for visually identifying the number of cups 50 loaded in the cup dispenser 1430 so cups 50 can be reloaded in a timely manner. In some embodiments, the upper support structure 1440 may further cover the cup storage area 1452 to prevent debris or materials from entering and contaminating the cups 50 stored therein. In some embodiments, the upper support structure 1440 may merely provide support or define an upper portion of the dispenser cover 1444. In that case, the cup dispenser 1430 may merely be opened via the dispenser hinges 1453 to allow for reloading of cups 50 while allowing continued operation of the beverage production system 1300. Further, the cups 50 stored in cup storage area 1452 may be dispensed using elements of dispenser 134 as described above, for example in FIGS. 5-7, or by other techniques. In this embodiment, three (3) stacks of cups 50 are illustrated, where each stack includes cups 50 of the same or different size. However, in other embodiments, fewer or more stacks may be provided.

In the embodiment shown in FIG. 69, the chute cover 1416 may be coupled adjacent the upper support structure 1440 of the cup dispenser 1430. In this manner, the chute cover 1416 covers the fill chute 1406 when the cup dispenser 1430 is in a closed position. The beverage production system 1300 may further include a safety switch 1454 located adjacent the upper support structure 1440 of the cup dispenser 1430. The safety switch 1454 is couple to sense both the position of the door 1432 as well as the chute cover 1416. The safety switch 1454 may be further coupled to communicate with various control systems of the beverage production system 1300, as discussed above, so as to energize and deenergize all or various components of the beverage production system 1300 upon opening and closing the door 1432 and/or fill chute 1406. Such operation of the safety switch 1454 may prevents hazards or accidental interference with various systems within and without the upper interior 1438 while the door 1432 is open and also prevents operations, for example, of augers or other systems associated with dispensing ice when the fill chute 1406 is open. In the present embodiment, the safety switch 1454 is a single switch located and so coupled for such operation, while in other embodiments multiple switches located elsewhere may be provided. In other embodiments, the safety switch 1454 may further be coupled to sense when the cup dispenser 1430 is opened and control operation of the beverage production system 1300 as desired.

Figure 70:
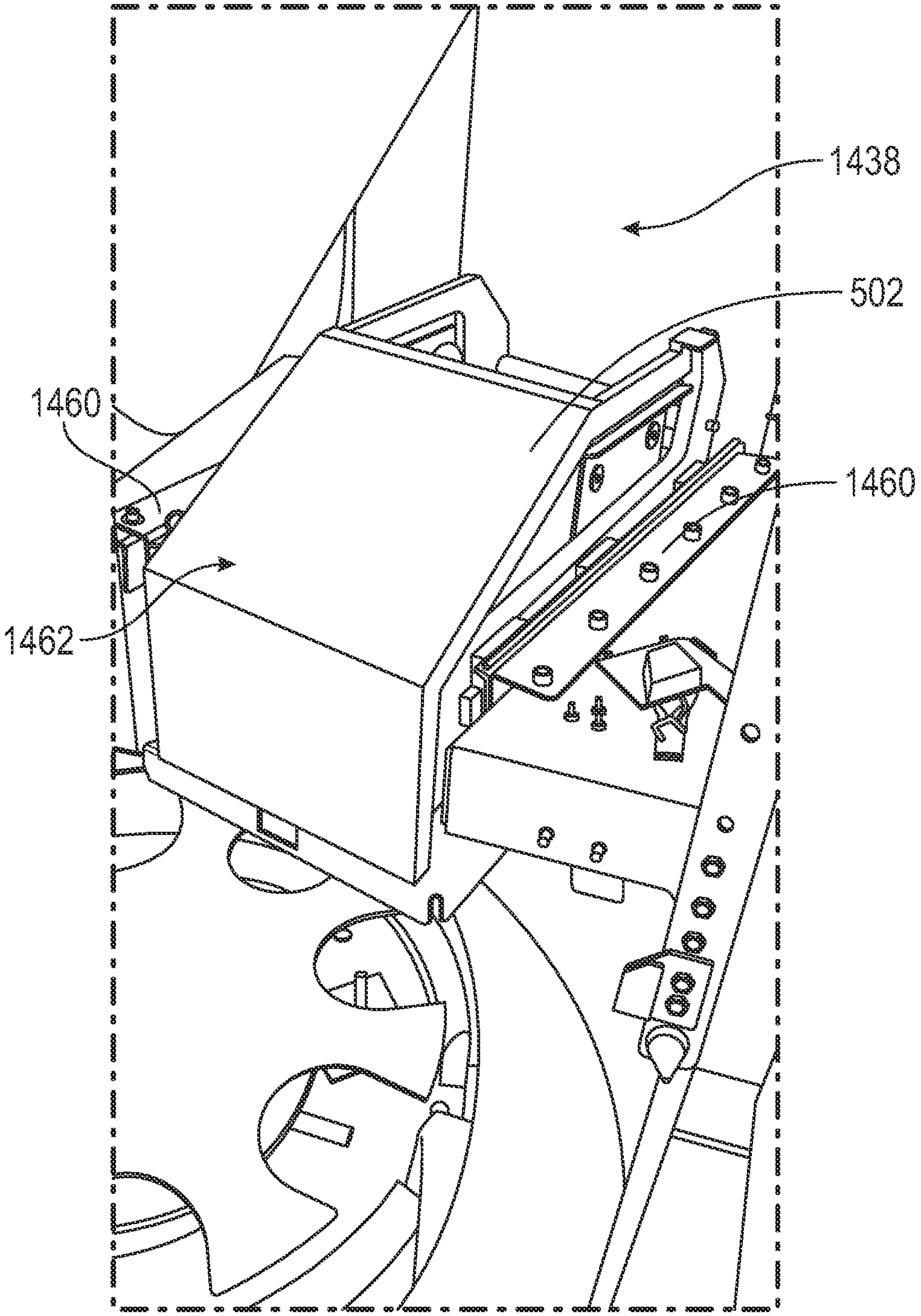
FIG. 70 is a perspective view a lidding and printing assembly according to another embodiment of the present disclosure.
Figure 71:
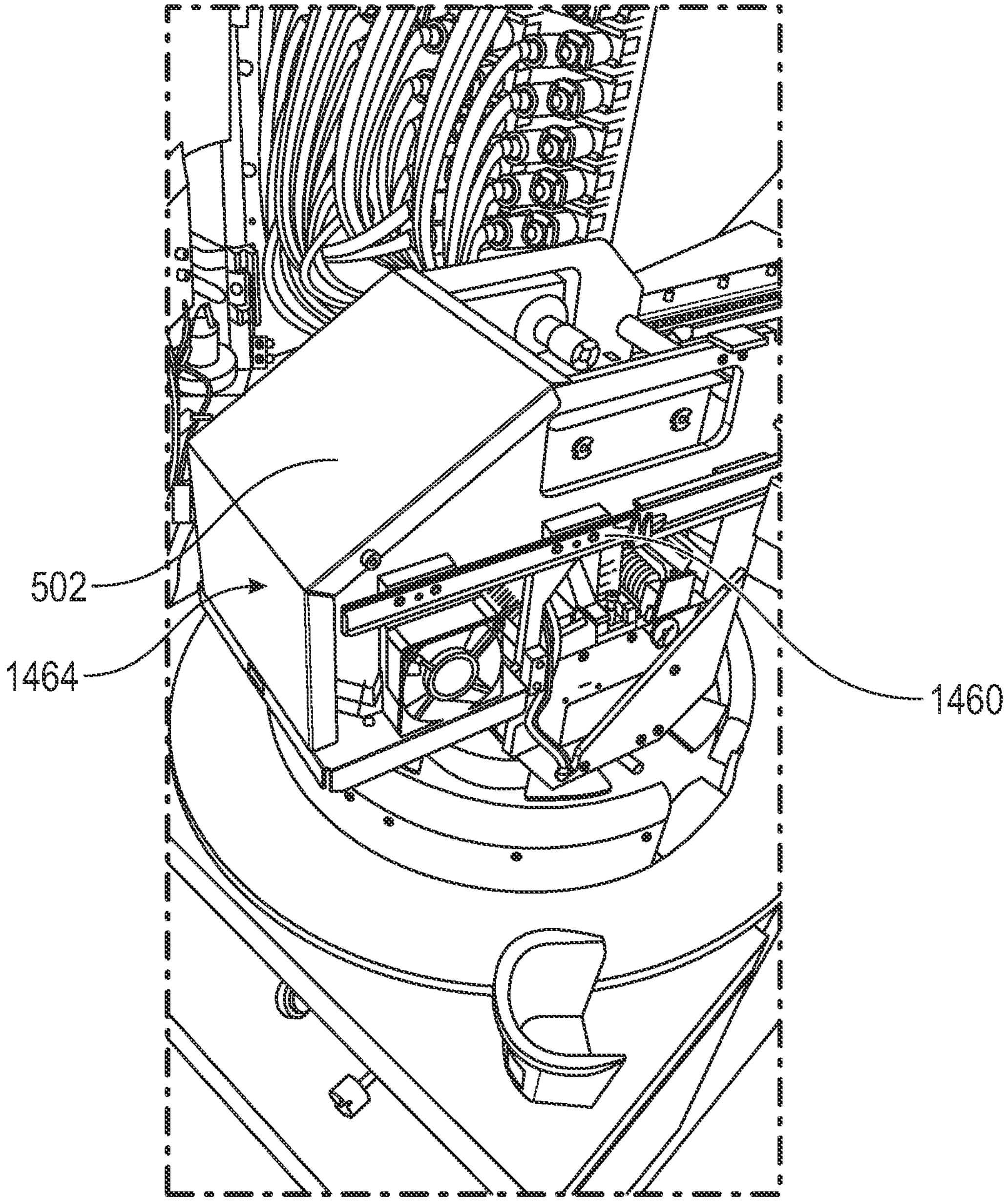
FIG. 71 illustrates the lidding and printing assembly on slide rails according to one embodiment of the present disclosure.
Figure 72:
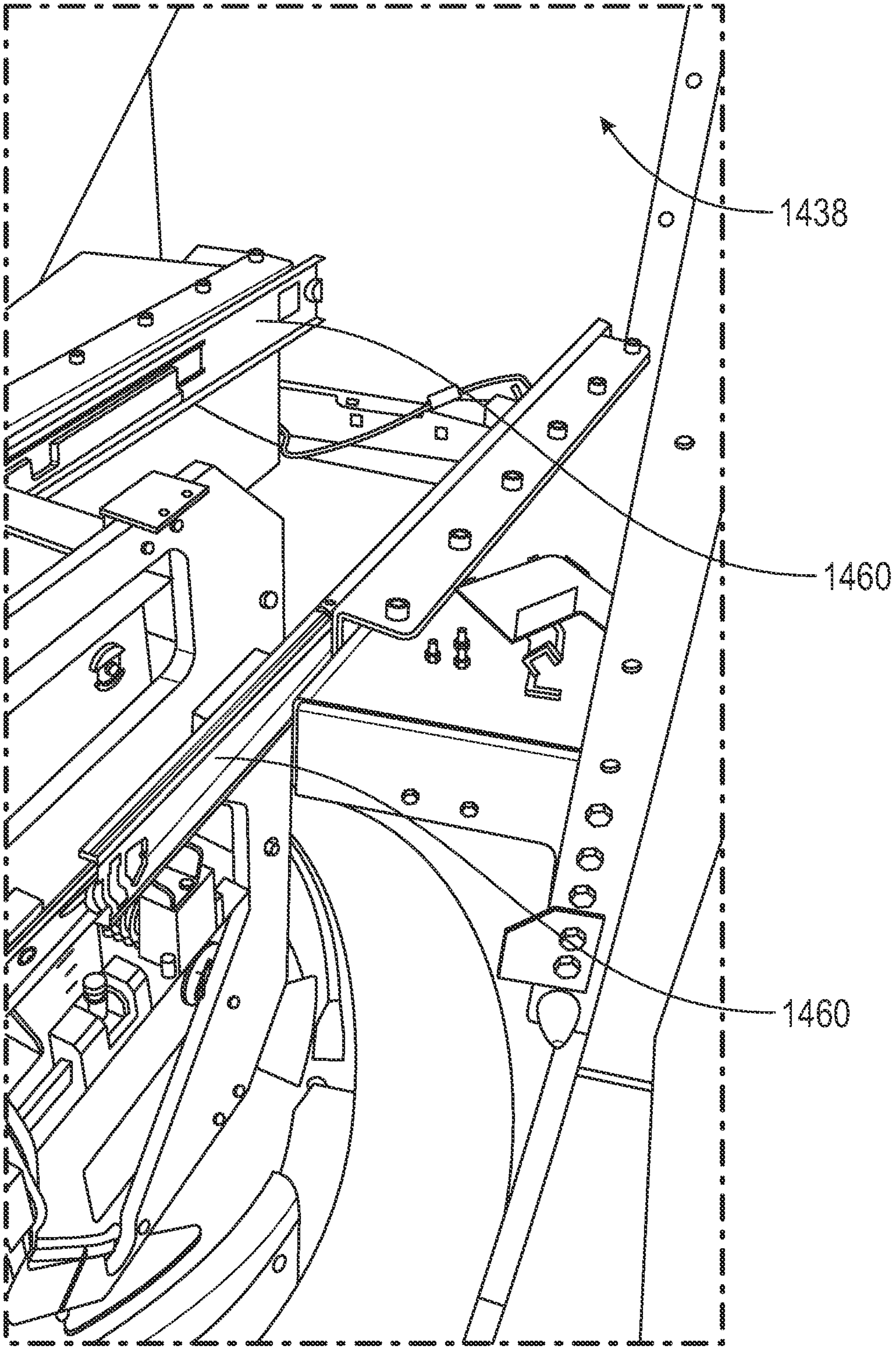
FIG. 72 is another illustration of the lidding and printing assembly on slide rails according to one embodiment of the present disclosure.

As shown in FIG. 68, when the door 1432 is opened, various components may be accessed in the upper interior 1438 including another embodiment of the lidding and printing assembly 502. Referring also to FIGS. 70-72, in this embodiment, the lidding and printing assembly 502 is mounted in the upper interior 1438 of the beverage production system 1300 via slide rails 1460. Slide rails 1460 may enable the lidding and printing assembly 502 to be extended from a stored or ready position 1462, as shown in FIG. 70, to an extended or maintenance position 1464 illustrated in FIG. 71. The slide rails 1460 may be any type of slide or glide system attachable in the upper interior 1438 and the lidding and printing assembly 502 to enable movement or extension between such positions or locations and may include ball bearings or other types of slide rails or extension designs. The slide rails 1460 allow for ready access to the lidding and printing assembly 502 when pulled out or extended to the maintenance position 1464 for ready access for reloading or changing cup lidding film, such as sealing film 544, printing ink for the printer, or maintenance or repair and cleaning of components of the lidding and printing assembly 502. The rail slides 1460 may extend any distance between the ready position 1462 and maintenance position 1464 that is desired to provide sufficient clearance from other components within the upper interior 1438 to allow for ready access by users for these purposes. The slide rails 1460, the lidding and printing assembly 502, and door 1432 may further be configured such that when door 1432 is closed, the door 1432 engages or presses the lidding and printing assembly 502 into the proper location, such as the ready position 1462, or so called "poke-yoke'd" configuration. It will be appreciated that the lidding and printing assembly 502 being correctly positioned ensure a proper alignment to result in obtaining a sound or good film seal on the cup 50. Other techniques for ensuring proper placement of the lidding and printing assembly 502 may be used, such as locking pin, sensor, and so on to locate or verify that the lidding and printing assembly 502 is in the correct position before operation of the beverage production system 1300 begins.

Figure 73:
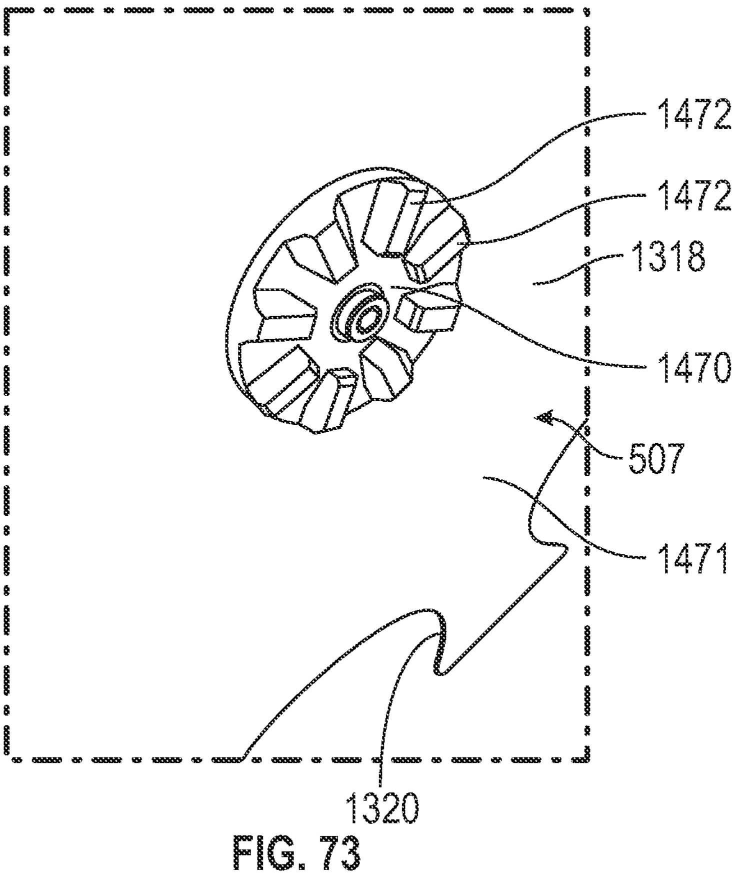
FIG. 73 illustrates an upper frame of the beverage production system according to one embodiment of the present disclosure.

As discussed above and referring to FIG. 73, the inner turntable 507 may include the upper frame 1318, which is a substantially round plate configured with U-shaped openings 1320 to receive the cup holders 506*a* (not shown). In one embodiment, the inner upper frame 1318 may include frame coupler 1470 centrally disposed on the lower side 1471 of the upper frame 1318. The frame coupler 1470 includes a plurality of coupler teeth 1472 disposed thereabout the frame coupler 1470.

Figure 74:
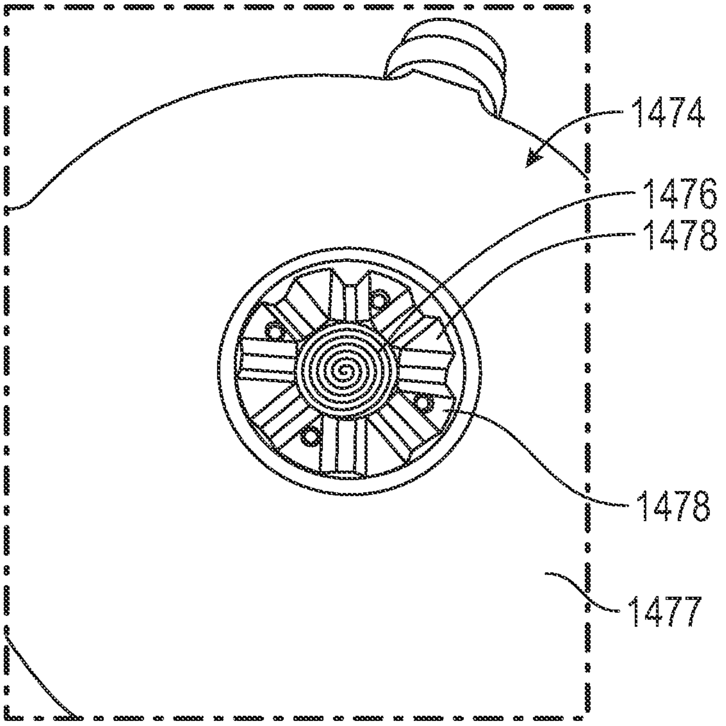
FIG. 74 is illustrates a drive mechanism of the beverage production system according to one embodiment of the present disclosure.

Referring also to FIG. 74, various drive systems may be provided, as discussed above, to operate systems of the beverage production system 1300 including driving an inner turntable drive mechanism or drive mechanism 1474. The drive mechanism 1474 includes a drive coupler 1476 centrally disposed on an upper surface 1477 of the drive mechanism 1474. The drive coupler 1476 includes a plurality of drive teeth 1478 disposed thereabout the drive coupler 1476. The frame coupler 1470 and coupler teeth 1472 are configured to mate with the drive coupler 1476 and drive teeth 1478. Thus, as can be seen, when the lower side 1471 of the upper frame 1318 is brought into place adjacent the upper surface 1477 of the drive mechanism 1474, the frame coupler 1470 engages the drive coupler 1476. As such that when the drive mechanism 1474 is actuated and rotates, the mating engagement of the drive coupler 1476 with the frame coupler 1470 operates to similarly rotate the upper frame 1318 during operation of the beverage production system 1300. Since the upper frame 1318 gravitationally rests on the drive mechanism 1474, the upper frame 1318 may be readily removed by merely lifting the upper frame 1318 from out of placement above the drive mechanism 1474 for cleaning, and similarly easily replaced to resume operation. This configuration eliminates any complex mechanical attachment and thus simplifies the operation and maintenance of the beverage production system 1300. Further this configuration provides safety during operation since this design provides enough force to reliably move the cups 50 around in the correct positions, but not enough to create hazards or pinch points if obstructed. In the event of such hazard or pinch point, the configuration allows enough tolerance to lift and slip to prevent any injury or damage.

While the systems described herein including beverage production systems 100, 500, 800, 900, 1000, and 1300 and each of their various sub-systems, assemblies, and components have been described separately, the present disclosure contemplates implementations that combine any arrangement of the various systems and sub-systems described above. As just one example of the substitutions and combinations contemplated, the lidding system described with regard to FIG. 37 may be used in lieu of the lidding systems described with regard to FIGS. 15-20. Further is contemplated that the beverage identification systems, such as those described in FIGS. 41 and 50, may be employed in any of the other beverage production systems described herein. Similarly, although not all of the described beverage production systems employ the user interface 116 for selection of the desired beverage(s) on the user interface 116 as well as connection via point-of-sale systems, or sinks provided under the conveyors, the present disclosure contemplates such combination with any of the disclosed beverage production systems. As a further example, although only two turntables, outer and inner turntable 505 and 507, are shown in beverage production system 500, one or more additional concentric rows of turntables may be added to further the overall number of beverages that may be prepared and stored for retrieval. Also, it is contemplated that the beverage production system 500, or others, may be used in conjunctions with additional conveyors where beverages are moved from the production conveyor or turntable to conveyors that transport the beverages elsewhere in the establishment to customers or staff for further convenience and efficiency. These are just some of the examples of combinations that are contemplated by the present disclosure. For purposes of brevity, each of the contemplated combinations will not be discussed, but will readily suggest themselves to one skilled in the art. These and other combinations will readily suggest themselves to one skilled in the art in view of the present disclosure. Further, the various components and supporting structures may be constructed of metal or metal alloys, plastic or polymeric materials or any suitable materials.

The embodiments disclosed herein include beverage production systems and related methods that may further enhance the efficiency of the beverage production process by automating many, most, or substantially all of the steps for producing a beverage. Thus, through use of the embodiments disclosed herein, the number of manual steps that may be necessary for producing beverages may be reduced, thereby increasing the efficiency of the beverage production process and improving food service operations overall.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order.

What is claimed is:

1. A beverage production system, comprising:
- a turntable assembly comprising:
  - a central axis;
  - an inner turntable; and
  - an outer turntable disposed circumferentially about the inner turntable;
- a cup dispensing station configured to dispense cups onto one of the inner turntable or the outer turntable;
- a beverage dispensing station configured to dispense a beverage into a cup of the dispensed cups;
- a cabinet disposed at least partly above the turntable assembly and defining an interior space;
- a lidding and printing assembly provided in the interior space of the cabinet, the lidding and printing assembly operable to provide a lid on the cup and provide indicia on the lid; and
- an extension system coupled to the interior space of the cabinet and the lidding and printing assembly, the extension system configured to retain the lidding and printing assembly in a ready position located within the interior space of the cabinet and to extend the lidding and printing assembly to a maintenance position, wherein the lidding and printing assembly is extended from the interior space in the maintenance position relative to the ready position.

2. The beverage production system of claim 1, further comprising:
- a door attached to the cabinet and partially enclosing the interior space, wherein the door is attached to the cabinet via door hinges such that the door is openable to access the interior space.

3. The beverage production system of claim 2, wherein a cup dispenser of the cup dispensing station is coupled to the door via cup dispenser hinges, wherein the cup dispenser is separately openable from the door.

4. The beverage production system of claim 3, wherein the cup dispenser includes an upper opening to provide access to a cup retaining area within the cup dispenser, and further comprising a removable cup dispenser cover provided over the upper opening of the cup dispenser.

5. The beverage production system of claim 2, further comprising:
- an ice bin having a bin tub for retaining ice and a fill chute formed along a side of the ice bin, the fill chute including a bottom sloped toward the bin tub; and
- a chute cover configured to cover the fill chute when the chute cover is in a closed position and further configured to expose the fill chute for receiving ice therein when the chute cover is in an open position.

6. The beverage production system of claim 5, further comprising one or more safety switches coupled to the door and the chute cover and further coupled to a controller to control operation of the beverage production system based on a sensed position of the door and the chute cover.

7. The beverage production system of claim 6, wherein the one or more safety switches is a single switch coupled to the door and the chute cover.

8. The beverage production system of claim 6, wherein a cup dispenser of the cup dispensing station is coupled to the door via cup dispenser hinges, wherein the cup dispenser is separately openable from the door, and wherein the one or more safety switches is further coupled to the cup dispenser to sense a position of the cup dispenser relative to the door.

9. The beverage production system of claim 1, wherein the extension system is further defined as a plurality of extendable rails.

10. The beverage production system of claim 2, further comprising a drive system configured to promote rotation of the inner turntable, wherein the inner turntable includes a frame coupler coupled to the inner turntable, and wherein the drive system includes at least a drive coupler configured to mate with the frame coupler.

11. The beverage production system of claim 10, wherein actuation of the drive system drives the inner turntable via mating engagement of the drive coupler with the frame coupler.

12. The beverage production system of claim 11, wherein at least a portion of the inner turntable that includes the frame coupler gravitationally rests on the drive system via the mating engagement of the drive coupler with the frame coupler.

13. A method of dispensing a beverage, comprising:

providing a beverage production system including;

a cabinet defining an interior space housing a lidding and printing assembly, the lidding and printing assembly configured for lidding cups and printing on cup lids; and a turntable assembly disposed below the cabinet and comprising:

a central axis;

an inner turntable; and an outer turntable disposed circumferentially about the inner turntable;

dispensing a cup from a cup dispensing station onto one of the inner turntable or the outer turntable;

dispensing a beverage from a beverage dispensing station into the cup;

sensing, by one or more switches, an opening of a door of the cabinet;

suspending the beverage production system from dispensing cups and beverages in response to sensing the opening of the door; and extending the lidding and printing assembly from a ready position located within the interior space of the cabinet to a maintenance position extended from the interior space relative to the ready position.

14. The method of claim 13, further comprising:

retracting the lidding and printing assembly from the maintenance position to the ready position; and sensing, by the one or more switches, a closing of the door of the cabinet; and actuating the beverage production system to resume dispensing cups and beverages in response to sensing the closing of the door.

* * * * *